United States Patent
Mahmoodi et al.

(10) Patent No.: US 12,216,596 B2
(45) Date of Patent: Feb. 4, 2025

(54) ZQ CALIBRATION CIRCUIT AND METHOD FOR MEMORY INTERFACES

(71) Applicant: SanDisk Technologies LLC, Addison, TX (US)

(72) Inventors: Mohammad Reza Mahmoodi, Goleta, CA (US); Martin Lueker-Boden, Fremont, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 27 days.

(21) Appl. No.: 17/941,790

(22) Filed: Sep. 9, 2022

(65) Prior Publication Data

US 2024/0086347 A1    Mar. 14, 2024

(51) Int. Cl.
*G06F 13/16*    (2006.01)

(52) U.S. Cl.
CPC ...... *G06F 13/1694* (2013.01); *G06F 13/1673* (2013.01)

(58) Field of Classification Search
CPC .......... G06F 13/1694; G06F 13/1673
See application file for complete search history.

(56) References Cited

U.S. PATENT DOCUMENTS

| | | | | |
|---|---|---|---|---|
| 10,693,460 B1* | 6/2020 | Takahashi | ........... | G11C 11/4093 |
| 2007/0040716 A1* | 2/2007 | Lin | ..................... | H03M 1/1019 |
| | | | | 341/120 |
| 2011/0204869 A1* | 8/2011 | Kim | ........................ | H01C 1/16 |
| | | | | 323/304 |
| 2014/0016404 A1* | 1/2014 | Kim | ...................... | G11C 11/165 |
| | | | | 365/158 |
| 2014/0325135 A1* | 10/2014 | Anderson | .......... | H03K 19/0005 |
| | | | | 711/105 |
| 2015/0338863 A1* | 11/2015 | Ikeda | ...................... | G05F 1/461 |
| | | | | 323/314 |
| 2016/0182044 A1* | 6/2016 | Addepalli | .............. | G11C 16/06 |
| | | | | 326/30 |

(Continued)

FOREIGN PATENT DOCUMENTS

| WO | WO-2014140307 A2 * | 9/2014 | ............. | H03M 1/00 |
|---|---|---|---|---|
| WO | WO-2019160590 A1 * | 8/2019 | ......... | G11C 11/4076 |

OTHER PUBLICATIONS

J. Nemec, "Circuit termination methodologies and their characteristics," WESCON/97 Conference Proceedings, Santa Clara, CA, USA, 1997, pp. 556-561.*

(Continued)

*Primary Examiner* — Pierre Michel Bataille
(74) *Attorney, Agent, or Firm* — Sheppard, Mullin, Richter & Hampton LLP

(57) ABSTRACT

Systems and methods disclosed herein provide for an improved termination leg unit design and method of trimming impedance thereof, which provides for improved impedance matching for process variations, along with variations in temperature and voltage. Example implementation provide for a leg unit circuit design that includes a first circuit compensating for temperature and voltage variations and a second circuit, connected in series with the first circuit, compensating for process variations. Furthermore, disclosed herein is ZQ calibration method that provides for calibrating of the impedance of each of an on-die termination, a pull-up driver, and a pull-down driver using a single calibration circuit.

20 Claims, 41 Drawing Sheets

(56) References Cited

U.S. PATENT DOCUMENTS

| | | | |
|---|---|---|---|
| 2019/0087373 A1* | 3/2019 | Kim | H03K 19/017509 |
| 2019/0259445 A1* | 8/2019 | Ho | G11C 11/4094 |
| 2022/0148630 A1* | 5/2022 | Kavala | H03K 19/0005 |
| 2022/0208253 A1* | 6/2022 | Kang | G11C 11/4093 |
| 2023/0036535 A1* | 2/2023 | Darzy | H03M 1/66 |

OTHER PUBLICATIONS

E. Bougioukou, M. Varsamou, N. Toulgaridis and T. Antonakopoulos, "A Real-Time Non-Volatile Memory Analyzer and its Use on the Evaluation of Storage Devices based on NAND Flash Memories," 2020 IEEE International Instrumentation and Measurement Technology Conference (12MTC), Dubrovnik, Croatia, 2020, pp. 1-6.*

* cited by examiner

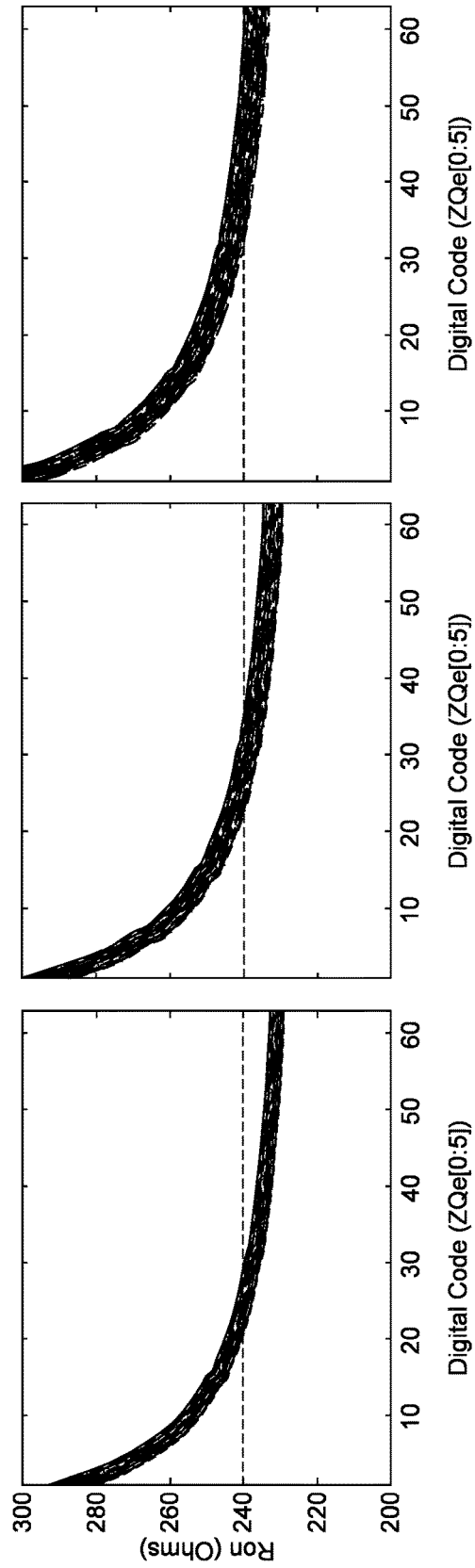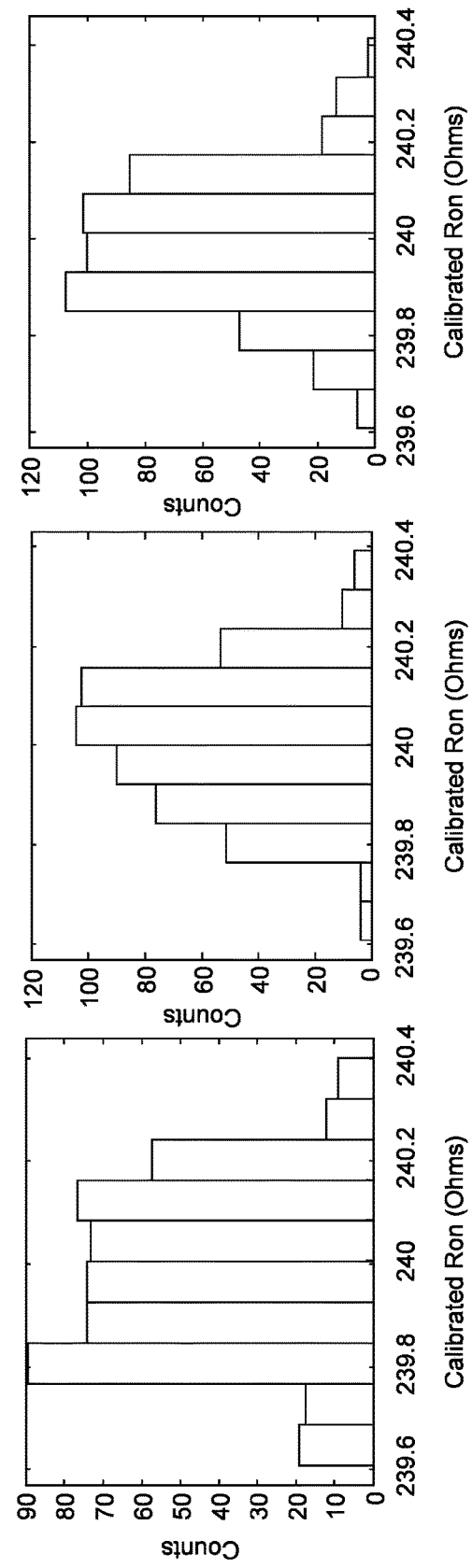

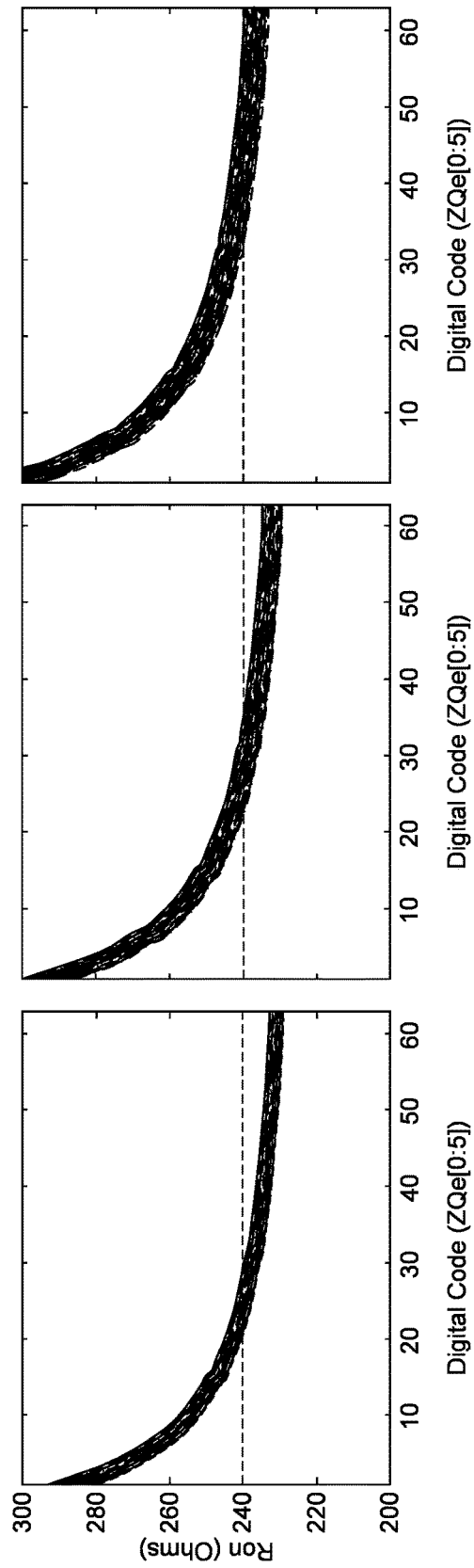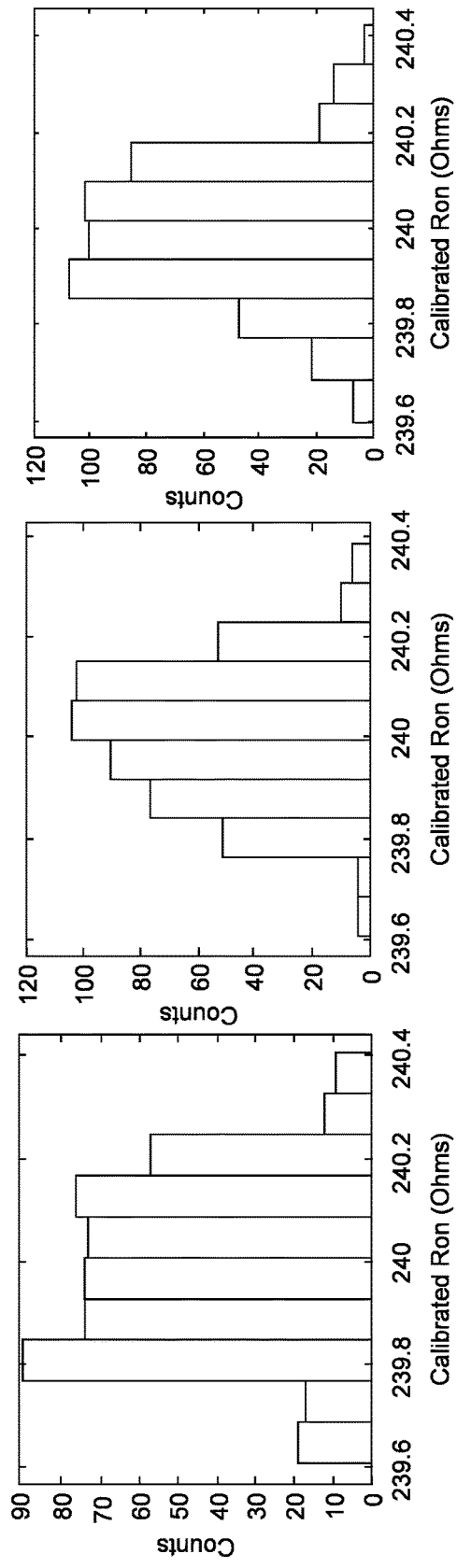
FIG. 16A  FIG. 16B  FIG. 16C
FIG. 16D  FIG. 16E  FIG. 16F

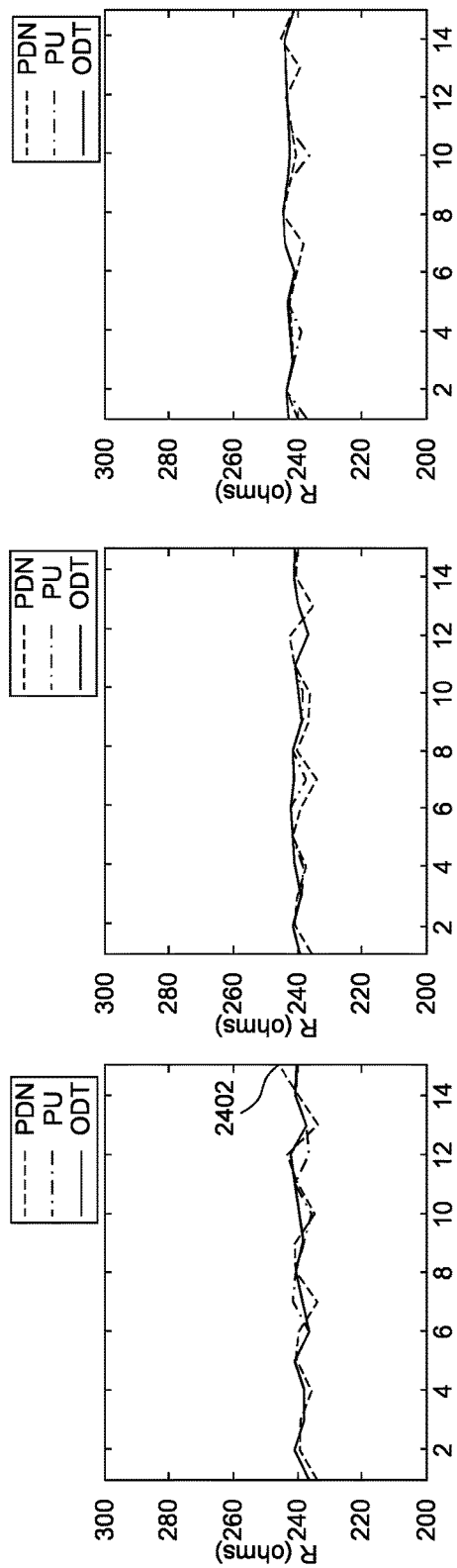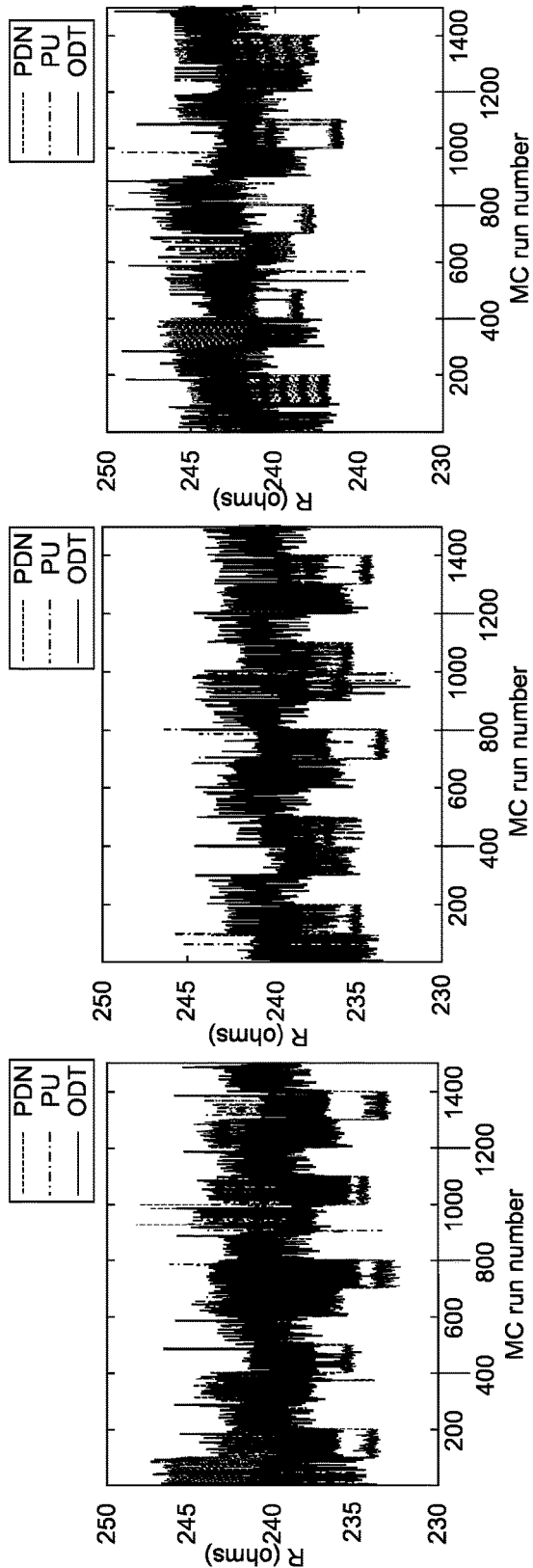
FIG. 24A  FIG. 24B  FIG. 24C  FIG. 24D  FIG. 24E  FIG. 24F

ZQ CALIBRATION CIRCUIT AND METHOD FOR MEMORY INTERFACES

DESCRIPTION OF RELATED ART

Most semiconductor devices include an input circuit (also referred to as a receiver circuit) configured to receive signals from the outside world via input pads (or pins) and an output circuit (also referred to as a transmitter circuit) configured to provide internal signals to the outside via output pads (or pins). The input circuit has an on-die termination (ODT) resistance for impedance matching of the external transmission line. The output circuit has an output driver, which has a pull-up resistance and a pull-down resistance. The impedance of both the termination resistor and the output driver can change due to various circumstances such as variation of a power supply voltage, a change in operating temperature, variation in manufacture processes, etc. Thus, an impedance mismatch can arise.

The impedance mismatch can cause signal reflection, which can compromise signal integrity. As the operating speed of electrical products has increased, the swing width (that is the difference between high and low logic levels) of a signal interfaced between semiconductor devices gradually has been reduced in order to reduce supply current and to minimize the delay time taken for signal transmission. However, the reduction in the swing width of the signal easily exposes the signal to external noise, causing signal reflection to become more critical at an interface terminal due to impedance mismatch. Thus, the impedance mismatch may lead to difficulty in high-speed transmission of data and distortion of output data.

Weak output drivers may result in bad slopes on I/O signals. Strong output drivers may consume high currents and result in too much simultaneous switching noise (SSN) on power lines and I/O pins. Mismatch in pull-up and pull-down impedances also degrades signal integrity. Therefore, at high speeds, any deviation in output driver impedance from target impedance results in shrinking of eye aperture and may result in data transmission errors or losses.

To alleviate impedance mismatch, the device's output drivers and/or termination resistors may be periodically calibrated. One calibration technique is referred to as a ZQ calibration. ZQ calibration may use a precision calibration resistor that is located off chip. The chip may have a variable impedance circuit which is calibrated with respect to the calibration resistor. The ZQ calibration adjusts the impedance of the variable impedance circuit until it is calibrated to the calibration resistor. This results in an impedance code that can be used to adjust the impedance of the device's output drivers or on-die termination circuitry.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 14A-14H depict various results provided from simulations of the leg unit of FIG. 10.

FIGS. 16A-16H depict various results provided from simulations of the leg unit of FIG. 15.

FIGS. 24A-24F depict simulated results of the calibration process of FIGS. 19 and 20.

Figure 1:
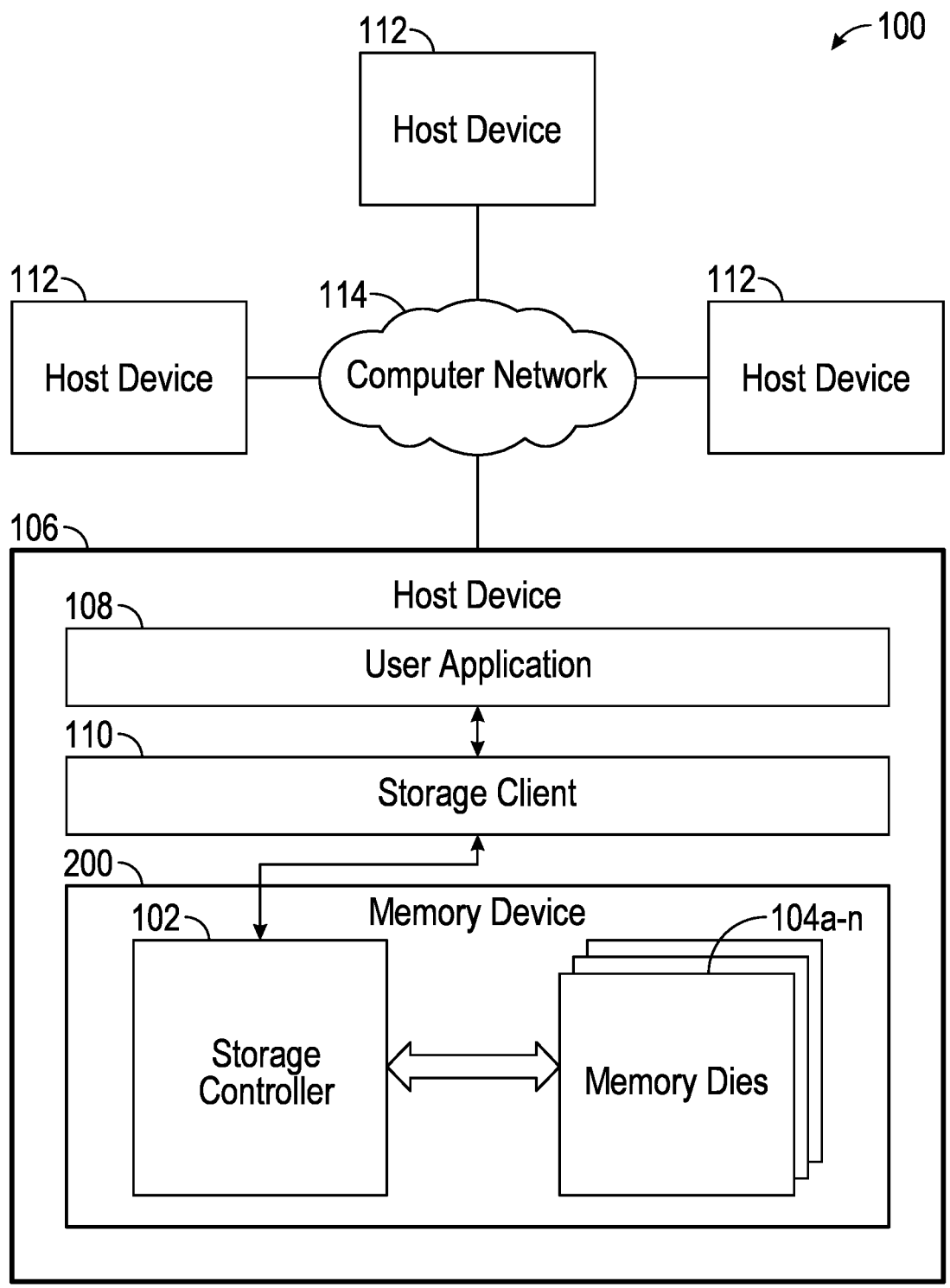
FIG. 1 is a block diagram of an example memory system, in connection with which, example embodiments of the disclosed technology can be implemented.

The figures are not exhaustive and do not limit the present disclosure to the precise form disclosed.

DETAILED DESCRIPTION

As introduced above, impedance mismatch between a receiver circuit and an input circuit can cause signal reflections that compromise signal integrity. Such mismatches may be the result of variation in a power supply voltage, variations in operating temperature, and/or variation in fabrication processes (also referred to herein as PVT variations) that cause impedance of (ODT) and/or output drivers circuitry to deviate from designed for impedance. To alleviate impedance mismatch, output drivers and/or termination resistors may be periodically calibrated, such as through ZQ calibration techniques, that produce a calibration code used to trim (e.g., adjust or calibrate) the impedance of the output drivers or on-die termination circuitry.

Conventional on-die termination circuitry and output drivers include a plurality of leg units, each of which is designed for a target impedance, where the leg units are enabled or disabled depending on the overall impedance desired for a given operation mode of the ODT or output drivers. Each leg unit includes a number of transistors connected in parallel between a supply voltage and a data bus. Which are controlled according to a calibration code. These conventional approaches provide for calibration that compensates for variations in temperature and supply voltage through selectively turning ON the transistors, which changes a total effective resistance provided by the circuit between the supply voltage and the data bus. As the number of active transistors is increases, the total effective impedance of the circuit is reduced. Thus, as temperature and voltage variations induce changes in the total effective impedance, the calibration code may be adjusted so to compensate for the variations through activating or deactivating certain transistors.

However, these convention approaches suffer from various technical problems, particularly with respect to fabrication process induced variations. That is, complications arise when calibrating for process induced variations (referred to as global variations). For example, process induced variations result in an exceedingly small window (e.g. number) of calibration codes that are usable to efficiently trim the circuit so to provide the desired total effective impedance. This small calibration window can be a result of large differences between process corners, which are not efficiently compensated for.

Manufacturing processes in the semiconductor industry are subject to stochastic errors, causing a real process to differ from an ideal or target process. In particular, real processes distribute according to a Gaussian pattern around a target process. A key parameter used to characterize manufacturing processes is the switching speed of the resulting electrical components/devices, based on which a given process can be classified according to so called "process corners". In the case of a transistor, process corners are referred to as "fast", "slow" or "typical". In the case of resistors, process corners are a maximum fabricated resistance (Rmax), a typical or designed for fabricated resistance (Rtt), and a minimum fabricated resistance (Rmin).

Many conventional let unit designs include one or more resistors connected to transistors, each of which are subject to variations in process corners. At a Rmax, the window of available calibration codes to efficiently trim the circuitry may be numerous. However, the impedance at the Rtt and Rmin corners may be reduced such that the number of calibration codes available is small, and any adjustment in one transistor may lead to exponential changes in impedance (see FIG. 9 below). While it may be possible to design increased Rtt, the problem would still remain in the case of Rmin and Rmax.

One approach to compensate for the above described technical short comings is to design each leg unit to include larger numbers of transistors, which will provide finer steps in calibrating the total effective impedance of the leg unit. However, this approach requires increases in data processing due to increased bit width of the ZQ calibration code. That is, control of each transistor requires an additional bit and to provide a workable resolution the number of transistors may be inhibitive. For example, this approach may require 15-20 transistors to achieve the performance of the technology disclosed herein, which significantly increases the size and complexity of the circuit and the bit width of the ZQ calibration code to program each transistor. Furthermore, the resulting circuit may be increase in size due to required chip real-estate to add the numerous additional transistors, and require additional increased power consumption to drive the additional transistors.

Another approach that may avoid the above technical short comings is to provide a leg unit which does not include any resistors and, therefore, is not subject to the same process induced variations. However, the total effective impedance value of these approaches becomes extremely non-linear during high voltage swings. Thus, the total effective impedance of the resistor free approach exhibits non-linear errors, even when calibrated.

Accordingly, embodiments of the disclosed technology provide an improved leg unit design and method of trimming the impedance thereof that provides for improved impedance matching for process variations, along with variations in temperature and voltage. More particularly, and as will be described below in this disclosure, embodiments disclosed herein provide for a leg unit circuit design that includes a first circuit that can be calibrated for temperature and voltage variations and a second circuit that can be calibrated for process variations in the circuitry. The first circuit and second circuit may be connected in series between a voltage supply and a data bus. The total effective impedance of the embodiments disclosed herein can be trimmed by a calibration code having a first portion of that specifies operation of the first circuit and a second portion that specifies operation of the second circuit. For example, the first circuit may comprise a first plurality of switches (illustratively depicted herein as transistors) that switchably connect a voltage supply to a data bus according to a target impedance. In various embodiments, the first plurality of switches are connected in parallel such that a total effective impedance may be altered according to which switches are activated so to achieve a target impedance. The second circuit may comprise a second plurality of second switches (illustratively depicted herein as transistors) connected to a plurality of resistors. In various embodiments, the second plurality of transistors are connected in series. The plurality of resistors may also be connected in series, such that each of the plurality of resistors is connected in parallel with a corresponding switch of the second plurality of transistors. The second plurality of switches may switchably connect the plurality of resistors between the supply voltage and the data bus, thereby altering the total effective impedance.

In an example trimming (or calibration) of the embodiments disclosed herein, the first portion of the calibration code may specify first plurality of switches to be turned ON to compensate for temperature and supply variations and the second portion of the calibration code may specify second plurality of switches to be turned ON to compensate for process variations by connecting or disconnecting corresponding resistors of the plurality of resistors. Thus, one or more of the plurality of resistors (or none of the plurality of resistors in some cases) may be connected in series with the termination resistor, thereby adjusting the total effective impedance through summation of in series resistors. As a result, the total effective impedance of the embodiments disclosed herein can be adjusted to bring the total effective impedance at the Rtt and Rmin process corners closer to the Rmax process corner. By bringing the impedance of Rtt and Rmin up towards the Rmax process corner, the window of applicable calibration codes increases in width.

Furthermore, some embodiment disclosed herein provide for a third circuit, connected in parallel with the first circuit, configured to improve dynamic range of the impedance embodiments disclosed. The third circuit may function to reduce the maximum impedance value of the embodiments disclosed herein, thereby reducing the swing in impedance values as a function of calibration code, which may further operate to extend the window of applicable calibration codes. In some embodiments, the third circuit comprises a transistor that is connected in series with the first circuit. The transistor of the third circuit may be activated (e.g., turned ON), whenever the leg unit is activated.

Embodiments disclosed herein also provide for an improved calibration process for generating calibration codes used to trim the impedance of the output drivers and ODT circuitry. Conventional calibration techniques use a precision calibration resistor that is located off chip and the chip includes a variable impedance circuit that is calibrated with respect to the calibration resistor. The results are provided as the calibration code. However, the conventional approaches required separate circuits each connected to the calibration resistor and having a variable impedance circuit. The conventional approaches fail to provide a single circuit that is usable to calibrate a number of variable impedance circuits.

Accordingly, embodiments of the disclosed technology provide for an integrated circuit design that can be operated to generate calibration codes for a plurality of variable impedance circuits. For example, embodiments herein include a plurality of plurality of variable impedance circuits, each of which can be calibrated based on referencing an on-chip calibration device. The variable impedance circuits may include an ODT replica circuit, a pull-down driver replica circuit, and/or a pull-up driver replica circuit, each of which have an adjustable impedance. Embodiments here include first circuitry that supplies a reference voltage Vref to a reference node based on current passing through the on-chip calibration device, such as a resistor having a known resistance value. A comparator can be implemented to compare calibration voltages for each variable impedance circuit to the reference voltage, and calibrate (or adjust) the impedance of each variable impedance circuit until the calibration voltage is close to or equal to the reference voltage. Accordingly, the disclosed technology provides for calibration of a plurality of variable impedance circuits (e.g., ODT, pull-up driver, and pull-down driver). By implementing a single circuit for multiple variable impedance circuits, the embodiments disclosed herein provide for improved power efficiency through resource share and time-down multiplexing of various blocks, and reduce physical on-die area requirements. Furthermore, embodiments disclosed herein allow for calibration at two-third of one-third of the supply voltage (e.g., (2/3)*VDD/3), which is recommended for maximized linearity.

FIGS. 1 to 4G depict an example memory system that can be used to implement the technology disclosed herein. FIG. 1 is a schematic block diagram illustrating a memory system 100. The memory system 100 includes a memory device 200 (also referred to herein as a storage device), a host device 106, at least one host device 112, and a computer network 114.

The host device 106 may be a computing device (e.g., laptop, desktop, smartphone, tablet, digital camera, wearable smart device, and so on) that includes one or more processors and readable storage devices (such as, but not limited to, RAM, ROM, flash memory, hard disk drive, solid state memory) that store processor readable code (also referred to herein as instructions or software) for programming storage controller 102 to perform the methods described herein. The host device 106 may also include additional system memory, one or more input/output interfaces, and/or one or more input/output devices in communication with the one or more processors, as well as other components well known in the art.

The memory system 100 includes at least one memory device 200, comprising the storage controller 102 and a plurality of memory dies 104. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

In some embodiments, the memory system 100 may include two or more memory devices. Each memory device 200 may include a plurality of memory dies 104, such as flash memory, nano random access memory ("nano RAM or NRAM"), magneto-resistive RAM ("MRAM"), dynamic RAM ("DRAM"), phase change RAM ("PRAM"), etc. The data memory device 200 may also include other types of non-volatile and/or volatile data storage, such as dynamic RAM ("DRAM"), static RAM ("SRAM"), magnetic data storage, optical data storage, and/or other data storage technologies.

The memory device 200 may be a component within a host device 106 as depicted in FIG. 1, and may be connected using a system bus, such as a peripheral component interconnect express ("PCI-e") bus, a Serial Advanced Technology Attachment ("serial ATA") bus, or the like. In another embodiment, the memory device 200 may be external to the host device 106 and is connected via a wired connection, such as, but not limited to, a universal serial bus ("USB") connection, an Institute of Electrical and Electronics Engineers ("IEEE") 1394 bus ("FireWire"), or the like. In other embodiments, the memory device 200 may be connected to the host device 106 using a peripheral component interconnect ("PCI") express bus using external electrical or optical bus extension or bus networking solution such as Infiniband or PCI Express Advanced Switching ("PCIe-AS"), or the like.

In various embodiments, the memory device 200 may be in the form of a dual-inline memory die ("DIMM"), a daughter card, or a micro-module. In another embodiment, the memory device 200 may be a component within a rack-mounted blade. In another embodiment, the memory device 200 may be contained within a package that is integrated directly onto a higher level assembly (e.g., mother-board, laptop, graphics processor, etc.). In another embodiment, individual components comprising the memory device 200 may be integrated directly onto a higher level assembly without intermediate packaging.

In some embodiments, instead of directly connected to the host device 106 via a wired connection, the data memory device 200 may be connected to the host device 106 over a wireless connection. For example, the data memory device 200 may include a storage area network ("SAN") storage device, a network attached storage ("NAS") device, a network share, or the like. In some embodiments, the memory system 100 may be connected to the host via a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 106 and the data memory device 200.

The memory system 100 includes at least one host device 106 connected to the memory device 200. Multiple host devices may be used and may comprise a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. "Computer" refers to any computing device. Examples of a computer include, but are not limited to, a personal computer, a laptop, a tablet, a desktop, a server, a main frame, a supercomputer, a computing node, a virtual computer, a hand held device, a smart phone, a cell phone, a system on a chip, a single chip computer, and the like. In another embodiment, a host device 106 may be a client and the memory device 200 may operate autonomously to service data requests sent from the host device 106. In this embodiment, the host device 106 and memory device 200 may be connected using a computer network, system bus, DAS or other communication means suitable for connection between a computer and an autonomous memory device 200.

The illustrative example shown in FIG. 1, the memory system 100 includes a user application 108 in communication with a storage client 110 as part of the host device 106. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

In various embodiments, the user application 108 may be a software application operating on or in conjunction with the storage client 110. The storage client 110 manages files and data and utilizes the functions and features of the storage controller 102 and associated memory dies 104. "File" refers to a unitary data structure for storing, retrieving, and communicating data and/or instructions. A file is distinguished from other types of packaging by having associated management metadata utilized by the operating system to identify, characterize, and access the file. Representative examples of storage clients include, but are not limited to, a server, a file system, an operating system, a database management system ("DBMS"), a volume manager, and the like. The storage client 110 may be in communication with the storage controller 102 within the memory device 200.

In various embodiments, the memory system 100 may include one or more clients connected to one or more host device 112 through one or more computer networks 114. A host device 112 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 114 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 114 may also include a network from the IEEE 802 family of network technologies, such Ethernet, token ring, Wi-Fi, WiMax, and the like.

The computer network 114 may include servers, switches, routers, cabling, radios, and other equipment used to facilitate networking the host device 106 or host devices and host devices 112 or clients. In some embodiments, the memory system 100 may include one or more host devices 112 and host device 106 that communicate as peers over a computer network 114. In other embodiments, the memory system 100 may include multiple memory devices 200 that communicate as peers over a computer network 114. One of skill in the art will recognize other computer networks comprising one or more computer networks and related equipment with single or redundant connection(s) between one or more clients or other computer with one or more memory devices 200 or one or more memory devices 200 connected to one or more host devices. In one embodiment, the memory system 100 may include two or more memory devices 200 connected through the computer network 114 to a host device 112 without a host device 106.

In some embodiments, the storage client 110 communicates with the storage controller 102 through a host device interface comprising an Input/Output (I/O) interface. "Interface" refers to a protocol and associated circuits, circuitry, components, devices, systems, sub-systems, and the like that enable one device, component, or apparatus to interact and/or communicate with another device, component, or apparatus. For example, the memory device 200 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. A sector of data is typically 512 bytes, corresponding to the size of a sector in magnetic disk drives.

In various embodiments number of sectors form a block (or data block), anywhere from 8 sectors, which is 4 KB, for example, up to 32, 64, 128 or more sectors. Different sized blocks and sectors can also be used. In certain storage systems, such as those interfacing with the Windows® operating systems, the data blocks may be referred to as clusters. In other storage systems, such as those interfacing with UNIX, Linux, or similar operating systems, the data blocks may be referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die(s) 104. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

Management of a data block by a storage manager may include specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition. In conventional block storage devices, a logical address, also referred to as a logical block address (LBA), maps directly to a particular data block on physical storage media. In conventional block storage devices, each data block maps to a particular set of physical sectors on the physical storage media.

However, certain storage devices need not directly or necessarily associate logical addresses with particular physical data blocks. These storage devices may emulate a conventional block storage interface to maintain compatibility with a block storage client 110.

In some embodiments, the storage controller 102 may provide a block I/O emulation layer, which serves as a block device interface, or API. In these embodiments, the storage client 110 communicates with the storage device through this block device interface. The block I/O emulation layer may receive commands and logical addresses from the storage client 110 in accordance with this block device interface. As a result, the block I/O emulation layer may provide the storage device compatibility with a block storage client 110.

In some embodiments, a storage client 110 communicates with the storage controller 102 through a host device interface comprising a direct interface. In these embodiments, the memory device 200 directly exchanges information specific to non-volatile storage devices. Memory device 200 using direct interface may store data in the memory die(s) 104 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die(s) 104.

The storage controller 102 may receive a logical address and a command from the storage client 110 and perform the corresponding operation in relation to the memory die(s) 104. The storage controller 102 may support block I/O emulation, a direct interface, or both.

Figure 2A:
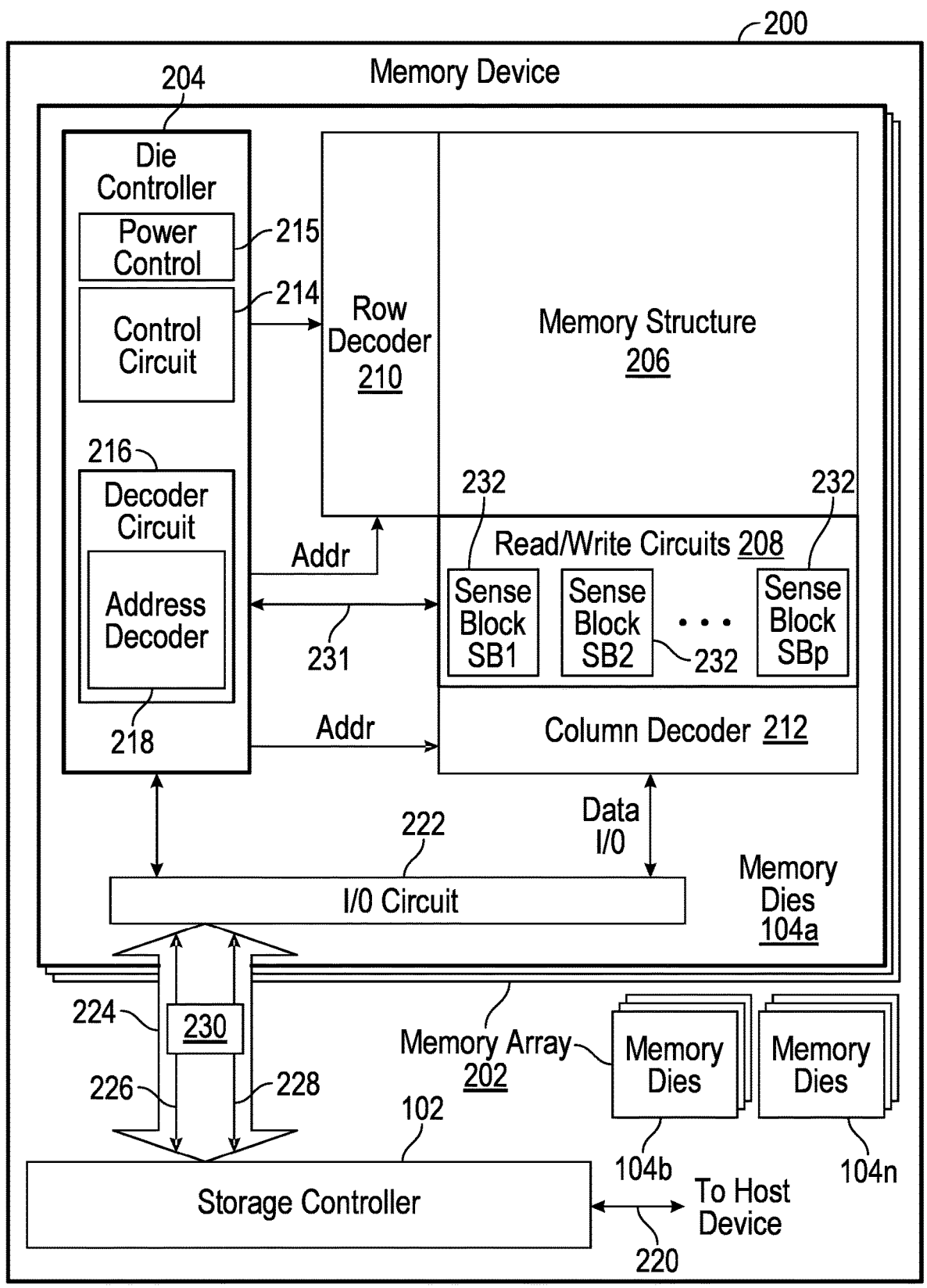
FIG. 2A is a block diagram of an example memory device, in connection with which, example embodiments of the disclosed technology can be implemented.

FIG. 2A is a functional block diagram of an example memory device 200. The components depicted in FIG. 2A are electrical circuits.

The memory device 200 may include a storage controller 102 and a memory array 202 comprised of a number of memory dies 104*a-n*, the storage controller 102 and memory dies 104*a-n* being effectively as described with regard to FIG. 1. Each memory die 104*a-n* can be a complete memory die or a partial memory die and may include a die controller 204, at least one memory structure 206, and read/write circuits 208. The following description will be made with reference to memory die 104*a* as an example of memory dies 104*a-n*, where each memory die may include same or similar components and function in the same or similar way. Thus, while reference herein is made to memory die 104*a*, the same description may be applied equally to memory dies 104*b-n*.

In this context, "memory array" refers to a set of memory cells (also referred to as storage cells) organized into an array structure having rows and columns. A memory array is addressable using a row identifier and a column identifier, each represented as part of an address, such as a column or row address. A non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

In the context of FIG. 2A, memory structure 206 may be addressable by wordlines via a row decoder 210 and by bitlines via a column decoder 212. The read/write circuits 208 include multiple sense blocks 232 including SB1, SB2, . . . , SBp (sensing circuitry) and allow a pages of memory cells to be read or programmed in parallel. Also, many strings of memory cells can be erased in parallel.

"Circuitry", as used herein, refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

A physical page may include memory cells along a row of the memory array for a single plane or for a single memory die. In some embodiments, each memory die 104a-n includes a memory array made up of two equal sized planes. A plane is a division of the memory array that permits certain storage operations to be performed on both places using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

The memory structure 206 can be two-dimensional (2D—laid out in a single fabrication plane) or three-dimensional (3D—laid out in multiple fabrication planes). The non-volatile memory array 202 may comprise one or more arrays of memory cells including a 3D array. In one embodiment, the non-volatile memory array 202 may comprise a monolithic three-dimensional memory structure (3D array) in which multiple memory levels are formed above (and not in) a single substrate, such as a wafer, with no intervening substrates. The non-volatile memory array 202 may comprise any type of non-volatile memory that is monolithically formed in one or more physical levels of arrays of memory cells having an active area disposed above a silicon substrate. The non-volatile memory array 202 may be in a non-volatile solid state drive having circuitry associated with the operation of the memory cells, whether the associated circuitry is above or within the substrate. Word lines may comprise sections of the layers containing memory cells, disposed in layers above the substrate. Multiple word lines may be formed on single layer by means of trenches or other non-conductive isolating features.

The die controller 204 (also referred to as a die control circuitry) cooperates with the read/write circuits 208 to perform memory operations on memory cells of the non-volatile memory array 202 and includes a control circuit 214 (also referred to as a state machine), a decoder circuit 216 that may incorporate an address decoder 218, and a power control circuit 215. The control circuit 214 provides chip-level control of memory operations on the memory die 104a. The die controller 204 may also include power control circuit 215 that controls the power and voltages supplied to the wordlines, bitlines, and select lines during memory operations. The power control circuit 215 may include voltage circuitry, in one embodiment. Power control circuit 215 may include charge pumps for creating voltages. The sense blocks 232 include bitline drivers. The power control circuit 215 executes under control of the control circuit 214, in various embodiments.

"Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components. In one example, the die controller may include buffers such as registers, read-only memory (ROM) fuses and other storage devices for storing default values such as base voltages and other parameters.

"Control circuit" refers to a device, component, element, module, system, sub-system, circuitry, logic, hardware, or circuit configured and/or operational to manage one or more other circuits. For example, a controller programmed by firmware to perform the functions described herein is one example of a control circuit. A control circuit can include a processor, a PGA (Programmable Gate Array), an FPGA (Field Programmable Gate Array), an ASIC (Application Specific Integrated Circuit), or another type of integrated circuit or circuit more generally. In certain embodiments, a control circuit is responsible to ensure that primary features and functionality of a larger circuit, die, or chip, that includes the control circuit, perform properly. The address decoder 218 provides an address interface between that used by the host or a storage controller 102 to the hardware address used by the row decoder 210 and column decoder 212. Power control circuit 215 controls the power and voltages supplied to the wordlines, bitlines, and select lines during memory operations. The power control circuit 215 includes voltage circuitry, in one embodiment. The power control circuit 215 executes under control of the control circuit 214, in one embodiment.

Commands and data are transferred between the host device and storage controller 102 via a data bus 220, and between the storage controller 102 and an input/output (IO) circuit 222 on each of the memory dies 104a-n via a memory interface 224. The memory interface 224 may be a type of communication bus, comprising a control bus 226 and a data bus 228 (also referred to herein as I/O data bus), over which fixed length command sequences 230 may be transmitted. The command bus may comprise, for example but not limited to, a command bus over which commands are transmitted to the memory die 104a and an address bus over which addresses are transmitted to the memory die 104*a*. "Memory interface" refers to an interface between a memory die and a storage controller. Examples of memory interface that may be used in connection with the disclosed solution include Toggle Mode ("TM"), Toggle NAND 2.0, Open NAND Flash Interface (ONFI) NAND, a vendor specific interface, a proprietary interface, and the like. In the depicted embodiment, the memory interface 224 is a proprietary interface configured to transfer fixed length command sequences 230.

"Communication bus" refers to hardware, software, firmware, logic, control line(s), and one or more associated communication protocols, that are configured to enable a sender to send data to a receiver. A communication bus may include a data bus and/or a control bus.

"Firmware" refers to logic embodied as processor-executable instructions stored on volatile memory media and/or non-volatile memory media.

"Data bus" refers to a communication bus used to exchange one or more of data bits between two electronic circuits, components, chips, die, and/or systems. A data bus may include one or more signal/control lines. A sender, such as a controller, may send data signals over one or more control lines of the data bus in parallel (operating as a parallel bus) or in series (operating as a serial bus). A data bus may include the hardware, control line(s), software, firmware, logic, and/or the communication protocol used to operate the data bus.

Examples data buses may include 8-bit buses having 8 control lines, 16-bit buses having 16 control lines, 32-bit buses having 32 control lines, 64-bit buses having 64 control lines, and the like. Control lines may carry exclusively communication data, exclusively address data, exclusively control data, or any combination of these types of data.

In various embodiments, a single data bus may be shared by a plurality of components, such as memory die. When multiple chips or memory dies share a data bus, that data may be accessed or transferred by a single memory die or by all the memory dies in parallel based on signals on a chip enable control line.

A data bus may operate, and be configured, according to an industry standard or based on a proprietary protocol and design. Multiple control line of a data bus may be used in parallel and may latch data into latches of a destination component according to a clocking signal, data strobe signal ("DOS"), or clock, such as strobe signal. In certain embodiments, a control bus and a data bus together may form a communication bus between a sender and a receiver.

"Control bus" refers to a communication bus used to exchange one or more of data, address information, control signals, clock signals, and the like, between two electronic circuits, components, chips, die, and/or systems. A control bus may comprise 1 or more control lines, be configured to operate as a parallel bus or a serial bus, and may include the hardware, control line(s), software, firmware, logic, and/or the communication protocol used to operate the control bus. Typically, a control bus sends control signals to one or more memory die to manage operations on the memory die.

In certain embodiments, the control bus sends control signals such as, for example, one or more of, a write enable ("WEn"), chip enable ("CEn"), read enable ("REn"), a clock signal, strobe signal ("DOS"), command latch enable ("CLE"), address latch enable ("ALE"), and the like.

In certain embodiments, the control bus may not transfer data relating to a storage operation, such as write data or read data. Instead, write data and read data may be transferred over a data bus. In certain embodiments, a control bus and a data bus together may form a communication bus between a sender and a receiver.

The address decoder 218 of the die controller 204 may be coupled to the memory structure 206 in order to identify a location within the memory structure 206 for a storage command. In particular, the address decoder 218 determines a row identifier and a column identifier which together identifies the location within the memory structure 206 that applies to a storage command associated with a command address. The storage command and command address are received in a fixed length command sequence.

The input/output (IO) circuit 222 may be coupled, through the memory interface 224 and to the memory interface circuit 234 of the storage controller 102, to a data bus 220 in order to receive a fixed length command sequence 230. The decoder circuit 216 of the die controller 204 may be coupled through the input/output (IO) circuit 222 to a control bus 226 to receive fixed length command sequences 230 over the data bus 220 via memory interface circuit 234. In one embodiment, the data bus 220 may comprise eight control lines, each configured to transfer one bit in parallel across the data bus 220.

The decoder circuit 216 may decode a command address and a storage command from a fixed length command sequence. The control circuit 214 of the die controller 204 may be coupled to the input/output (IO) circuit 222 and decoder circuit 216 and may generate control signals 231 to execute storage commands decoded by the decoder circuit 216. "Control signal" refers to an electrical signal (wired or wireless) sent from one device, component, manager, or controller to another device, component, manager, or controller configured to act in response to the control signal.

The read/write circuits 208 may be coupled to the non-volatile memory array 202 and the control circuit 214 in order to transfer data between the non-volatile memory array 202 and the input/output (IO) circuit 222 in response to the storage commands.

In some implementations, some of the components can be combined. In various designs, one or more of the components (alone or in combination), other than memory structure 206, can be thought of as at least one control circuit or storage controller which is configured to perform the techniques described herein. For example, a control circuit may include any one of, or a combination of, storage controller 102, die controller 204, read/write circuits 208, column decoder 212, control circuit 214, decoder circuit 216, address decoder 218, sense blocks SB1, SB2, . . . , SBp, and so forth.

Associated circuitry may be required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

In various embodiments, memory structure 206 comprises a three-dimensional (3D) memory array of non-volatile memory cells in which multiple memory levels are formed above a single substrate, such as a wafer. The memory structure may comprise any type of non-volatile memory monolithically formed in one or more physical levels of arrays of memory cells having an active area disposed above a silicon (or other type of) substrate. In one example, the non-volatile memory cells comprise vertical NAND strings with charge-trapping material. In another embodiment, memory structure 206 comprises a two-dimensional (2D) memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 206 is not limited to the examples above. Many different types of memory array architectures or memory technologies can be used to form memory structure 206. No particular non-volatile memory technology is required for purposes of the new claimed embodiments proposed herein. Other examples of suitable technologies for memory cells of the memory structure 206 include resistive random access memory (ReRAM) memories, magnetoresistive RAM (MRAM) memory (e.g., MRAM, Spin Transfer Torque MRAM, Spin Orbit Torque MRAM), phase change memory (PCM), and the like. Examples of suitable technologies for memory cell architectures of the memory structure 206 include 2D arrays, 3D arrays, cross-point arrays, stacked 2D arrays, vertical bitline arrays, and the like.

Cross point memory—one example of a ReRAM or PCM RAM—includes reversible resistance-switching elements arranged in cross point arrays accessed by X lines and Y lines (e.g., wordlines and bitlines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one that is relatively inert (e.g., tungsten) and the other of which is electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

MRAM stores data within magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device can be built from a grid of such memory cells. In one embodiment for programming, each memory cell lies between a pair of write lines arranged at right angles to each other, parallel to the cell, one above and one below the cell. When current is passed through them, an induced magnetic field is created.

PCM exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). As such, the programming doses are laser pulses. The memory cells can be inhibited by blocking the memory cells from receiving the light. Note that the use of "pulse" in this document does not require a square pulse, but also includes a continuous (or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 2B:
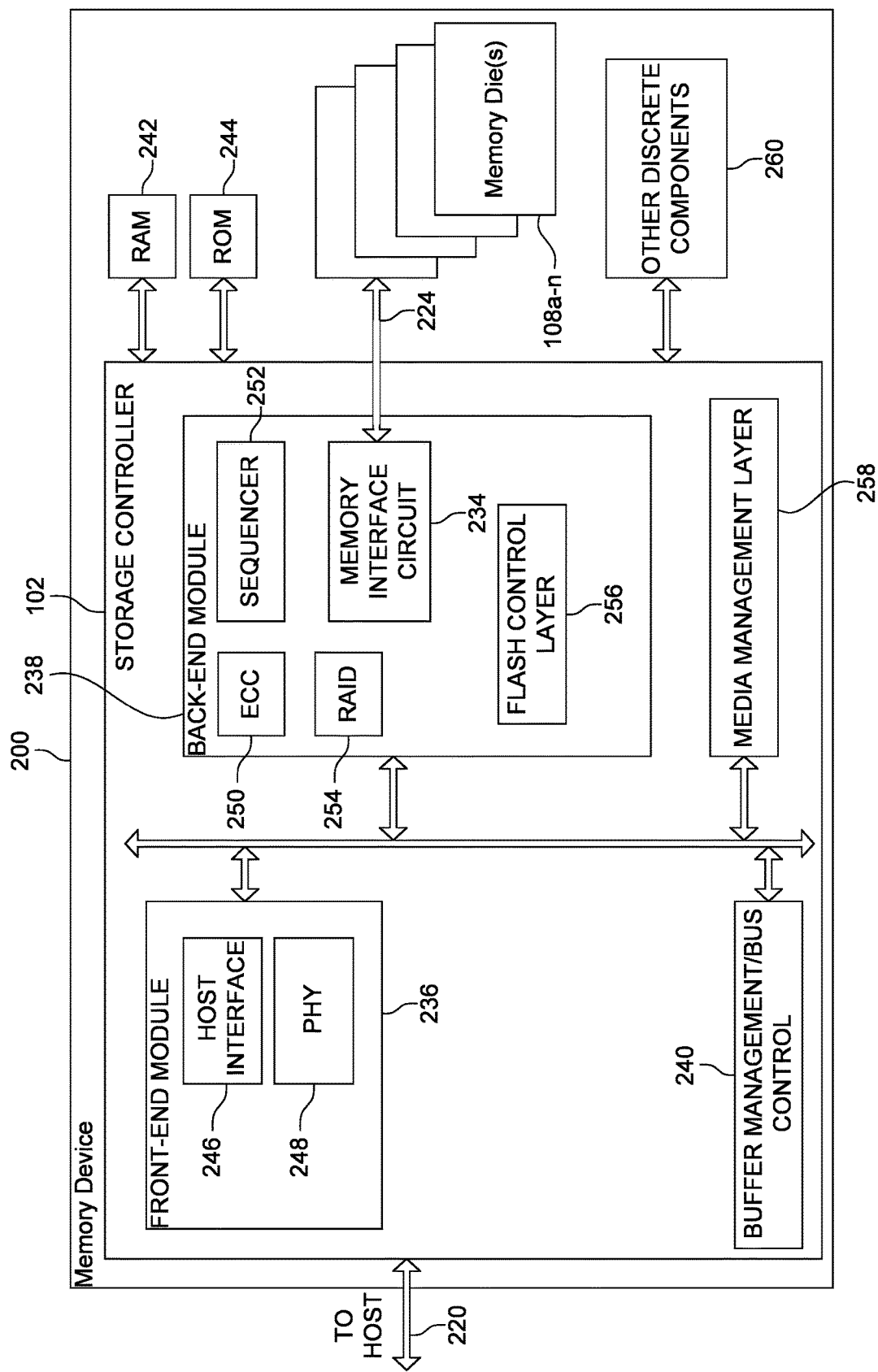
FIG. 2B is a block diagram of an example memory device that depicts more details of an example controller, in connection with which, example embodiments of the disclosed technology can be implemented.

FIG. 2B is a block diagram of example memory device 200 that depicts more details of one embodiment of controller 102. While the storage controller 102 in the embodiment of FIG. 2B is a flash memory controller, it should be appreciated that memory device 200 is not limited to flash memory. Thus, the storage controller 102 is not limited to the particular example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In an example operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host itself can provide the physical address. The flash memory controller can also perform various memory management functions including, but not limited to, wear leveling (distributing writes to avoid wearing out specific blocks of memory that would otherwise be repeatedly written to) and garbage collection (after a block is full, moving only the valid pages of data to a new block, so that the full block can be erased and reused).

The interface between storage controller 102 and memory dies 104 may be any suitable flash interface, such as Toggle Mode 200, 400, or 800. In one embodiment, memory device 200 may be a card-based system, such as a secure digital (SD) or a micro secure digital (micro-SD) card. In an alternate embodiment, memory system 100 may be part of an embedded memory system. For example, the flash memory may be embedded within the host. In other examples, memory device 200 can be a solid state drive (SSD).

In some embodiments, memory device 200 includes a single channel between storage controller 102 and memory die 108. However, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if only a single channel is shown in the drawings.

As depicted in FIG. 2B, storage controller 102 includes a front-end module 236 that interfaces with a host, a back-end module 238 that interfaces with the memory die 108, and various other modules that perform functions which will now be described in detail. The components of storage controller 102 depicted in FIG. 2B may take various forms including, without limitation, a packaged functional hardware unit (e.g., an electrical circuit) designed for use with other components, a portion of a program code (e.g., software or firmware) executable by a (micro) processor or processing circuitry that usually performs a particular function of related functions, a self-contained hardware or software component that interfaces with a larger system, or the like. For example, each module may include an ASIC, an FPGA, a digital logic circuit, an analog circuit, a combination of discrete circuits, gates, or any other type of hardware or combination thereof. Alternatively or additionally, each module may include software stored in a processor readable device (e.g., memory) to program a processor to enable storage controller 102 to perform the functions described herein.

Referring again to modules of the storage controller 102, a buffer manager/bus control 240 manages buffers in RAM 242 and controls the internal bus arbitration of storage controller 102. ROM 244 stores system boot code. Although illustrated in FIG. 2B as located separately from the storage controller 102, in other embodiments, one or both of RAM 242 and ROM 244 may be located within the storage controller 102. In yet other embodiments, portions of RAM 242 and ROM 244 may be located within the storage controller 102, while other portions may be located outside the controller. Further, in some implementations, the storage controller 102, RAM 242, and ROM 244 may be located on separate semiconductor dies.

Front-end module 236 includes a host interface 246 and a physical layer interface (PHY) 248 that provide the electrical host interface via bus 220 with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back-end module 238 includes an error correction code (ECC) engine 250 that encodes the data bytes received from the host, and decodes and error corrects the data bytes read from the memory dies 104. A command sequencer 252 generates command sequences, such as program and erase command sequences, to be transmitted to memory dies 104. A RAID (Redundant Array of Independent Dies) module 254 manages generation of RAID parity and recovery of failed data. The RAID parity may be used as an additional level of integrity protection for the data being written into the memory device 200. In some cases, the RAID module 254 may be a part of the ECC engine 250. Note that the RAID parity may be added as one or more extra dies, or may be added within the existing die, e.g., as an extra plane, an extra block, or extra WLs within a block. As described above in connection with FIG. 2A, the memory interface circuit 234 provides command sequences 230 to memory die 104 and receives status information from memory die 104, via memory interface 224. A flash control layer 256 controls the overall operation of back-end module 238.

Additional components of memory device 200 illustrated in FIG. 2B include media management layer (MML) 258, which performs wear leveling of memory cells of memory dies 104, as well as, other discrete components 260, such as external electrical interfaces, external RAM, resistors, capacitors, or other components that may interface with storage controller 102. In alternative embodiments, one or more of the physical layer interface 248, RAID module 254, MML 258, or buffer management/bus controller 240 are optional components.

MML 258 (e.g., Flash Translation Layer (FTL)) may be integrated as part of the flash management for handling flash errors and interfacing with the host. In particular, MML 258 may be a module in flash management and may be responsible for the internals of NAND management. In particular, MML 258 may include an algorithm in the memory device firmware which translates writes from the host into writes to the memory structure 205 of each memory die 104. MML 258 may be needed because: 1) the memory structure 206 may have limited endurance; 2) the memory structure 206 may only be written in multiples of pages; and/or 3) the memory structure 206 may not be written unless it is erased as a block (or a tier within a block in some embodiments). MML 258 understands these potential limitations of the memory structure 206 which may not be visible to the host. Accordingly, MML 258 attempts to translate the writes from host into writes into the memory structure 206.

Storage controller 102 may interface with one or more memory dies 104. In one embodiment, storage controller 102 and multiple memory dies (together comprising non-volatile storage system 100) implement an SSD, which can emulate, replace, or be used in place of a hard disk drive inside a host, as a network access storage (NAS) device, in a laptop, in a tablet, in a server, etc. Additionally, the SSD need not be made to work as a hard drive.

Some embodiments of the memory device 200 may include one memory dies 104 connected to one storage controller 102. Other embodiments may include multiple memory dies 104 in communication with one or more controllers 102. In one example, the multiple memory dies 104 can be grouped into a set of memory packages. Each memory package may include one or more memory dies 104 in communication with storage controller 102. In one embodiment, a memory package includes a printed circuit board (or similar structure) with one or more memory dies 104 mounted thereon. In some embodiments, a memory package can include molding material to encase the memory dies 104 of the memory package. In some embodiments, storage controller 102 is physically separate from any of the memory packages.

Figure 3:
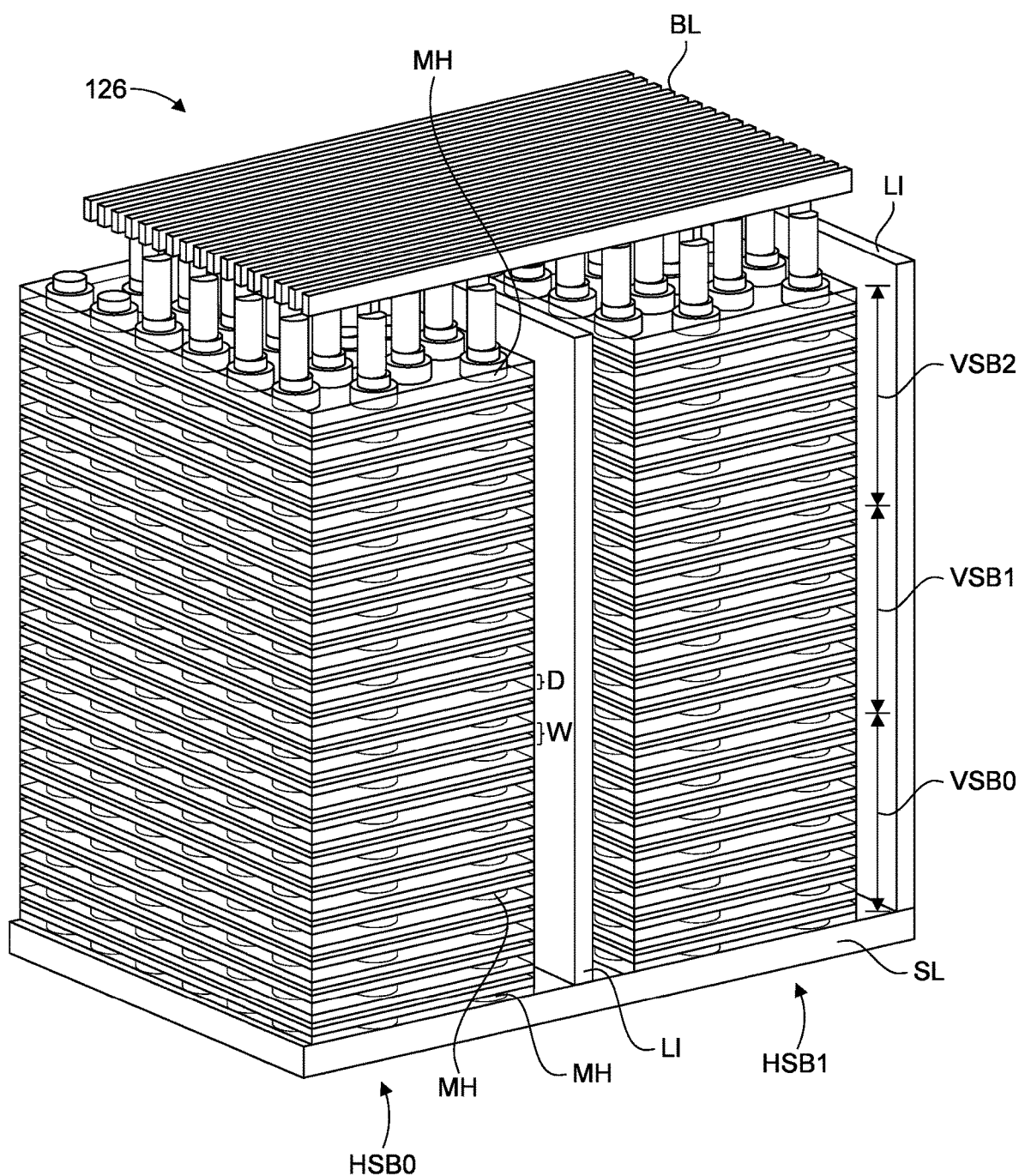
FIG. 3 is a perspective view of a portion of an example monolithic three-dimensional memory structure, in connection with which, example embodiments of the disclosed technology can be implemented.

FIG. 3 is a perspective view of a portion of a monolithic 3D memory array that includes a plurality of non-volatile memory cells, and that can comprise memory structure 206 in one embodiment. FIG. 3 illustrates, for example, a portion of one block of memory. The structure depicted includes a set of bitlines (BLs) positioned above a stack of alternating dielectric layers and conductive layers. For example purposes, one of the dielectric layers is marked as D and one of the conductive layers (also called wordline layers) is marked as W. The number of alternating dielectric and conductive layers can vary based on specific implementation requirements. In some embodiments, the 3D memory array includes between 108-300 alternating dielectric and conductive layers. One example embodiment includes 96 data wordline layers, 8 select layers, 6 dummy wordline layers, and 110 dielectric layers. More or less than 108-300 layers can also be used. Data wordline layers include data memory cells. Dummy wordline layers include dummy memory cells. As will be explained below, the alternating dielectric and conductive layers are divided into four "fingers" by local interconnects LI. FIG. 3 shows two fingers and two local interconnects LI. Below the alternating dielectric layers and wordline layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the 3D monolithic memory array that may comprise memory structure 206 is provided below with respect to FIGS. 4A-4H.

One of the local interconnects LI separates the block into two horizontal sub-blocks HSB0, HSB1. The block comprises multiple vertical sub-blocks VSB0, VSB1, VSB2. The vertical sub-blocks VSB0, VSB1, VSB2 can also be referred to as "tiers." Each vertical sub-block extends across the block, in one embodiment. Each horizontal sub-block HSB0, HSB1 in the block is a part of vertical sub-block VSB0. Likewise, each horizontal sub-block HSB0, HSB1 in the block is a part of vertical sub-block VSB1. Likewise, each horizontal sub-block HSB0, HSB1 in the block is a part of vertical sub-block VSB2. For ease of explanation, vertical sub-block VSB0 will be referred to as a lower vertical sub-block, vertical sub-block VSB1 will be referred to as a middle vertical sub-block, and VSB2 will be referred to as an upper vertical sub-block. In one embodiment, there are two vertical sub-blocks in a block. In other embodiments, there could be four or more vertical sub-blocks in a block.

A memory operation for a vertical sub-block may be performed on memory cells in one or more horizontal sub-blocks. For example, a programming operation of memory cells in vertical sub-block VSB0 may include: programming memory cells in horizontal sub-block HSB0 but not horizontal sub-block HSB1; programming memory cells in horizontal sub-block HSB1 but not horizontal sub-block HSB0; or programming memory cells in both horizontal sub-block HSB0 and horizontal sub-block HSB1.

The different vertical sub-blocks VSB0, VSB1, VSB2 are treated as separate units for erase/program purposes, in one embodiment. For example, the memory cells in one vertical sub-block can be erased while leaving valid data in the other vertical sub-blocks. Then, memory cells in the erased vertical sub-block can be programmed while valid data remains in the other vertical sub-blocks. In some cases, memory cells in the middle vertical sub-block VSB1 are programmed while there is valid data in the lower vertical sub-block VSB0 and/or the upper vertical sub-block VSB2. Programming the memory cells in middle vertical sub-block VSB1 may present challenges due to the valid data in the other vertical sub-blocks VSB0, VSB2.

Figure 4A:
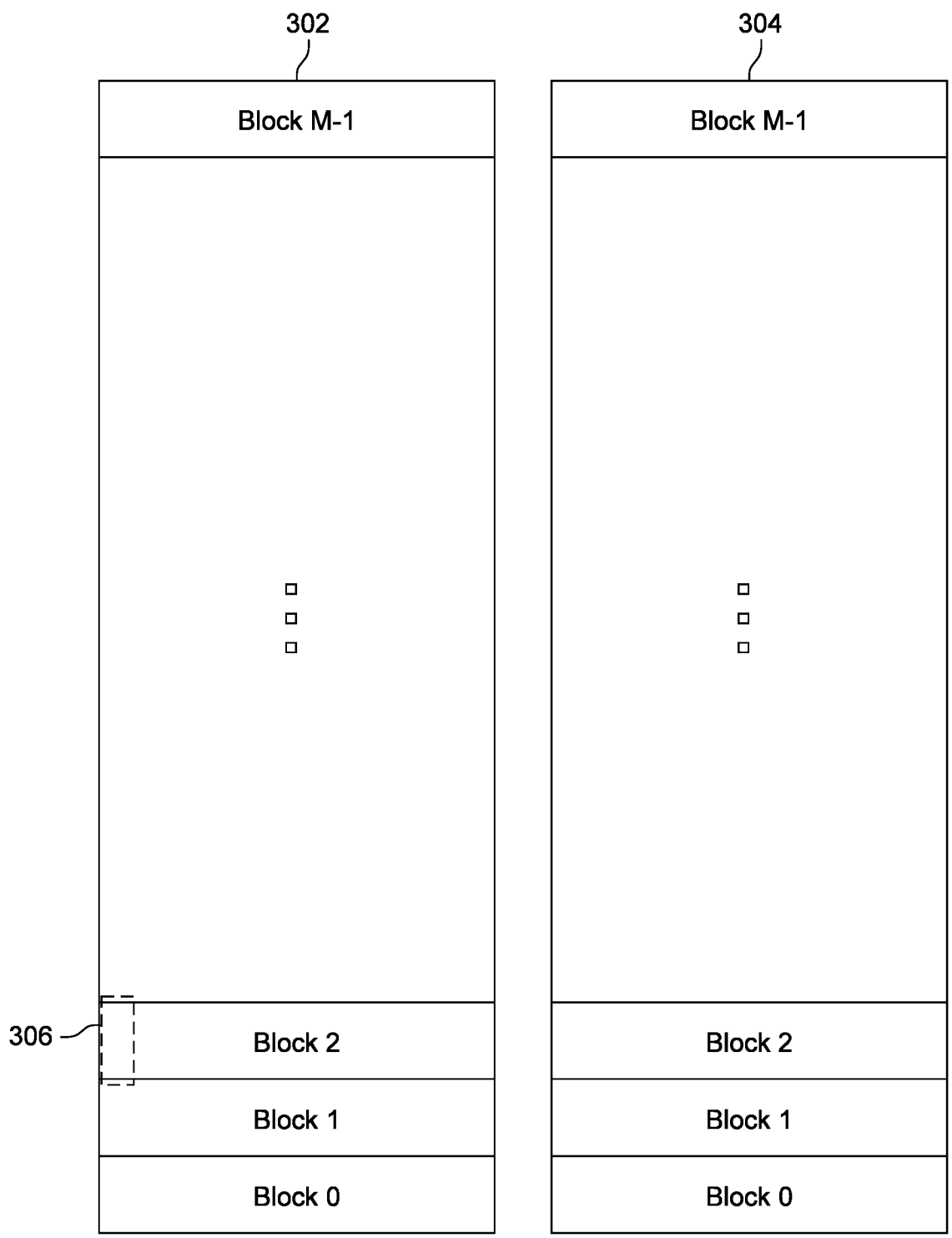
FIG. 4A is a block diagram of an example memory structure having two planes, in connection with which, example embodiments of the disclosed technology can be implemented.

FIG. 4A is a block diagram depicting one example organization of memory structure 206, which is divided into two planes 302 and 304. Each plane is then divided into M blocks. In one example, each plane has about 2000 blocks. However, different numbers of blocks and planes can also be used. In one embodiment, a block of memory cells constitutes a single unit for an erase operation. That is, in one embodiment, all memory cells of a block are erased together. In other embodiments, memory cells can be grouped into blocks for other reasons, such as to organize the memory structure 206 to enable the signaling and selection circuits. In some embodiments, a block represents a groups of connected memory cells that share a common set of wordlines.

Figure 4B:
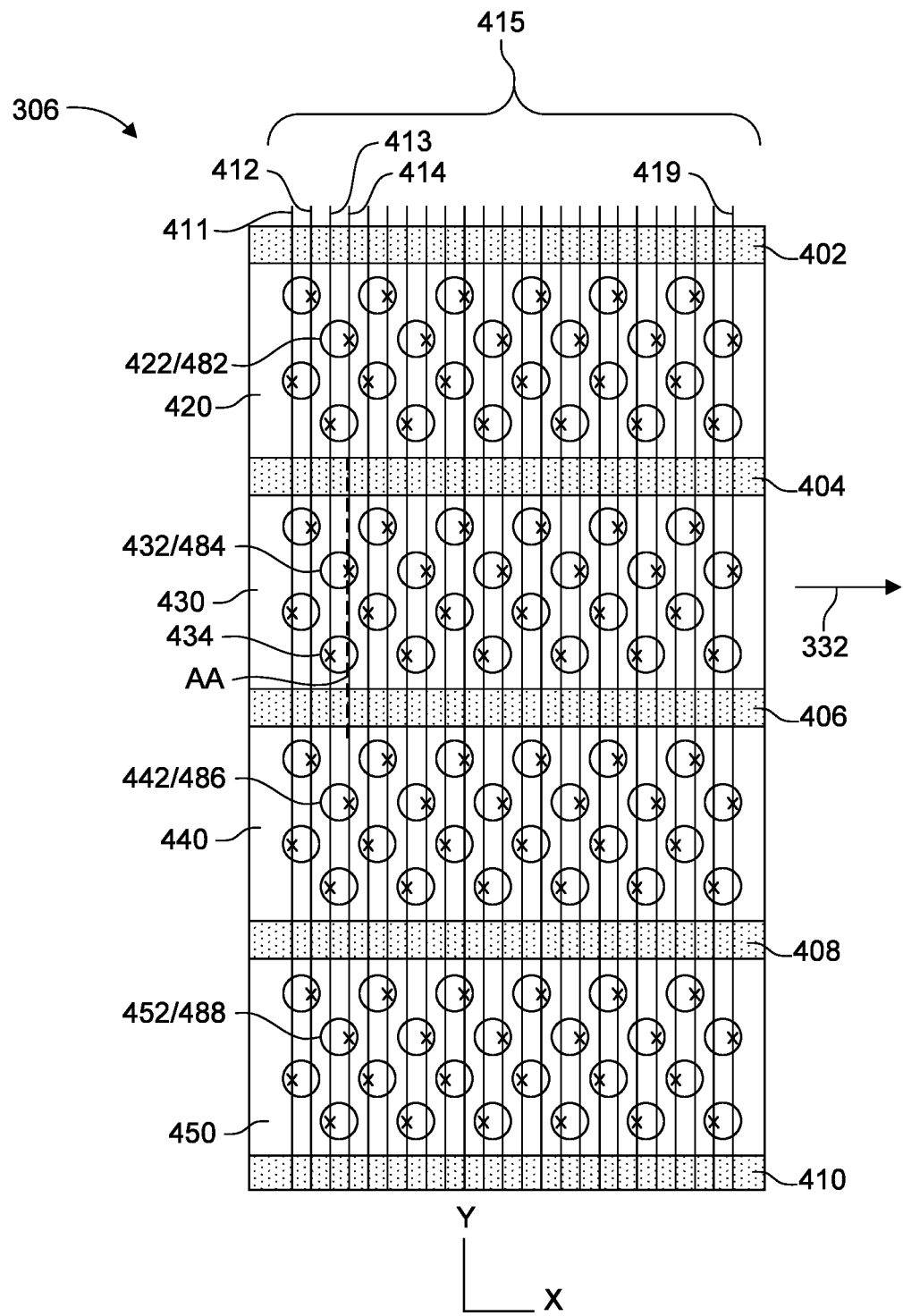
FIG. 4B depicts a top view of a portion of a block of example memory cells, in connection with which, example embodiments of the disclosed technology can be implemented.

FIGS. 4B-4F depict an example 3D NAND structure that corresponds to the structure of FIG. 3 and that can be used to implement memory structure 206 of FIGS. 2A and 2B. Although the example memory system of FIGS. 3-4H is a 3D memory structure that includes vertical NAND strings with charge-trapping material, it should be appreciated that other (2D and 3D) memory structures can also be used with the technology described herein. FIG. 4B is a block diagram depicting a top view of a portion of one block from memory structure 206. The portion of the block depicted in FIG. 4B corresponds to portion 306 in block 2 of FIG. 4A. As can be seen from FIG. 4B, the block depicted in FIG. 4B extends in the direction of 332. While in some embodiments, the memory array may have many layers, FIG. 4B illustrates only the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 332, the block includes more vertical columns than depicted in FIG. 4B.

FIG. 4B also depicts a set of bitlines 415, including bitlines 411, 412, 413, 414, . . . 419. FIG. 4B shows twenty-four bitlines because only a portion of the block is depicted. It is contemplated that more than twenty-four bitlines connected to vertical columns of the block. Each of the circles representing vertical columns has an "x" to indicate its connection to one bitline. For example, bitline 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as wordline fingers that are separated by the local interconnects. In one embodiment, the wordline fingers on a common level of a block connect together to form a single wordline. In another embodiment, the wordline fingers on the same level are not connected together. In one example implementation, a bitline only connects to one vertical column in each of regions 420, 430, 440 and 450. In that implementation, each block has sixteen rows of active columns and each bitline connects to four rows in each block. In one embodiment, all of the four rows connected to a common bitline are connected to the same wordline (via different wordline fingers on the same level that are connected together), in which case, the system uses the source side selection lines and the drain side selection lines to choose one (or another subset) of the four to be subjected to a memory operation (program, verify, read, and/or erase).

Although FIG. 4B shows four regions and sixteen rows of vertical columns in a block, with each region having four rows of vertical columns, those exact numbers are an example implementation. Other embodiments may include more or less regions per block, more or less rows of vertical columns per region, and/or more or less rows of vertical columns per block. FIG. 4B also shows the vertical columns being staggered. In other embodiments, different patterns of staggering can be used. In some embodiments, the vertical columns may not be staggered.

Figure 4C:
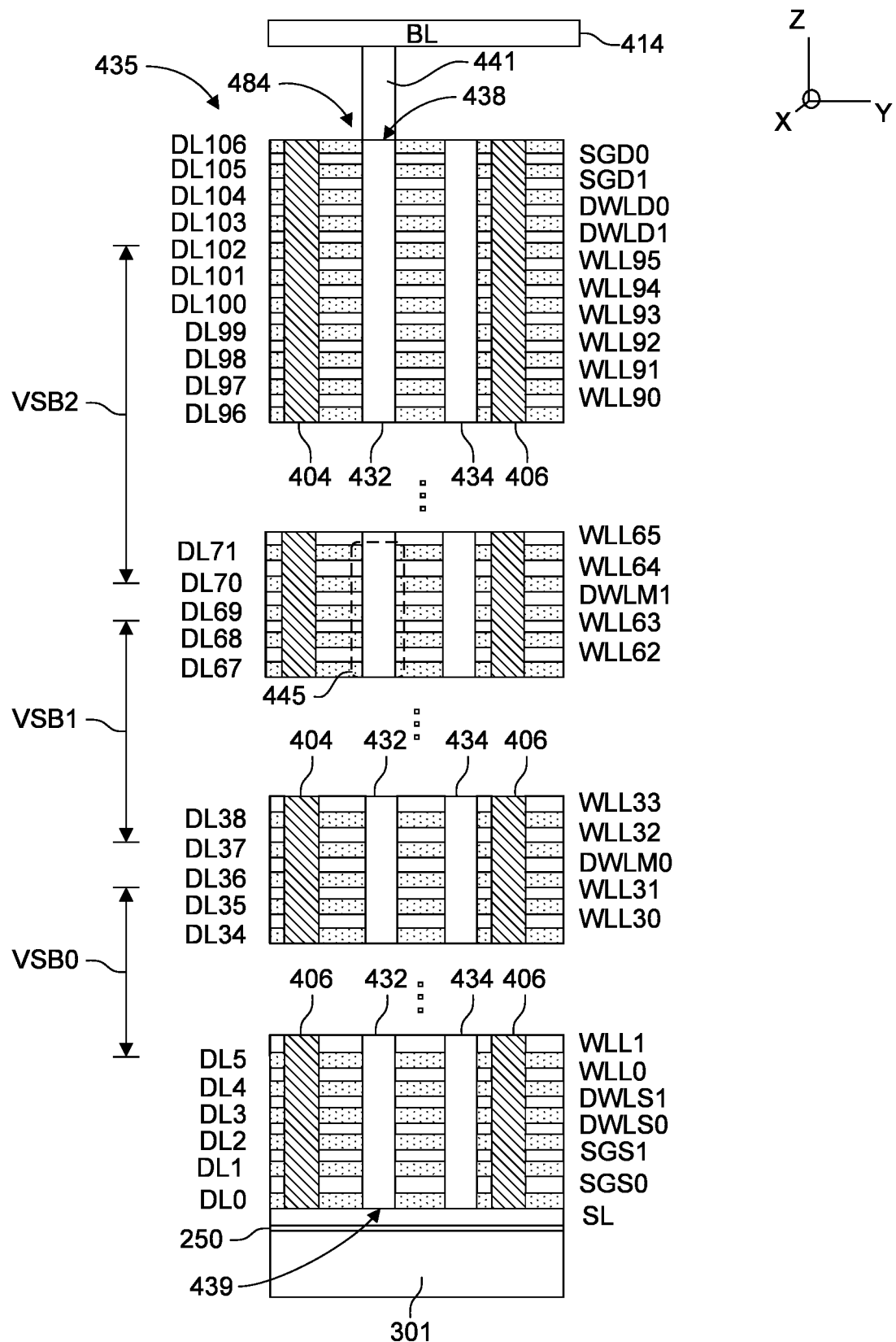
FIG. 4C depicts a stack showing a cross-sectional view along line AA of FIG. 4B.

FIG. 4C depicts an embodiment of a stack 435 showing a cross-sectional view along line AA of FIG. 4B. Two SGD layers (SGD0, SDG1), two SGS layers (SGS0, SGS1) and six dummy wordline layers DWLD0, DWLD1, DWLM1, DWLM0, DWLS0 and DWLS1 are provided, in addition to the data wordline layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 301, an insulating film 250 on the substrate, and a portion of a source line SL. A portion of the bitline 414 is also depicted. Note that NAND string 484 is connected to the bitline 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bitline 414. The metal-filled slits 404 and 406 from FIG. 4B are also depicted.

The stack 435 is divided into three vertical sub-blocks (VSB0, VSB1, VSB2). Vertical sub-block VSB0 includes WLL0-WLL31. Layers SGS0, SGS1, DWLS0, DWLS1 could also be considered to be a part of vertical sub-block VSB0. Vertical sub-block VSB1 includes WLL32-WLL63. Layers SGD0, SGD1, DWLD0, DWLD1 could also be considered to be a part of vertical sub-block VSB2. Vertical sub-block VSB2 includes WLL64-WLL95. Each NAND string has a set of data memory cells in each of the vertical sub-blocks. Dummy wordline layer DMLM0 is between vertical sub-block VSB0 and vertical sub-block VSB1. Dummy wordline layer DMLM1 is between vertical sub-block VSB1 and vertical sub-block VSB2. The dummy wordline layers have dummy memory cell transistors that may be used to electrically isolate a first set of memory cell transistors within the memory string (e.g., corresponding to vertical sub-block VSB0 wordlines WLL0-WLL31) from a second set of memory cell transistors within the memory string (e.g., corresponding to the vertical sub-block VSB1 wordlines WLL32-WLL63) during a memory operation (e.g., an erase operation or a programming operation).

In another embodiment, one or more middle junction transistor layers are used to divide the stack 435 into vertical sub-blocks. A middle junction transistor layer contains junction transistors, which do not necessarily contain a charge storage region. Hence, a junction transistor is typically not considered to be a dummy memory cell. Both a junction transistor and a dummy memory cell may be referred to herein as a "non-data transistor." A non-data transistor, as the term is used herein, is a transistor on a NAND string, where the transistor is either configured to not store user or system data or operated in such a way that the transistor is not used to store user data or system data. A wordline that is connected to non-data transistors is referred to herein as a non-data wordline. Examples of non-data wordlines include, but are not limited to, dummy wordlines, a select line in a middle junction transistor layer, or the like.

The stack 435 may have more than three vertical sub-blocks. For example, the stack 435 may be divided into four, five, or more vertical sub-blocks. Each of the vertical sub-blocks may contain at least one data memory cell. In some embodiments, additional layers similar to the middle dummy wordline layers DWLM may be provided to divide the stack 435 into the additional vertical sub-blocks. In one embodiment, the stack has two vertical sub-blocks.

Figure 4D:
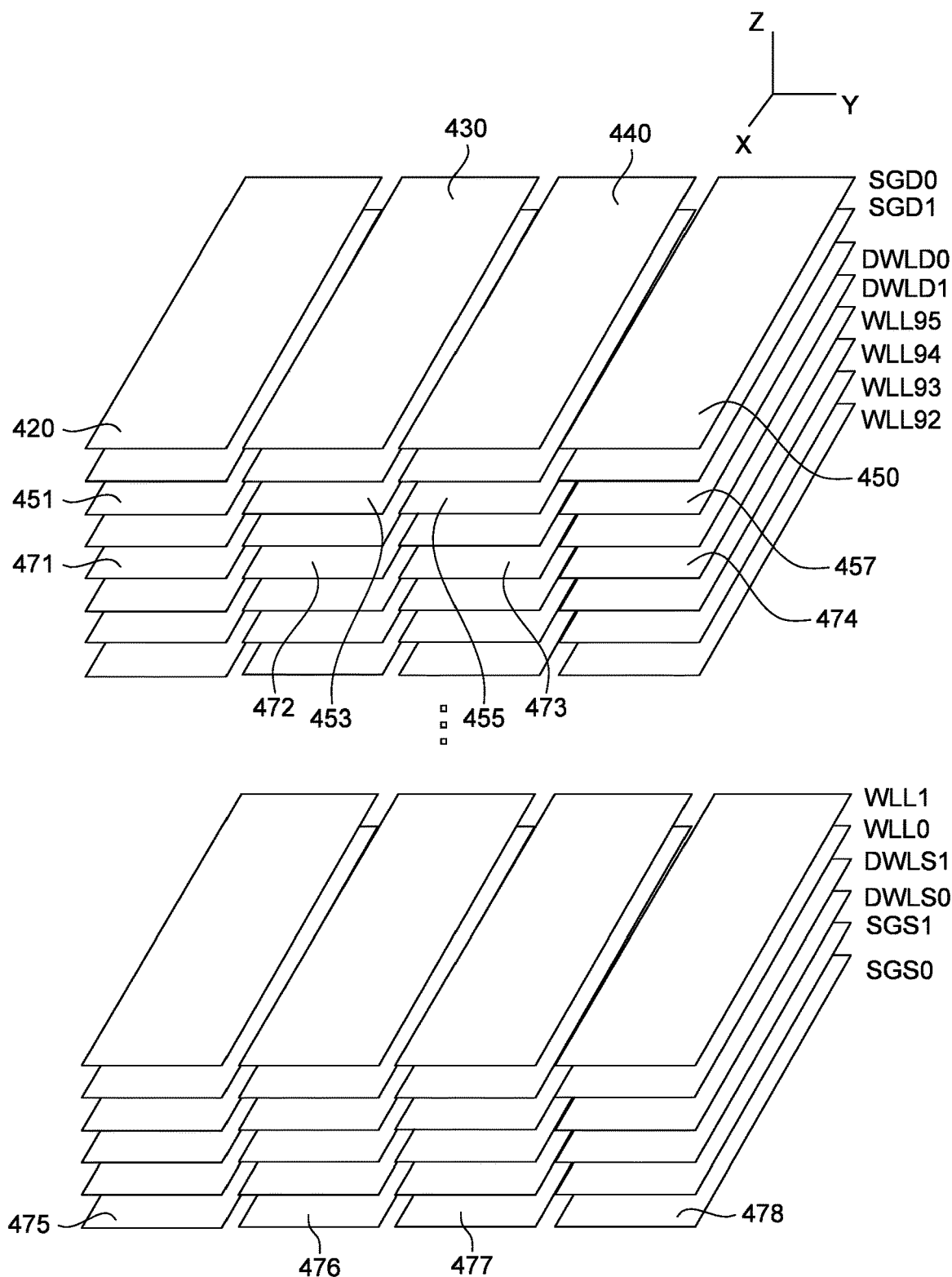
FIG. 4D depicts an alternative view of the select gate layers and wordline layers of the stack of FIG. 4C.

FIG. 4D depicts an alternative view of the SG layers and wordline layers of the stack 435 of FIG. 4C. Each of SGD layers SGD0 and SGD0 (the drain side SG layers) includes parallel rows of SG lines associated with the drain side of a set of NAND strings. For example, SGD0 includes drain side SG regions 420, 430, 440 and 450, consistent with FIG. 4B. Below the SGD layers are the drain side dummy wordline layers. In one implementation, each dummy wordline layer represents a wordline that is connected to a set of dummy memory cells at a given height in the stack. For example, DWLD0 includes wordline layer regions 451, 453, 455 and 457. A dummy memory cell, also referred to herein as a non-data memory cell, does not store data and is ineligible to store data, while a data memory cell is eligible to store data. Moreover, the threshold voltage Vth of a dummy memory cell is generally fixed at the time of manufacture or may be periodically adjusted, while the Vth of the data memory cells changes more frequently, e.g., during erase and programming operations of the data memory cells.

Below the dummy wordline layers are the data wordline layers. For example, WLL95 comprises wordline layer regions 471, 472, 473 and 474. Below the data wordline layers are the source side dummy wordline layers. Below the source side dummy wordline layers are the SGS layers. Each of the SGS layers SGS0 and SGS1 (the source side SG layers) includes parallel rows of SG lines associated with the source side of a set of NAND strings. For example, SGS0 includes source side SG lines 475, 476, 477 and 478. In some embodiments, each SG line is independently controlled, while in other embodiments, the SG lines are connected and commonly controlled.

Figure 4E:
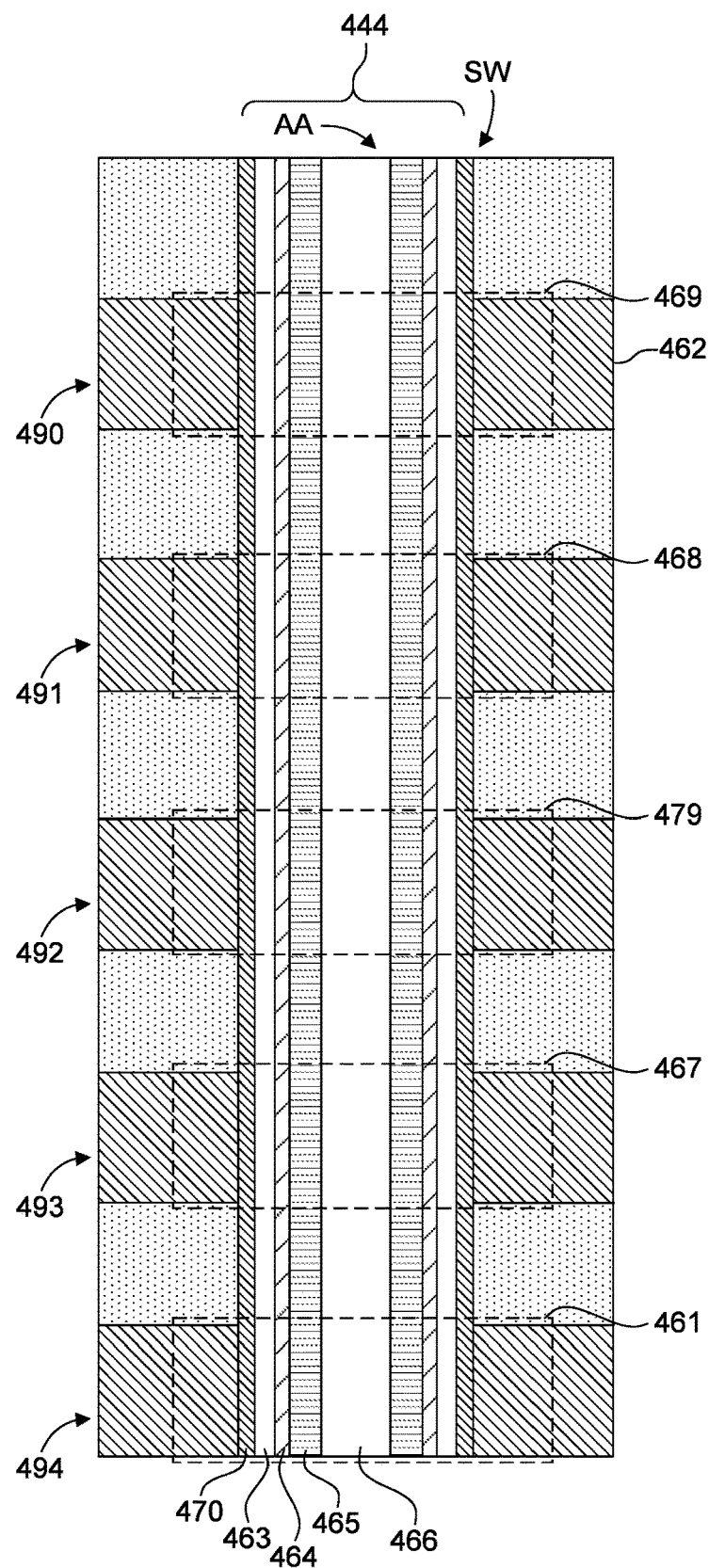
FIG. 4E depicts a view of a region of FIG. 4C.

FIG. 4E depicts a view of the region 445 of FIG. 4C. Data memory cell transistors 469 and 468 are above dummy memory cell transistor 479. Below dummy memory cell transistor 479 are data memory cell transistors 467 and 461. A number of layers can be deposited along the sidewall (SW) of the memory hole 444 and/or within each wordline layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A wordline layer can include a conductive metal 462 such as tungsten as a control gate. For example, control gates 490, 491, 492, 493 and 494 are provided. In this example, all of the layers except the metal are provided in the memory hole. In other approaches, some of the layers may be in the control gate layer. Additional pillars can be similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Non-data transistors (e.g., select transistors, dummy memory cell transistors) may also include the charge trapping layer 463. For example, in FIG. 4E, dummy memory cell transistor 479 includes the charge trapping layer 463. Thus, the Vth of at least some non-data transistors may also be adjusted by storing or removing electrons from the charge trapping layer 463. However, it is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer, and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4F:
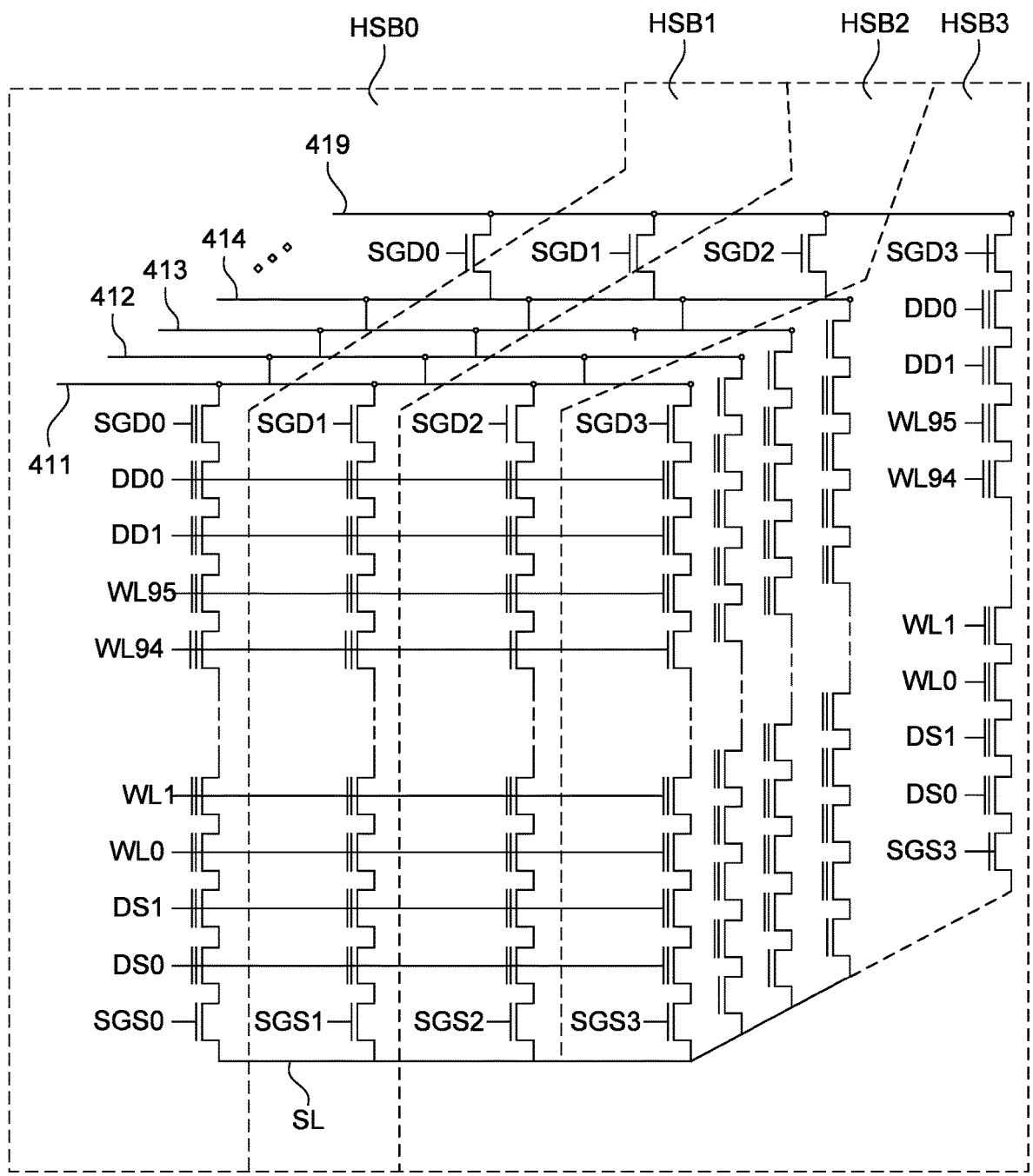
FIG. 4F is a schematic of a plurality of example NAND strings showing multiple horizontal sub-blocks, in connection with which, example embodiments of the disclosed technology can be implemented.

FIG. 4F is a schematic diagram of a portion of the memory depicted in FIGS. 3-4E. FIG. 4F shows physical wordlines WLL0-WLL95 running across the entire block. The structure of FIG. 4F corresponds to portion 306 in Block 2 of FIGS. 4A-E, including bitlines 411, 412, 413, 414, . . . 419. Within the block, each bitline is connected to four NAND strings. Drain side selection lines SGD0, SGD1, SGD2 and SGD3 are used to determine which of the four NAND strings connect to the associated bitline(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, horizontal sub-block HSB1 corresponds to those vertical NAND strings controlled by SGD1 and SGS1, horizontal sub-block HSB2 corresponds to those vertical NAND strings controlled by SGD2 and SGS2, and horizontal sub-block HSB3 corresponds to those vertical NAND strings controlled by SGD3 and SGS3.

Figure 4G:
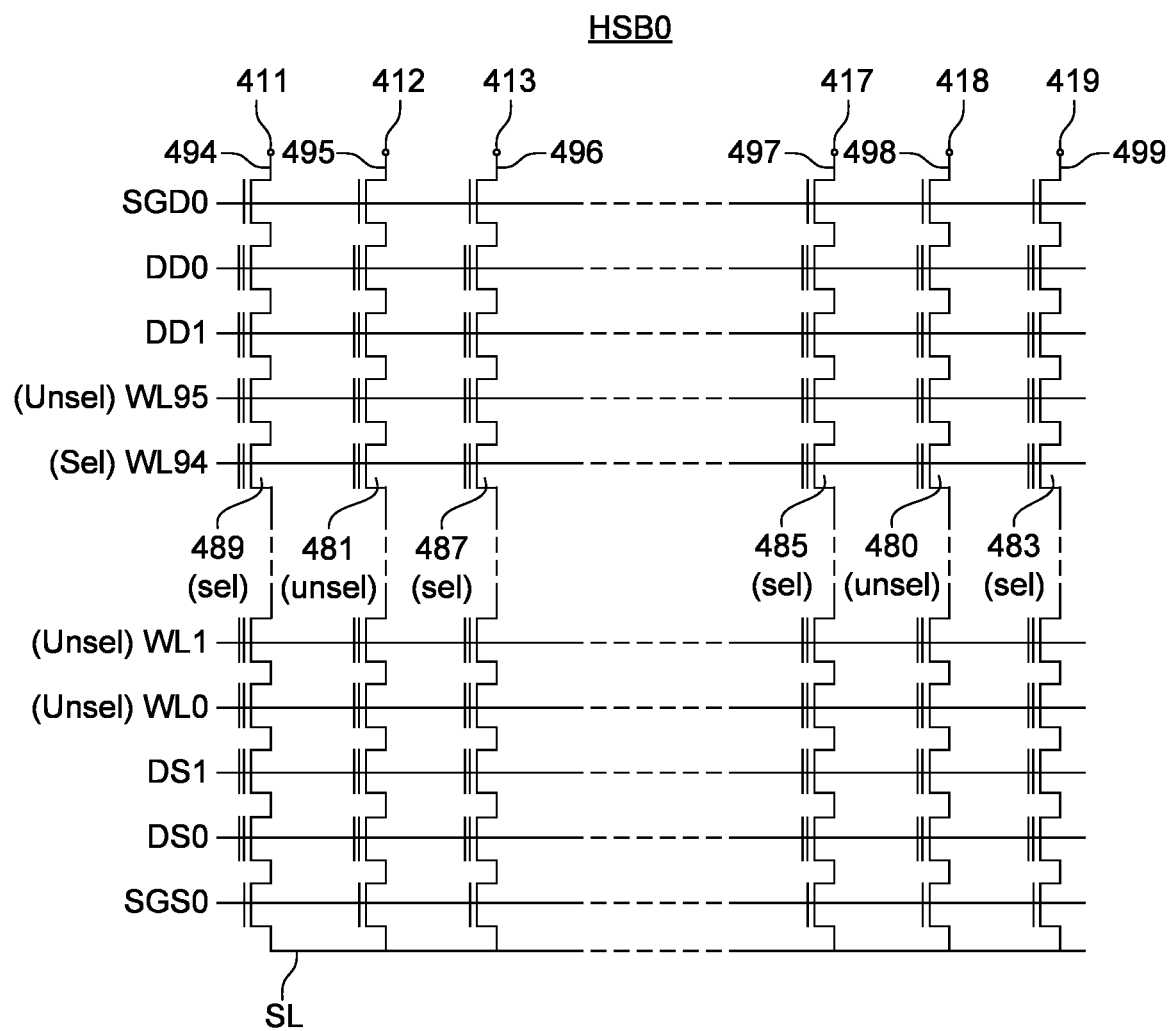
FIG. 4G is a schematic of a plurality of NAND strings showing one example horizontal sub-block, in connection with which, example embodiments of the disclosed technology can be implemented.
Figure 4H:
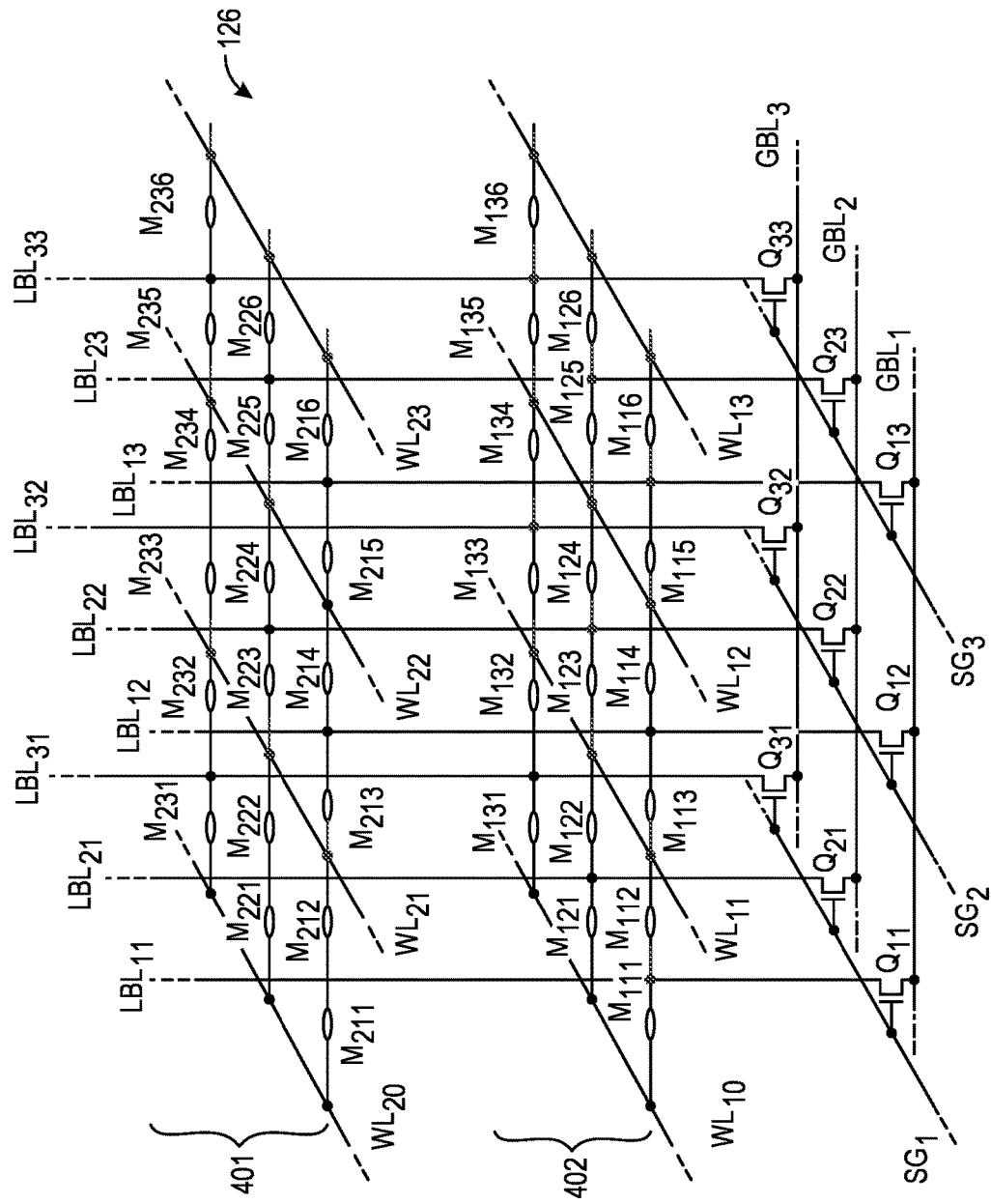
FIG. 4H depicts various embodiments of a portion of a three-dimensional memory array with a vertical cross-point structure, in connection with which, example embodiments of the disclosed technology can be implemented.

FIG. 4G is a schematic of horizontal sub-block HSB0. Horizontal sub-blocks HSB1, HSB2 and HSB3 may have similar structures. FIG. 4G shows physical wordlines WL0-WL95 running across the entire sub-block HSB0. All of the NAND strings of sub-block HSB0 are connected to SGD0 and SGS0. For ease of depiction, FIG. 4G only depicts six NAND strings 494, 495, 496, 497, 498, and 499; however, horizontal sub-block HSB0 may have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells, while the memory cells that are not intended to take on a new electrical characteristic (or other characteristic) to reflect a changed programming state are referred to as the unselected memory cells. In certain situations, unselected memory cells may be connected to the same wordline as selected memory cells. Unselected memory cells may also be connected to different wordlines than selected memory cells. Similarly, during a reading process, the set of memory cells to be read are referred to as the selected memory cells, while the memory cells that are not intended to be read are referred to as the unselected memory cells.

To better understand the concept of selected memory cells and unselected memory cells, assume a programming operation is to be performed and, for example purposes only, that wordline WL94 and horizontal sub-block HSB0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HSB0 are selected memory cells and some of the memory cells connected to WL94 in horizontal sub-block HSB0 are unselected memory cells depending on how the programming operation is performed and the data pattern being programmed. For example, those memory cells that are to remain in the erased state (e.g., state S0) will be unselected memory cells because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 481 and 480 (which are connected to wordline WL94) are to remain in the erased state; therefore, memory cells 481 and 480 are unselected memory cells (labeled unset in FIG. 4G). Additionally, assume, for example purposes, that memory cells 489, 487, 485 and 483 (which are connected to wordline WL94) are each to be programmed to a respective one of data states S1-S7; therefore, memory cells 489, 487, 485 and 483 are selected memory cells (labeled sel in FIG. 4G).

FIG. 4H illustrates another memory structure that can be used for the structure 126 of FIG. 1A. FIG. 4H illustrates a three-dimensional vertical cross-point structure, the wordlines still run horizontally, with the bitlines oriented to run in a vertical direction.

FIG. 4H depicts one embodiment of a portion of a monolithic three-dimensional memory array structure 126 that includes a first memory level 402 positioned below a second memory level 401. As depicted, the local bitlines LBL11-LBL33 are arranged in a first direction (e.g., a vertical direction) and the wordlines WL10-WL23 are arranged in a second direction perpendicular to the first direction. This arrangement of vertical bitlines in a monolithic three-dimensional memory array is one embodiment of a vertical bitline memory array. As depicted, disposed between the intersection of each local bitline and each wordline is a particular memory cell (e.g., memory cell M111 is disposed between local bitline LBL11 and wordline WL10). This structure can be used with a number of different memory cell structures. In one example, the particular memory cell may include a floating gate device or a charge trap device (e.g., using a silicon nitride material). In another example, the particular memory cell may include a reversible resistance-switching material, a metal oxide, a phase change memory (PCM) material, or a ReRAM material. The global bitlines GBL1-GBL3 are arranged in a third direction that is perpendicular to both the first direction and the second direction. A set of bitline select devices (e.g., Q11-Q31), such as a vertical thin film transistor (VTFT), may be used to select a set of local bitlines (e.g., LBL11-LBL31). As depicted, bitline select devices Q11-Q31 are used to select the local bitlines LBL11-LBL31 and to connect the local bitlines LBL11-LBL31 to the global bitlines GBL1-GBL3 using row select line SG1. Similarly, bitline select devices Q12-Q32 are used to selectively connect the local bitlines LBL12-LBL32 to the global bitlines GBL1-GBL3 using row select line SG2 and bitline select devices Q13-Q33 are used to selectively connect the local bitlines LBL13-LBL33 to the global bitlines GBL1-GBL3 using row select line SG3.

Referring to FIG. 4H, as only a single bitline select device is used per local bitline, only the voltage of a particular global bitline may be applied to a corresponding local bitline. Therefore, when a first set of local bitlines (e.g., LBL11-LBL31) is biased to the global bitlines GBL1-GBL3, the other local bitlines (e.g., LBL12-LBL32 and LBL13-LBL33) must either also be driven to the same global bitlines GBL1-GBL3 or be floated. In one embodiment, during a memory operation, all local bitlines within the memory array are first biased to an unselected bitline voltage by connecting each of the global bitlines to one or more local bitlines. After the local bitlines are biased to the unselected bitline voltage, then only a first set of local bitlines LBL11-LBL31 are biased to one or more selected bitline voltages via the global bitlines GBL1-GBL3, while the other local bitlines (e.g., LBL12-LBL32 and LBL13-LBL33) are floated. The one or more selected bitline voltages may correspond with, for example, one or more read voltages during a read operation or one or more programming voltages during a programming operation.

Figure 5:
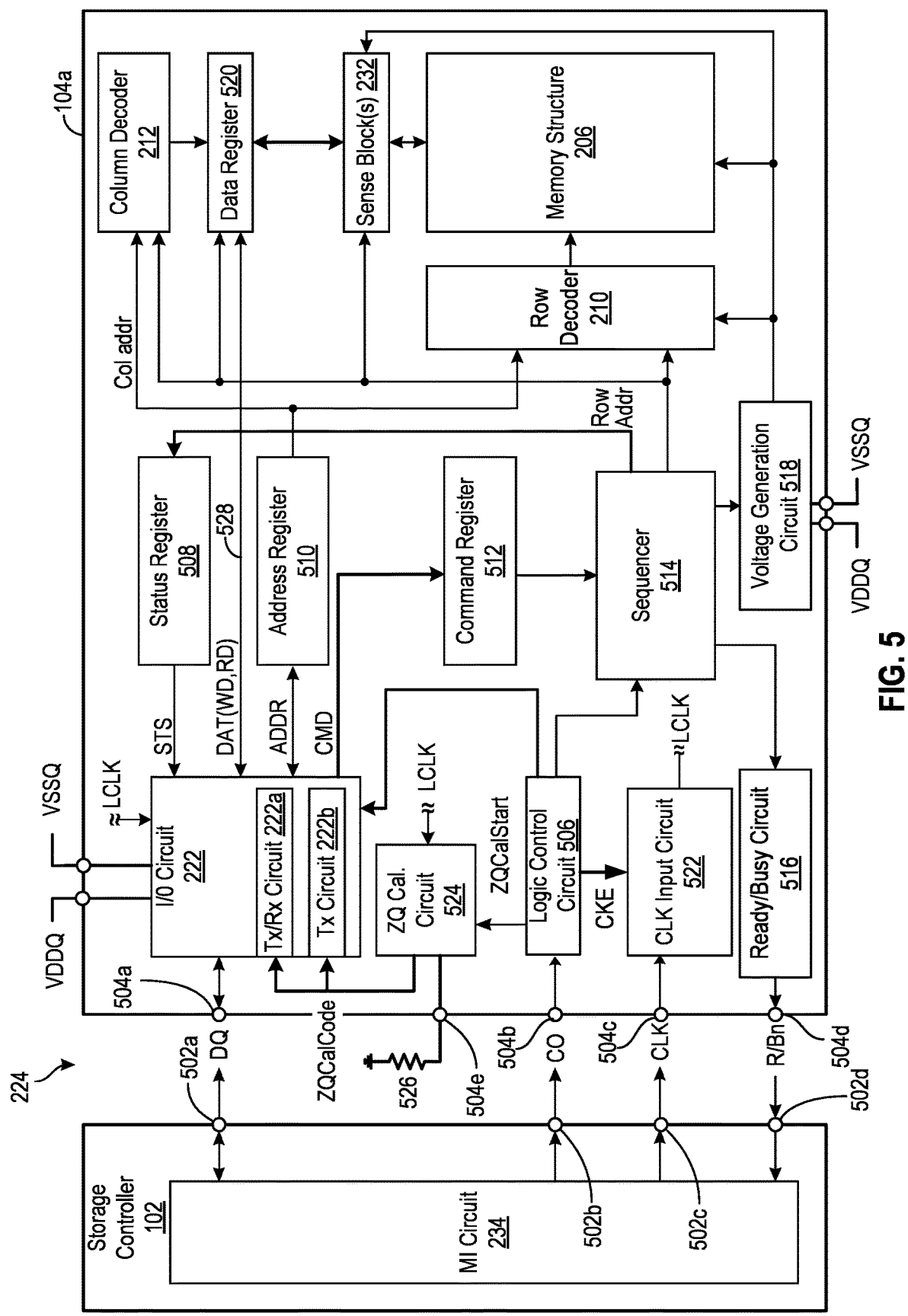
FIG. 5 is a block diagram of example memory system that depicts more details of an example embodiment of memory die, in connection with which, example embodiments of the disclosed technology can be implemented.

FIG. 5 is a block diagram of example memory system 200 that depicts more details of embodiments of memory die 104a. With reference to FIG. 2B above, the memory die 104a may be connected to the storage controller 102 via the memory interface 224 and operates based on commands from the storage controller 102.

For example, the memory die 104a transmits and receives, for example, one or more data signals DQ to and from the storage controller 102 via data bus 228 of the memory interface 224. The data signal may be an n-bit wide signal, where each data signal is a 1-bit wide signal. For example, n may be 7, thus the data signal may be an 8-bit wide signal. The data signals DQ may be encoded with input/output (I/O) data, for example, data in (DIN)/data out (DOUT) for data operations (e.g., read operations, write operations, erase operations, etc.) and address and/or command data (e.g., address cores and/or command codes) for command/address sequencing for the data operations. Data sent over the data signals DQ is latched with respect to a rising edge or a falling edge of a clock (CLK) signal (sometimes referred to as a data strobe (DQS) signal).

The memory die 104a also receives control (CO) signals, such as, but not limited to, chip enable (CEn) signal, command latch enable (CLE) signal, address latch enable (ALE) signal, write enable (WEn) signal, and read enable (REn) signal from the storage controller 102 via the control bus 226 of the memory interface 224. The memory die 104a also transmits control signals, for example but not limited to, a ready/busy signal (R/Bn) to the storage controller 102. In some embodiments, each of CO signals may be a one-bit wide signal. In other embodiments, the control signals CO signals may have other bit-widths as desired.

The storage controller 102 issues a command to perform a read operation, a command to perform a write operation, a command to perform an erase, or the like to the memory die 104a in response to a command from a host device (e.g., host device 106 and/or 112). The storage controller 102 manages the memory space of the memory die 104a. As part of the read, write, or erase operations, the memory die 104a issues various commands to perform command/address sequencing for a respective operation and the memory die 104a and/or storage controller 102 transmit DIN/DOUT to complete the respective operation.

The memory interface circuit 234 of the storage controller 102 connects to the I/O circuit 222 of the memory die 104a via a plurality of electrical contacts or terminals. As used herein, electrical contacts may be referred to as pins for electrically connecting the memory die 104a to the storage controller 102 via a respective bus of the memory interface 224. For example, the storage controller 102 includes a plurality of pins 502a-n electrically connected to a plurality of pins 504a-n of the memory die 104a. The memory interface circuit 234 transmits the CO signals and CLK signal to the memory die 104a over the control bus 226 of the memory interface 224 via respective pins and transmits DQ signals (e.g., DIN data signals) over the data bus 228 of the memory interface 224 via respective pins. The input/output circuit 222 transmits the R/Bn signal to the storage controller 102 over the control bus 226 and the DQ signals (e.g., DOUT data signals) over the data bus 228 via respective pins.

As illustrated in FIG. 5, the memory die 104a includes I/O circuit 222, a logic control circuit 506, a status register 508, an address register 510, a command register 512, a sequencer 514, a ready/busy circuit 516, a voltage generation circuit 518, a data register 520, CLK input circuit 522, and ZQ calibration circuit 524. The various components 506-520 may be included as part of the die controller 204, for example, as part of the control circuit 214 and/or decoder circuit 216. FIG. 2C also illustrates the memory structure 206, row decoder 210, a sense blocks 232, and column decoder 212, as described above in connection with FIG. 2B.

The I/O circuit 222 controls input and output of the DQ signals to and from the storage controller 102. For example, the I/O circuit 222 comprises a receiver (Rx) circuit 222a that transmits DIN received from the storage controller 102 to data register 520, transmits an address code to the address register 510, and transmits a command code to the command register 512. DIN, the command code, and the address are transmitted to the memory die 104a as DQ signals encoded with a bit pattern for the DIN, command, or address. The I/O circuit 222 also comprises a transmitter (Tx) circuit 222b that transmits status information STS received from the status register 508, DOUT received from the data register 520 to be transmitted to the storage controller 102. STS and DOUT are transmitted as DQ signals encoded with a bit pattern for the STS or DOUT. The I/O circuit 222 and the data register 520 are connected via a data bus 528. For example, the data bus 528 includes a plurality I/O data lines (e.g., IO0 to IO7 corresponding to 8-bit DQ signals such as DQ[0:7]). The number of I/O data lines is not limited to eight, but may be set to 16, 32, or any number of data lines.

The logic control circuit 506 receives, for example, the CO signals from the storage controller 102 via control bus 226. Then, logic control circuit 506 controls the I/O circuit 222 and the sequencer 514 in accordance with a received signal.

The status register 508 temporarily stores status information STS, for example, in a write operation, a read operation, and an erasing operation for data and notifies the storage controller 102 whether the operation normally ends.

The address register 510 temporarily stores the address code received from the storage controller 102 via the I/O circuit 222. For example, the I/O circuit 222 may detect DQ signals and sample the DQ signals according to the CLK signal to obtain a bit pattern encoded thereon. The I/O circuit 222 may then decode the bit pattern to obtain the data, which in this example may be an address code. The address code is then temporarily stored in the address register 510. Then, the address register 510 transmits a row address (row addr) to the row decoder 210 and transmits a column address (col addr) to the column decoder 212.

The command register 512 temporarily stores the command code received from the storage controller 102 via the I/O circuit 222 and transmits the command code to the sequencer 514. For example, the I/O circuit 222 may detect DQ signals and sample the DQ signals according to the CLK signal to obtain a bit pattern encoded thereon. The I/O circuit 222 may then decode the bit pattern to obtain the data, which in this example may be a command code. The command code is then temporarily stored in the command register 512.

The sequencer 514 controls operation of the memory die 104a. For example, the sequencer 514 controls the status register 508, the ready/busy circuit 516, the voltage generation circuit 518, the row decoder 210, the sense blocks 232, the data register 520, the column decoder 212, and the like according to a command code stored in the command register 512 to execute the write operation, the read operation, and the erasing operation according to the code.

The ready/busy circuit 516 transmits the R/Bn signal to the storage controller 102 according to an operation state of the sequencer 514. For example, the R/Bn signal is transmitted to the storage controller 102 via the control bus 226 of the memory interface 224.

The voltage generation circuit 518 receives supply voltage VDDQ and low supply voltage VSSQ and generates voltages necessary for an operation (e.g., a write operation, a read operation, or an erasing operation) according to control of the sequencer 514. For example, voltage generation circuit 518 may generate a reference voltage Vref, such as 0.8xVDDQ. The voltage generation circuit 518 may be an example of the power control circuit 215 of FIG. 2A. The voltage generation circuit 518 supplies the generated voltage, for example, to the memory structure 206, the row decoder 210, and the sense blocks 232. The row decoder 210 and the sense blocks 232 apply a voltage supplied from the voltage generation circuit 518 to memory cells in the memory structure 206.

The data register 520 includes a plurality of latch circuits. The latch circuits store the write data (WD) and the read data (RD). For example, in a write operation, the data register 520 temporarily stores the write data received from the I/O circuit 222 and transmits the write data to the sense blocks 232. For example, in a read operation, the data register 520 temporarily stores the read data received from the sense blocks 232 and transmits the read data to the I/O circuit 222.

The clock input circuit 522 receives the clock signal CLK via pin 504c. The CLK signal may be two complementary clock signals. The clock input circuit 522 receive a clock enable signal CKE from the logic control circuit 506 and provides a phase controlled internal clock signal LCLK. The phase controlled internal clock signal LCLK is supplied to the I/O circuit 222 and is used as a timing signal for sampling DIN/DOUT on the data bus as well as performing other functions of the memory die 104a.

The I/O circuit 222 is supplied with power supply voltage VDDQ and low supply voltage VSSQ via respective pins. The power supply voltages VDDQ and VSSQ may be used for the I/O circuit 222 so that power supply noise generated by the I/O circuit 222 does not propagate to the other circuit blocks of device memory die 104a.

The ZQ calibration circuit 524 calibrates (or sets) impedance values of the receiver circuit 222a and transmitted circuit 222b based on an impedance measurement of a reference calibration device. The receiver circuit 222a and transmitter circuit 222b each comprise one or more termination components having an impedance value, which the ZQ calibration circuit 524 calibrates (or sets) to remove signal reflections that would otherwise occur due to impedance mismatch. For example, receiver circuit 222a may comprise an on-die termination (ODT) circuit as a termination component and the transmitter circuit 222b may comprise one or more output drivers termination components. Output drivers may include a pull-up output driver circuit and/or pull-down termination circuit. The total effective impedance of the termination components may be subject to variations due to operating conditions, such as variations in temperature, supply voltage, and/or process corners. The ZQ calibration circuit 524 calibrates the total effective impedance value of each termination component in the receiver circuit 222a and transmitted circuit 222b based on impedance measurements of the reference calibration device having a known and stable impedance. For example, as shown in FIG. 5, the memory die 104a can include an external pin 504e (also referred to herein as the ZQ pin 504e) that is coupled to the reference calibration device. In the illustrated exemplary embodiment, the reference calibration device is a resistor 526 (also referred to herein as ZQ resistor 526) having a known impedance value RZQ (e.g., resistance). In some embodiments, the value of RZQ can be, for example 240 ohms having a tolerance of ±1%. ZQ calibration code signals can be generated by the ZQ calibration circuit 524 based on an impedance measurement of ZQ resistor 526. Because ZQ resistor 526 is located external to the die 104a, the impedance of ZQ resistor 526 is generally stable regardless of the operating conditions such as, for example, the temperature of the memory die 104a and/or supply voltage VDDQ. The reference calibration device is off chip (e.g., off die) and generally grounded via coupling to a substrate or motherboard of the memory device 200.

A calibration process may be initiated by the logic control circuit 506, which generates a calibration start signal (ZQCalStart) that is provided to the ZQ calibration circuit 524. When the calibration circuit 524 is activated responsive to the calibration initialization signal, the calibration circuit 524 performs determines a ZQ calibration by referencing the impedance of the reference calibration device 526 and the reference potentials Vref. In some implementations, as part of a calibration process, a known current generated by the ZQ calibration circuit 524 is passed through the ZQ resistor 526 via ZQ pin 504e, and a voltage corresponding to the impedance of ZQ resistor 526 is measured at the ZQ pin 504e. The impedance of the ZQ resistor 526 represents the impedance that each termination circuit of receiver and transmitter circuits 222a and 222b sees on the data bus to which it is coupled. The ZQ calibration circuit 524 takes the measured voltage at the ZQ pin 504e and compares the voltage to an internal reference voltage (Vref). The result of the comparison can then be used to adjusts circuitry within the ZQ calibration circuit 524 to step up or step down the voltage at the ZQ pin 504e so as to bring the ZQ pin 504e voltage closer to the reference voltage. The comparison process generates ZQ calibration code (ZQCalCode) that is stored to internal registers of the ZQ calibration circuit 524. Subsequently, a calibration latch signal (ZQCalLatch) from the logic control circuit 506 is received at the ZQ calibration circuit 524, which latches the ZQ calibration code to the termination components. Once latched, the ZQ calibration codes can be used to adjust impedance of the termination components of the receiver circuit 222a and/or transmitter circuit 222b so as to match that of the connected data bus 228.

Figure 6:
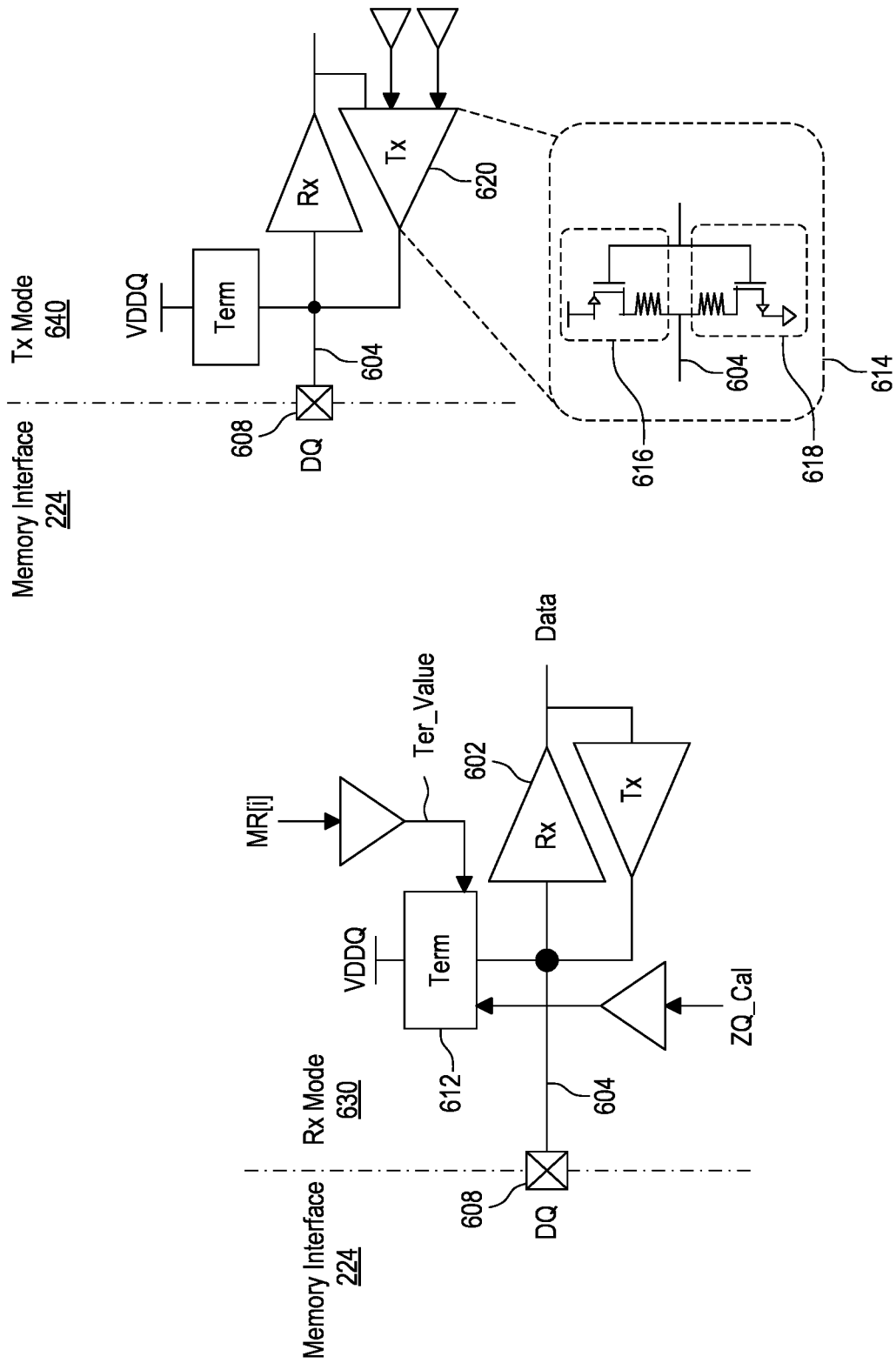
FIGS. 6A and 6B are schematic diagrams of example circuit implementations of a receiver circuit and transmitter circuit, respectively, according to example embodiments of the disclosed technology.

FIGS. 6A and 6B are schematic diagrams of example circuit implementations of a receiver circuit 222a operating in a Rx mode 630 and transmitter circuit 222b operating in Tx mode 640 according to example embodiments of the disclosed technology. The receiver mode 630 comprises termination component 612 and transmitter mode 640 comprises one or more termination components 614 (also referred to as output drivers), each of which has an impedance that may be calibrated, for example, by the ZQ calibration circuit 524 according to embodiments disclosed herein.

With reference to FIG. 6A, the receiver mode 630 comprises an input buffer 602 coupled to data bus 604, which is connected to pin 606. Pin 606 and data bus 604 may be examples of pin 504a and data bus 528 of FIG. 5, respectively, over which DQ signals are received from storage controller 102. Also coupled to data bus 604 is termination component 612, which may be an ODT circuit in various examples. The termination component 612 comprises at least one or more termination devices, for example, metal-oxide-semiconductor field-effect transistors (MOSFET) and/or resistors, which are controlled to provide a total effective impedance of the termination component 612.

The termination component 612 receives a termination command code (e.g., Ter_Value) from the logic control circuit 506 and a ZQ calibration code (e.g., ZQ_Cal) from the ZQ calibration circuit 524. The total effective impedance of the termination component 612 is set based on the termination command code and the ZQ calibration code, where the termination command code corresponds to a target impedance for the termination component 612 and the ZQ calibration code includes calibration parameters for the termination component 612 to trim the total effective impedance of the termination component 612 to match the target impedance. Termination code commands (Ter_Value) are specified by a mode register (MR) settings (e.g., MR[i]) that indicate a target impedance of the termination component 612 for a desired mode (or state) of operation of the of the termination component 612. The MR[i] signal is provided, for example, as a digital code sent by the logic control circuit 506 to the termination component 612, which includes information about the target resistance for the termination component 612. The MR[i] signal is converted to a termination value input into the termination component 612. For example, an ODT circuit may operate at one of a plurality of modes, where each state corresponds to a different impedance. The target impedance for a given stage may be a fraction of the impedance (e.g., resistance) of the ZQ resistor 526 (e.g., 240 ohms, 120 ohms, 80 ohms, 60 ohms 48 ohms, 34 ohms, etc.). According to some embodiments, the termination command code may be provided as a m-bit signal, for example, a 3-bit signal in the form of Ter[2:0]. The ZQ calibration code is a multibit pattern (e.g., code) that is a result of a calibration process performed by the ZQ calibration circuit 524, as set forth above, latched to a register of the termination component 612. The ZQ calibration code buffered and may be provided as a n-bit signal, where the value of n may be based on a number of termination devices comprised in the termination circuit. For example, in the case of the example termination device of FIG. 7, the ZQ calibration code may be a 7-bit signal in the form of ZQ[n:0]. As an example, the ZQ calibration code functions to control (e.g., enabled (ON) or disabled (OFF)) the termination devices of the termination component 612, so to adjust the total effective impedance of the termination component 612 and match the impedance of the connected data bus 604. In this way, signal reflections that result from impedance mismatches are avoided.

Turning to FIG. 6B, the transmitter mode 640 comprises output buffer 620 coupled to data bus 604, which is connected to pin 606. The output buffer 620 is also coupled to data bus 604. Pin 606 and data bus 604 are the same objects as described above with reference to FIG. 6A.

Also coupled to data bus 604 is termination component(s) 614, which may include output drivers, such as pull-up output driver 616 and pull-down output driver 618, in various examples. The pull-up output driver 616 is configured to pull-up a logic state (e.g., to logic level high) for an outgoing DQ signal and the pull-down output driver 618 is configured to pull-down a state (e.g., to logic level low) for an outgoing DQ signal. The pull-up output driver 616 comprises one or more termination devices, such as MOSFETs or resistors, which are controlled to provide a total effective impedance of $R_{PU}$. Similarly, the pull-down output driver 618 comprises one or more MOSFETs and/or resistors that controlled to provide a total effective impedance of $R_{PD}$. Similar to FIG. 6A, the termination component(s) 614 receives a termination command code from the logic control circuit 506 and a ZQ calibration code from the ZQ calibration circuit 524. The impedance of the termination component(s) 614 is set based on the termination command code and the ZQ calibration code. In the case of the pull-up output driver 616, the termination command code indicates a target or effective resistance for the pull-up output driver 616 and the ZQ calibration code is used to trim the total effective impedance thereof to match the target impedance. Similarly, in the case of the pull-down output driver 618, the termination command code indicates a target or effective resistance for the pull-down output driver 618 and the ZQ calibration code is used to trim the total effective impedance. The termination code may be provided similarly to that of FIG. 6A. The ZQ calibration code for either the pull-up or pull-down output drivers 616 or 618 are based on a calibration process performed by the ZQ calibration circuit 524 and may be provided as a n-bit signal, where the value of n may be based on the number of termination devices comprised in the respective termination circuit. As an example, the ZQ calibration code functions to control (e.g., enabled (ON) or disabled (OFF)) the termination devices of the output drivers 616 or 618, so to adjust the total effective impedance of the output drivers 616 or 618, respectively, and match the impedance of the connected data bus 604. In this way, signal reflections that result from impedance mismatches are avoided.

FIGS. 6A and 6B each depict components of the transmitter mode 640 and receiver mode 630, the difference in the figures is the mode of operation of the components. In the context of FIG. 6A, the components are receiving DIN and thus utilize the input buffer 602 and termination component 612. While, in the context of FIG. 6B, the components are transmitting DOUT and thus utilize output buffer 620 and termination components 614. Furthermore, each termination circuit receives a ZQ calibration code that is specifically calibrated for that respective termination circuit. That is a first ZQ calibration code is determined for pull-down output driver 618 (referred to as ZQPDCalCode), a second for pull-up output driver 616 (referred to as ZQPUCalCode), and a third for termination component 612 (referred to as ZQODTCalCode). ZQ calibration code or ZQCalCode will be used herein to refer to each of the above calibration codes unless specificity with respect to a given termination circuit is necessary for illustrative purposes. Thus, ZQ calibration code or ZQCalCode may refer to a ZQPDCalCode, a ZQPUCalCode, and/or ZQODTCalCode, either collectively or individually.

Termination circuits, such as termination component 612, pull-up output driver 616, and pull-down output driver 618, can include one or more leg units between the data bus 604 and a supply voltage (e.g., VDDQ or VSSQ depending on the implementation). That is, in the case of an 8-bit DQ signal (e.g., DQ[7:0]), each leg unit of a given termination circuit is connected to a common pin 608, which exchanges 1-bit wide data signals. Another set of leg units (e.g., another termination circuit) is then connected to a second pin 608, which exchanges 1-bit wide data signals. As In the case of an 8-bit DQ signal, there may be eight pins 608, each of which is connected to separate termination circuits, each comprising a distinct plurality of let units.

Figure 7:
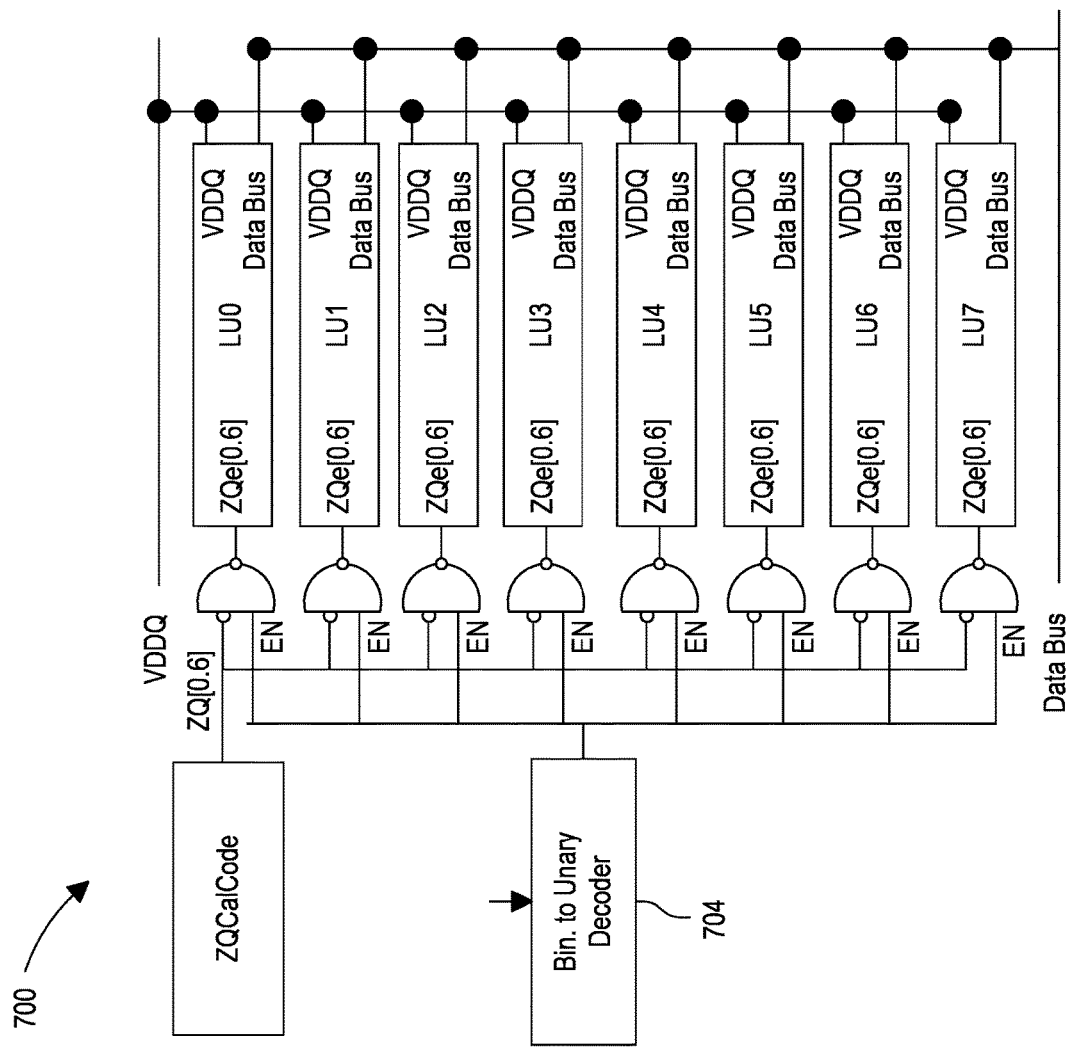
FIG. 7 illustrates an example circuit implementation of a termination component, which may be included in the receiver or transmitter circuit of FIGS. 6A and 6B.

FIG. 7 illustrates an example circuit implementation 700 of a termination component that includes a plurality of leg units. In the illustrated example of FIG. 7, the circuit 700 is an example termination component 612 that may be included as part of receiver circuit 222*a*, for example, as an ODT circuit. Termination component includes seven leg units LU0-LU7 for one data input/output pin 504*a* (or data bit). Each of the leg units LU0-LU7 comprises the same circuit configuration, which includes a group of termination devices, such as MOSFETs, and in some cases, resistors. For example, FIGS. 8A-8D illustrate circuit implementations of some examples of a leg unit. The example circuit implementations of FIGS. 8A-8D each include a group of transistors connected in parallel, and, in the case of FIGS. 8A-8C, one or more resistors. Each leg unit LU0-LU7 is coupled to a NAND gate, having an inverted input that receives a ZQCalCode signal and another input that receives a leg enable (EN) signal, which is based on a termination command code.

A termination command signal, such as those described above in connection with FIGS. 6A and 6B, is provided to a binary to unary decoder 704. The decoder 704 converts the binary termination command code (e.g., Ter_Value), specified by the mode register setting, to a unary representation. The unary representation specifies which leg unit 702 is to be enabled or disabled to provide a target impedance. The unary representation may be in the form of R_val[0:n], where n represents the number of leg units included in the termination component 700 and bits in the unary representation are set according to which leg units are to be enabled (e.g., activated). For example, in the case of FIG. 7, if R_val[0:6] is provided as 0000001 then only one leg unit (LU0) is enabled and the others inactive.

In The target impedance target value for each leg unit LU0-LU7 may be based on design, for example RZQ (e.g., 240 ohms) in an example implementation, 2*RZQ (e.g., 480 ohms) in another example implementation, and so on. However, variations in temperature, supply voltage, and/or process corners may result in each leg unit having an actual total effective impedance that varies plus or minus from the target impedance. Thus, the total effective impedance of each activated leg unit LU0-LU7 may be trimmed (or calibrated) based on the ZQCalCode signal. As noted above, the ZQCalCode signal is based on a calibration process performed by the ZQ calibration circuit 524, and is provided as an n-bit signal corresponding to the number of transistor included in the leg unit. In the case of leg units LU0-LU7, the n-bit signal is provided as a binary n-bit wide signal, which specifies which transistor of an activated leg unit are to be turned ON (e.g., activated). For example, with reference to FIG. 8A, the ZQCalCode can be provided as a 7-bit wide signal (e.g., ZQ[0:6]) specifying which of transistors M0-M6 are to be turned ON via setting specified gate terminals to logic high level of the corresponding transistor. Turning on specified transistors connects the corresponding resistor R0_1 to R0_6 between the supply voltage VDDQ and the data bus (e.g., data bus 604). By controlling which and how many resistors R0_1 to R0_6 are connected, the impedance of the leg unit can be adjusted (or calibrated) according to the ZQCalCode so to provide the effective impedance according to the termination command signal. In the example implementation of FIG. 7, ZQ[0:6] represents the ZQCalCode that is passed to all leg units LU0-LU6, and ZQe[0:6] represents the ZQCalCode for a given leg unit. In the case of activated leg unit, ZQ[0:6] is passed to the leg unit as ZQe[0:6]m whereas, int eh case of deactivated leg units, the ZQe[0:6] is set so to disable the leg unit (e.g., turn OFF all transistors of the leg unit).

An example circuit implementation of pull-up output driver 616 may be similar to circuit 700, except that each NAND gate receives output data (DOUT) from a data bus (e.g., data bus 604). The leg units LU0-LU7 each comprise the same circuit implementation as described above (e.g., circuit implementations of FIGS. 8A-8D). In the case of pull-up output driver 616, if DOUT at the input of the NAND gate is at a logic high level, one or more leg units specified by termination command code will be activated. As a result, the impedance of the specified leg units are calibrated according to the ZQCalCode signal so to match the target impedance value, as described above, and the data I/O pin (e.g., pin 504*a*) is driven to a logic high level.

An example circuit implementation of pull-down output driver 618 may also be similar to circuit 700, except that each NAND gate receives output data (DOUT) from a data bus (e.g., data bus 604), similar to the pull-up output driver 616. Furthermore, the leg units are similar to the leg units of the pull-down output driver 618 described above (e.g., circuit implementations of FIGS. 8A-8D), except that source terminals of the transistors shown in FIGS. 8A-8D are connected to low voltage VSS (or ground) opposed to the supply voltage VDDQ and the polarity of the transistors are reversed (e.g., n-channel MOSFETs are used in place of p-channel MOSFETs as shown in FIGS. 8A-8D). In the case of pull-down output driver 618, if DOUT at the input of the NAND gate is at a logic low level, one or more leg units specified by termination command code will be activated. As a result, the impedance of the specified leg units are calibrated according to the ZQCalCode signal so to provide the target impedance value, as described above, and the data input/output pin (e.g., pin 504*a*) is driven to a logic low level (e.g., VSS in this example).

While the circuit implementations of the let units shown in FIGS. 8A-8D may be calibrated for temperature and supply voltage variations (referred to herein collectively as local variations), complications arise when calibrating for process induced variations (referred to global variations). For example, in the case of the digital to analog converter (DAC) style transistors utilized in examples shown FIGS. 8A-8C, each of which comprises one or more resistors, global variations may produce an exceedingly small window of ZQ calibration codes that may be used to trim the circuit so to provide the desired target impedance. This small calibration window is a result of large differences between global variations among resistors implemented in these designs, which is not efficiently compensated for using the transistors shown in FIGS. 8A-8D.

Figure 8C:
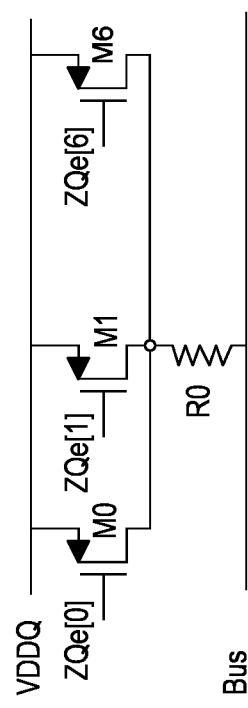
Figure 9:
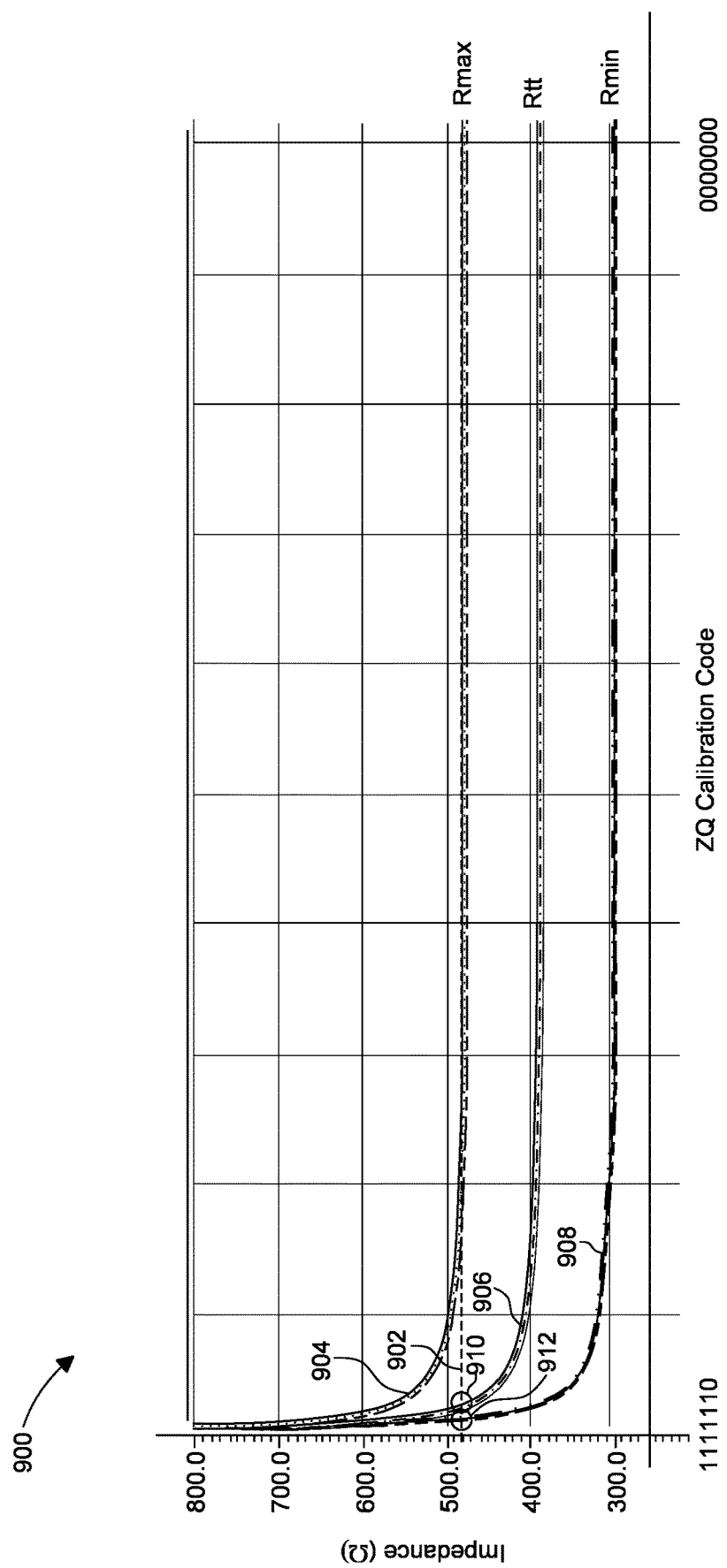
FIG. 9 is a plot of total effective impedance of an activated leg unit of FIG. 8C plotted as a function of ZQ calibration code.

For example, FIG. 9 is a plot 900 of total effective impedance of an activated leg unit plotted as a function of ZQ calibration code. To generate plot 900, 100 Monte Carlo simulations were performed on an activated leg unit implemented as the circuit shown in FIG. 8C to simulate the total effective impedance across each of the three process corners of the resistor R0. The three corners of a given resistor are a maximum resistance (Rmax), typical resistance (Rtt), and minimum resistance (Rmin), where Rtt is the designed for resistance but manufacturing tolerance result in variations between Rmax and Rmin. The target impedance value for the simulations was set to 480 ohms, as indicated by dotted line 902, and the impedance of each process corner was determined as a function of ZQ calibration code. The ZQ calibration code was varied from 1111110, for a case of transistors M1-M6 disabled and M0 enabled, to 0000000, for a case of all transistors M0-M6 activated, As noted in FIG. 7, the inversion of the ZQ calibration code into the NAND gate causes the logic high level of a ZQ calibration code to deactivate the corresponding transistor. Line 904 corresponds to the total effective impedance value of the Rmax process corner as a function of ZQ calibration code, line 906 corresponds to the total effective impedance value of the Rtt, and line 908 corresponds to the total effective impedance value of the Rmin process corner.

As can be seen from plot 900, the actual impedance of the Rmax process corner can be efficiently calibrated to the target impedance level due to a wide window of ZQ calibration codes result in the total effective impedance matching the target impedance. However, in the case of the Rtt and Rmin process corners, the windows 910 and 912 of applicable ZQ calibration codes is significantly narrower. That is, while the ZQ calibration code may be adjusted and easily reach the target impedance in the case of the Rmax process corner, adjusting even a single transistor in the Rtt and Rmin process corner results in a significant change in the total effective impedance to level well below the target impedance.

Figure 8B:
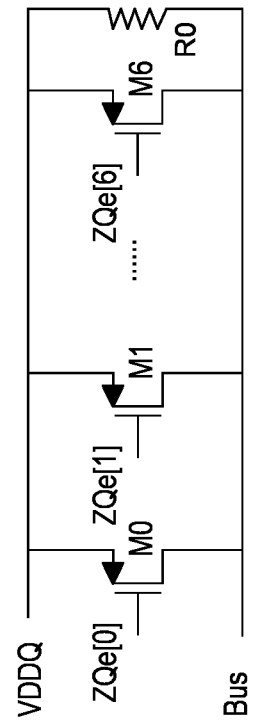
FIGS. 8A-8D illustrate circuit implementations of some examples of a leg unit that may be included in the termination component of FIG. 7.
Figure 8D:
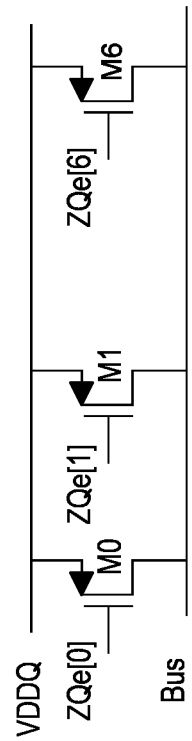
Figure 8A:
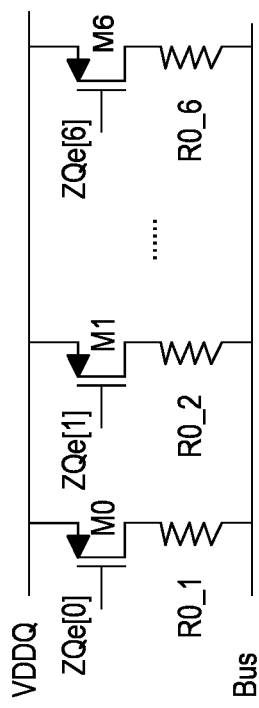

While the above description is made with reference to FIG. 8C, the leg unit circuit implementations of FIGS. 8A and 8B suffer from the same technical short coming due to the inclusion of one or more resistors in the circuit. That is, each resistor of FIGS. 8A and 8B suffer from similar global variations that force the window of applicable ZQ calibration codes to be exceedingly narrow in the Rmin and Rtt process corners, similar to FIG. 9.

One approach to compensate for the above described technical short comings is to design each leg unit to include larger numbers of transistors, which will provide finer steps in calibrating the total effective impedance of the leg unit. For example, instead of using seven transistors M0-M6, many more transistors may be added (for example, 15-20 transistors) which will increase the resolution of calibration by providing smaller steps in total effective impedance for each activated transistor. However, this approach requires increases in data processing due to increased bit width of the of the ZQ calibration code. That is, control of each transistor requires an additional bit and to provide a workable resolution the number of transistors may be inhibitive. Furthermore, the resulting circuit may be increase in size due to required chip real-estate to add the numerous additional transistors, and require additional increased power consumption to drive the additional transistors.

Another approach that may avoid the above technical short comings is to use the leg unit circuit implementation of FIG. 8D, which does not include any resistors and, therefore, is not subject to the same global variations in the resistors. However, the total effective impedance value of this approach becomes extremely non-linear during high voltage swings. For example, the circuit shown in FIG. 8D may exhibit a change in impedance during high voltage swing that can be greater than 3 times. That is, a total effective impedance value at a low supply voltage VSSQ (e.g., 0.2V) may be 200 ohms, but at the high supply voltage VDDQ (e.g., 1V) the impedance value may be 600 ohms. Thus, the total effective impedance exhibits non-linear errors, even when calibrated.

Accordingly, embodiments disclosed herein provide a technical solution to the above technological short comings by providing a leg unit circuit design that includes a first circuit configured to compensate for local variations in the leg unit (e.g., temperature and supply voltage variations) and a second circuit configured to compensate for global variations in a termination resistor. The first circuit, second circuit, and termination resistor may be connected in series, and, an example embodiment, the second circuit may be connected between the first circuit and the termination resistor. The embodiments herein may be calibrated by a ZQ calibration code, a first portion of which specifies operation of the first circuit and a second portion of which specifies operation of the second circuit. For example, the first circuit may comprise a first plurality of switches (e.g., transistors in various examples) connected in parallel and the second circuit may comprise a second plurality of switches (e.g., transistors in various examples) connected in series. The second circuit may also comprise a plurality of resistors connected in series, where each of the plurality of resistors is connected in parallel with a corresponding switch of the second plurality of switches. In an example calibration, the first portion of the ZQ calibration code may specify first plurality of switches to be turned ON to compensate for local variations in the leg unit and the second portion of the ZQ calibration code may specify second plurality of switches to be turned ON to compensate for global variations by connecting or disconnecting corresponding resistors of the plurality of resistors. Thus, one or more of the plurality of resistors (or none of the plurality of resistors in some cases) may be connected in series with the termination resistor, thereby adjusting the total effective resistance of the termination resistor through summation of in series resistors. As a result, the total effective resistance of termination resistor can be adjusted to bring the total effective resistance at the Rtt and Rmin process corners closer to the Rmax process corner. By bringing the impedance of Rtt and Rmin up towards the Rmax process corner, the window of applicable ZQ calibration codes increases in width.

Furthermore, some embodiment disclosed herein provide for a third circuit, connected in parallel with the first circuit, configured to improve the dynamic range of the impedance of the leg unit. The third circuit functions to reduce the maximum impedance value of the leg unit, thereby reducing the swing in impedance values as a function of ZQ calibration code, which may further operate to extend the window of applicable ZQ calibration codes. For example, with reference to FIG. 9, the third circuit may suppress the maximum impedance value at the far left of plot 900, such as reducing the impedance from approximately 800 ohm to less than 700 ohms. In some embodiments, the third circuit comprises a switch (e.g., implemented as a transistor in various examples) that is connected in series with the first circuit. The switch of the third circuit may be activated (e.g., turned ON), whenever the leg unit is activated. For example, responsive to a given leg unit being activated according to the termination command code, the switch of the third circuit is turned ON, and operates to improve the dynamic range by reducing the range of impedance values of the leg unit.

Figure 10:
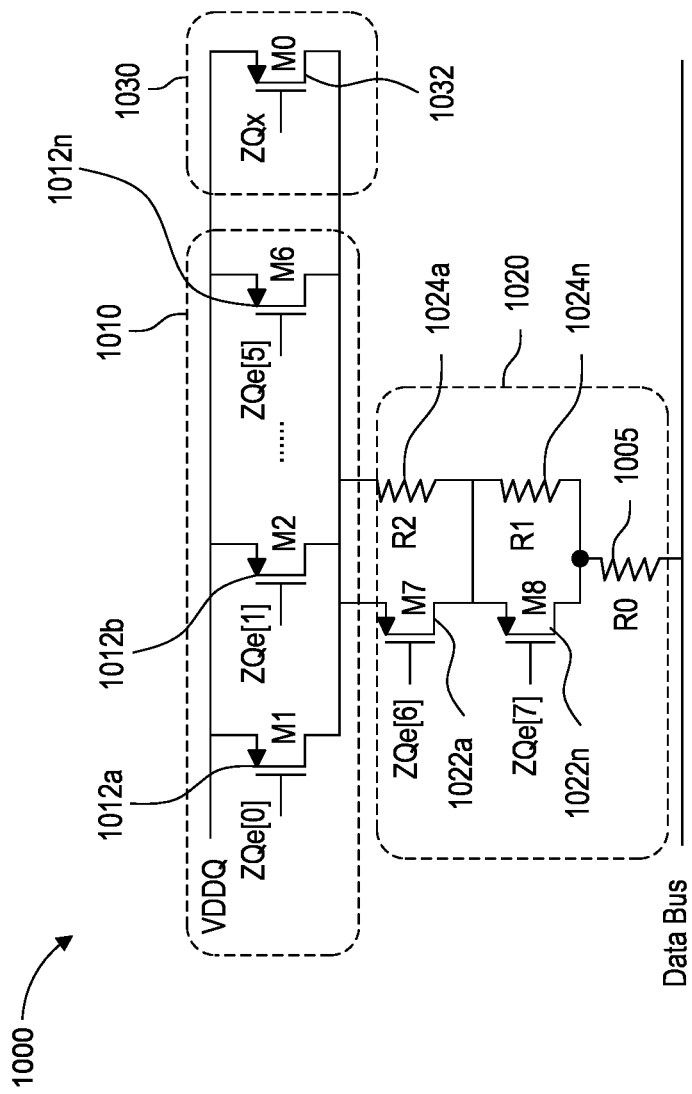
FIG. 10 depicts an example circuit implementation of a leg unit according to embodiments of the disclosed technology.
Figure 11:
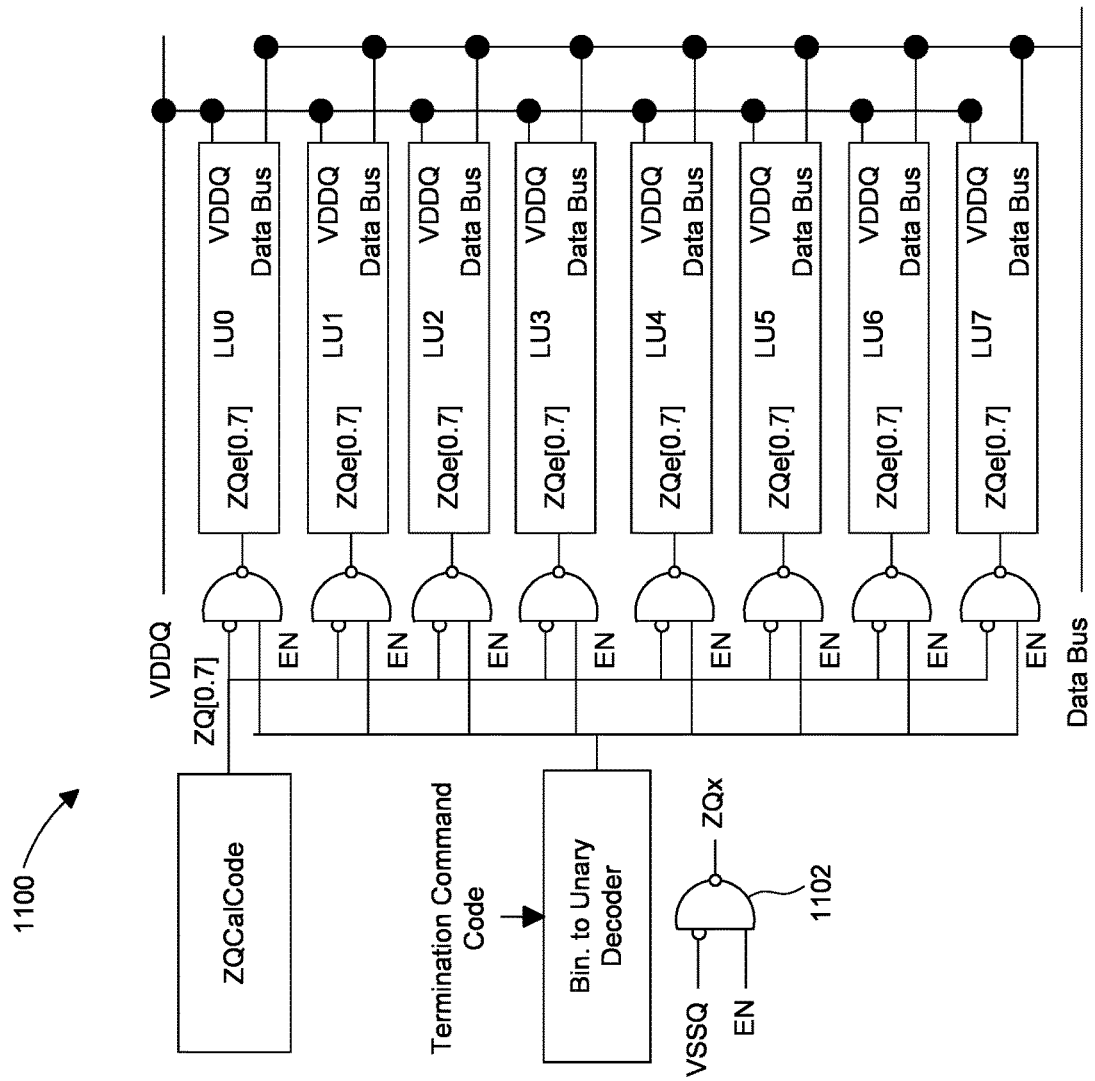
FIG. 11 depicts an example circuit implementation of a termination component in which the leg unit of FIG. 10 may be implemented according to embodiments of the disclosed technology.

FIG. 10 depicts an example circuit implementation of a leg unit according to embodiments of the disclosed technology. FIG. 11 depicts an example circuit implementations of termination components in which the leg unit of FIG. 10 may be implemented according to embodiments of the disclosed technology. FIG. 11 is an example circuit 1100 of a termination component that may be included in a receiver circuit, such as receiver circuit 222a of FIG. 5. For example, circuit 1100 may be an example implementation of termination component 612 of FIG. 6A (e.g., an ODT).

First referring to FIG. 10, the leg unit 1000 comprises a first circuit 1010, a second circuit 1020, a third circuit 1030, and a termination resistor 1005. The leg unit 1000 comprises a plurality switches implemented, for example, as a plurality of p-channel MOSFETs (pMOS transistors) that are included as part of the first, second, and third circuits 1010, 1020, and 1030. While the example the leg unit 1000 is provided as including pMOS transistors, n-channel MOSFET (nMOS) could be implemented as well. Switches are referred to herein as transistors for illustrative purposes. Once skilled int eh art will appreciate that implementations herein may be provided using other forms of switches as desired.

The first circuit 1010 (also referred to herein as a local compensation circuit 1010) includes a first plurality of transistors 1012a through 1012n (collectively referred to as first plurality of transistors 1012) connected together in parallel. In the illustrative example of FIG. 10, first plurality of transistors includes six transistors 1012a through 1012n, each of which has a source terminal connected to the supply voltage VDDQ and drain terminals connected to a common node. Gate terminals of transistors 1012 receive a voltage level based on a ZQ calibration code. For example, the ZQ calibration code comprises a bit pattern including a first portion for the first circuit to switchably connect the supply voltage VDDQ to the data bus through control of the transistors 1012 according to the first portion of the ZQ calibration code. The first portion of the bit pattern comprises a first plurality of bits, each of which specifies whether a corresponding transistors 1012 is to be activated (e.g., by setting the bit to logic low level). If a transistor is to be activated, a voltage level is applied to the gate terminal of the specified transistor that brings up the gate to source voltage ($V_{GS}$) above the threshold voltage ($V_{th}$) of the transistor, thereby turning the transistor ON and passing current through the specified transistor. While six transistors 1012 are shown in the example circuit of FIG. 10, the number of transistors of the first plurality of transistors may be any number desired to provide finer granularity of adjustment to the total effective resistance and thereby the total effective impedance.

As alluded to above, the first circuit 1010 functions to compensate for local variations, such as variations in temperature and supply voltage. For example, local variations cause the actual impedance of the leg unit 1000 to fluctuate. After a calibration process during which a ZQ calibration code is determined for current operating local variations (e.g., current operating temperature and supply voltage), the ZQ calibration code is supplied to the leg unit 1000 to specify one or more transistors to activate, thereby connect the supply voltage VDDQ to the termination resistor 1005 (more particularly, to the termination circuit via the second circuit 1020). The one or more transistors are specified so to adjust the resistance of the leg unit 1000, such that the total effective impedance of the leg unit 1000 matches the target impedance as specified by the termination command code. That is, the total effective impedance of the leg unit 1000 decreases as the number activated first plurality of transistors 1012 increase due to increased current connected to the termination resistor 1005.

The second circuit 1020 (also referred to herein as a global compensation circuit 1020) is connected in series between the first circuit 1010 and the termination resistor 1005. The second circuit 1020 includes a second plurality of transistors 1022a through 1022n (collectively referred to as second plurality of transistors 1022) and a plurality of resistors 1024a through 1024n (collectively referred to as plurality of resistors 1024). Each of the plurality of resistors 1024 is connected in parallel with a corresponding transistor of the second plurality of transistors 1022 providing a transistor/resistor pair. For example, resistor 1024a is connected in parallel with corresponding transistor 1022a and so on. Each transistor/resistor pair is connected in series with a next transistor/resistor pair. For example, a first pair of transistor 1022a and resistor 1024a is connected in series with a second pair of transistor 1022n and resistor 1024n. Transistor 1022n and resistor 1024n are connected to the termination resistor 1005.

In the illustrative example of FIG. 10, second plurality of transistors 1022 includes two transistors 1022a and 1022n and two resistors 1024a and 1024n providing two transistor/resistor pairs; however, any number of pairs may be included as desired. Source terminal of transistor 1022a and a first terminal of resistor 1024a are connected to drain terminals of transistors 1012 of the first circuit 1010. Drain terminal of transistor 1022a and second terminal of the resistor 1024 are connected to source terminal of transistor 1022n and to a first terminal of resistor 1024n. Drain terminal of transistor 1022n and second terminal of resistor 1024n are connected to a first terminal of termination resistor 1005 having a second terminal connected to a data bus (e.g., data bus 604 of FIG. 6). Gate terminals of transistors 1022 receive a voltage level based on the ZQ calibration code. For example, the bit pattern of the ZQ calibration code includes a second portion for the second circuit 1020 to switchably connect the plurality of resistors the first circuit through control of the transistors 1022 according to the second portion of the ZQ calibration code. The second portion of the bit pattern comprises a second plurality of bits, each of which specifies whether a corresponding transistor 1022 is to be activated. If a transistor is to be activated, a voltage level is applied to the gate terminal of the specified transistor that brings up the gate to source voltage ($V_{GS}$) above the threshold voltage ($V_{th}$) of the transistor, thereby turning the transistor ON.

As alluded to above, the second circuit 1020 functions to compensate for global variations, such as process induced variations in the termination resistor 1005. The compensation is provided by combining the termination resistor in series with none or one or more of resistors 1024, thereby adjusting the total effective resistance of the combined circuit (e.g., second circuit and termination resistor). For example, the total effective resistance is adjusted by controlling which of transistors 1022 are activated or not, which adjusts the total effective resistance through summation of any number (including zero) of resistors 1024 in series with termination resistor 1005 (if any). For example, when a respective transistor 1022 is ON based on the ZQ calibration code, current will pass through the respective transistor, effectively removing the corresponding resistor from the current path. Thus, the resistance of the corresponding resistor is removed from the total effective resistance. Alternatively, in a case that a respective 1022 is OFF, current will pass through the corresponding resistor, thereby adding to the total effective resistance (and thus the impedance) via summation of in series resistors. Thus, by selectively connecting which (if any) of resistors are connected to the termination resistor 1005, the total effective resistance of the combination of second circuit and termination resistor 1005 can be increased toward the Rmax process corner.

In an example implementation, each of the plurality of resistors 1024 is provided to compensate for a distinct global variation. For example, a first resistor of the plurality of resistors 1024 may be provided to compensate for a first global variation and a second resistor provided to compensate for a second global variation. More particularly, in an example implementation of FIG. 10, the resistance value R2 of resistor 1024a may be selected to compensate for a case where the termination resistor 1005 is at a Rtt process corner and the resistance value R1 of resistor 1024n may be selected to compensate for a case where the termination resistor 1005 is provided at a Rmin process corner. Thus, for example, if the termination resistor 1005 is at a Rtt process corner, the ZQ calibration code may specify to activate (e.g., turn ON) transistor 1022n, thereby passing current through resistor 1024a but not resistor 1024n. As a result, the total effective resistance of the second circuit and termination resistor 1005 is the sum of R2 and R0 (e.g., resistance of resistor 1005). Alternatively, resistor 1024a may be selected to compensate for Rmin process corner while resistor 1024n is selected to compensate for Rtt process corner.

In another example, the resistors 1024 are not necessarily tied to a specific global variation. In this case, transistors 1022 are activated as needed according to the ZQ calibration code to increase the total effective resistance of the combined second circuit and termination resistor 1005 toward the Rmax process corner.

The third circuit 1030 (also referred to herein as the dynamic range compensation circuit 1030) includes a third one or more transistors 1032 that are connected in parallel to the first circuit 1010. In the illustrative example of FIG. 10, the third one or more transistors 1032 includes one transistor that is connected in parallel with the first plurality of transistor 1012. For example, a source terminal of transistor 1032 is connected to the supply voltage VDDQ and to source terminals of the first plurality of transistors 1012. A drain terminal of transistor 1032 is connected to drain terminals of the first plurality of transistors 1012. A gate terminal of transistor 1032 receives a voltage level responsive to activating the leg unit 1000, for example, based on the termination command code. That is, for example, when the leg unit 1000 is activated, a voltage level is applied to the gate terminal of transistor 1032 that brings up the $V_{GS}$ above the $V_{th}$, thereby turning transistor 1032 ON and passing current through the transistor 1032. As a result, the dynamic range of the total effective resistance in the leg unit 1000 is reduced as compared to the leg unit designs of FIG. 8C, for example, by reducing the maximum impedance at the far left side of plot 900. While the example implementation of FIG. 10 includes a single transistor as the third circuit 1030, other implementations are possible, for example, a plurality of transistors may be connected so as to provide similar functionality as desired.

Turning to FIG. 11, the circuit 1100 is substantially similar to circuit 700 of FIG. 7, except that each leg unit LU0-LU7 is provided as an instance of leg unit 1000 and that the ZQCalCode is provided as a bit pattern signal that specifies which of transistors 1012 and 1022 to be activated. In the case of leg unit 1000, the ZQCalCode can be an 8-bit wide signal corresponding to the eight transistors 1012 and 1022. The 8-bit signal may comprise a first portion of 6-bits corresponding to the six transistors 1012a to 1012n (e.g., ZQ[0:5]) and a second portion of 2-bits corresponding to the two transistors 1022a to 1022n (e.g., ZQ[6:7]). Furthermore, circuit 1100 includes an additional NAND gate 1102 that receives an inverted VSSQ signal and an enable signal at its inputs. The additional NAND gate 1102 outputs a logic high level as ZQx signal to the third circuit (e.g., gate terminal of transistor 1032) of each leg unit LU0-LU7. Thus, responsive to a respective leg unit being activated, the ZQx signal turns on the third circuit, thereby reducing the dynamic range as described above. The circuit 1100 may be an example circuit implementation of an ODT included as part of a receiver circuit, thus the NAND gates receive ZQODTCalCode as the ZQ calibration code.

Figure 12:
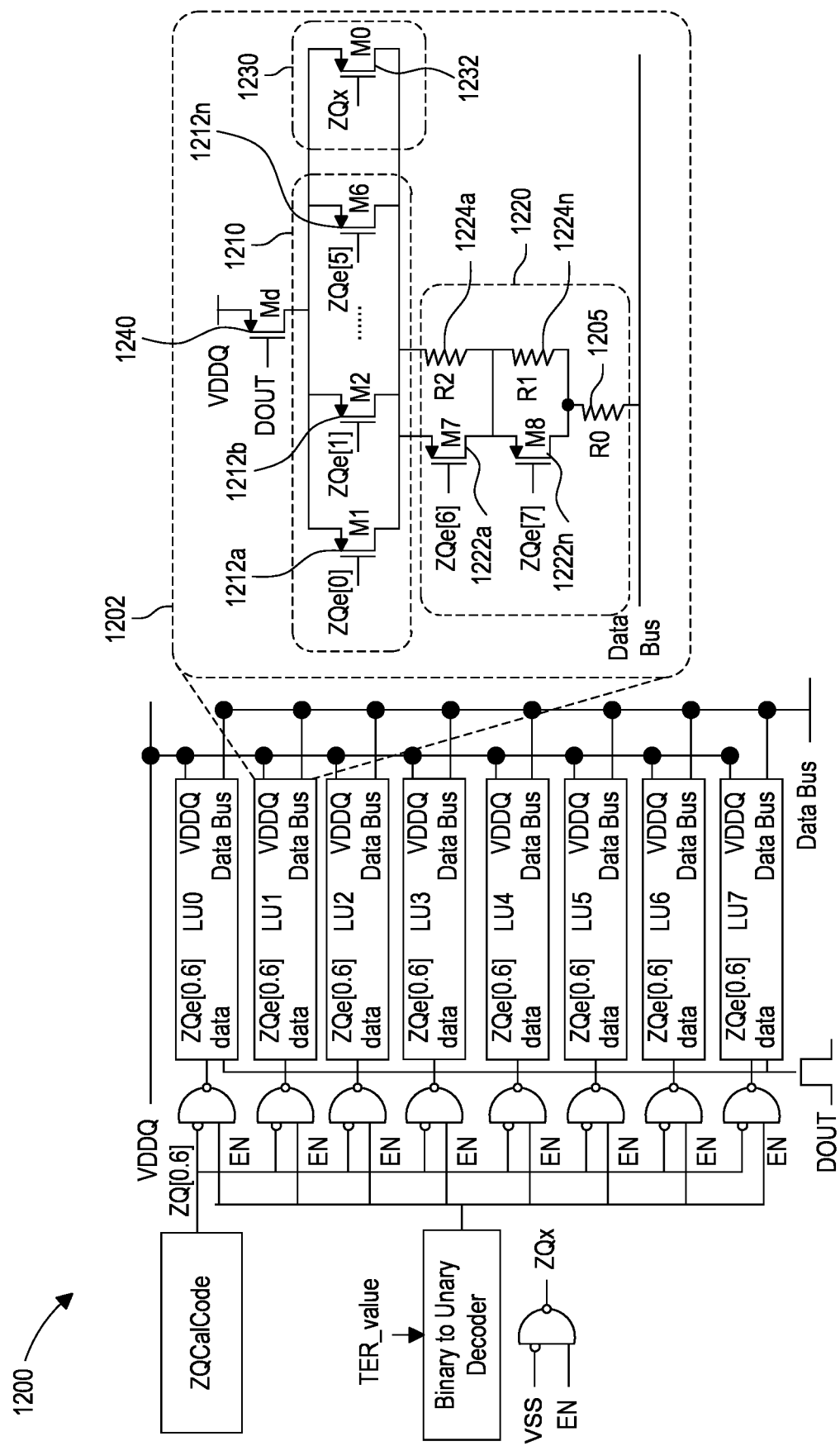
FIG. 12 depicts an example circuit implementations of another termination component and a leg unit according to embodiments of the disclosed technology.

FIG. 12 depicts an example circuit implementation 1200 of another termination component and a leg unit 1202 according to embodiments of the disclosed technology. FIG. 12 is an example circuit implementation 1200 of a termination component that may be included in a transmitter circuit, such as transmitter circuit 222b of FIG. 5. For example, circuit 1200 may be an example of a pull-up output driver 616 of FIG. 6B. Circuit 1200 comprises a plurality of leg units LU0-LU7, each of which may be implemented as leg unit 1202.

Circuit 1200 is substantially similar to circuit 1100, except that each leg unit LU0-LU7 receive output data (DOUT) from an internal data line (e.g., data bus 604 of FIG. 6B) and provide the data to a data bus (e.g., data bus 228). As with circuit 1100, the leg units LU0-LU7 are implemented as instances of leg unit 1000 and the ZQ calibration code is provided as a bit pattern comprising a first and second portion. The ZQ calibration code may be provided as a ZQPUCalCode.

Leg unit 1202 is substantially similar to leg unit 1000. For example, leg unit 1202 comprises first, second, and third circuits 1210, 1220, and 1230, respectively, and a termination resistor 1205. Unlike the leg unit 100, leg unit 1202 comprises a fourth circuit including a switch 1240 that is driven according to the output data. For example, switch 1240 is illustratively implemented as a p-channel MOSFET (pMOS transistor) having DOUT applied to its gate terminal. Thus, when data is provided at a logic high level (e.g., a binary value of "1"), the transistor 1240 is turned on and connects the voltage supply VDDQ to the first circuit 1210.

The first circuit 1210 (also referred to herein as a local compensation circuit 1210) is substantially similar to first circuit 1010 of FIG. 10 and operates as described above in connection with FIG. 10. Accordingly, first circuit 1210 includes a first plurality of switches 1212a through 1212n (collectively referred to as first plurality of switches 1212) connected together in parallel. Switches 1212 are illustratively provided as pMOS transistors, however other implementations are possible (e.g., other switches and/or nMOS transistors according to a desired implementation). As described above, the first plurality of switches 1212 are configured switchably connect the supply voltage VDDQ to the data bus according to a ZQ calibration code to compensate for local variations, such as variations in temperature and supply voltage.

The second circuit 1220 (also referred to herein as a global compensation circuit 1220) is substantially similar to second circuit 1020 of FIG. 10 and operates as described above in connection with FIG. 10. Accordingly, second circuit 1220 includes a second plurality of switches 1222a through 1224n (collectively referred to as first plurality of switches 1222) and a plurality of resistors 1224a through 1224n (collectively referred to as plurality of resistors 1224). Switches 1222 are illustratively provided as pMOS transistors, however other implementations are possible (e.g., other switches and/or nMOS transistors according to a desired implementation). As described above, the second plurality of switches 1222 are configured switchably connect the plurality of resistors between the first circuit and the to the data bus according to a ZQcalibration code to compensate for global variations, such as variations in process corners.

The third circuit 1230 (also referred to herein as the dynamic range compensation circuit 1230) is substantially similar to third circuit 1030 of FIG. 10 and operates as described above in connection with FIG. 10. Accordingly, third circuit 1230 includes a third one or more switches 1232 connected in parallel to the first circuit 1210. Switches 1232 are illustratively provided as a pMOS transistor, however other implementations are possible (e.g., other switches, nMOS transistors, and/or more than one switch according to a desired implementation). As described above, the third one or more switches 1232 are configured to reduce the dynamic range of the leg unit 1202.

Figure 13:
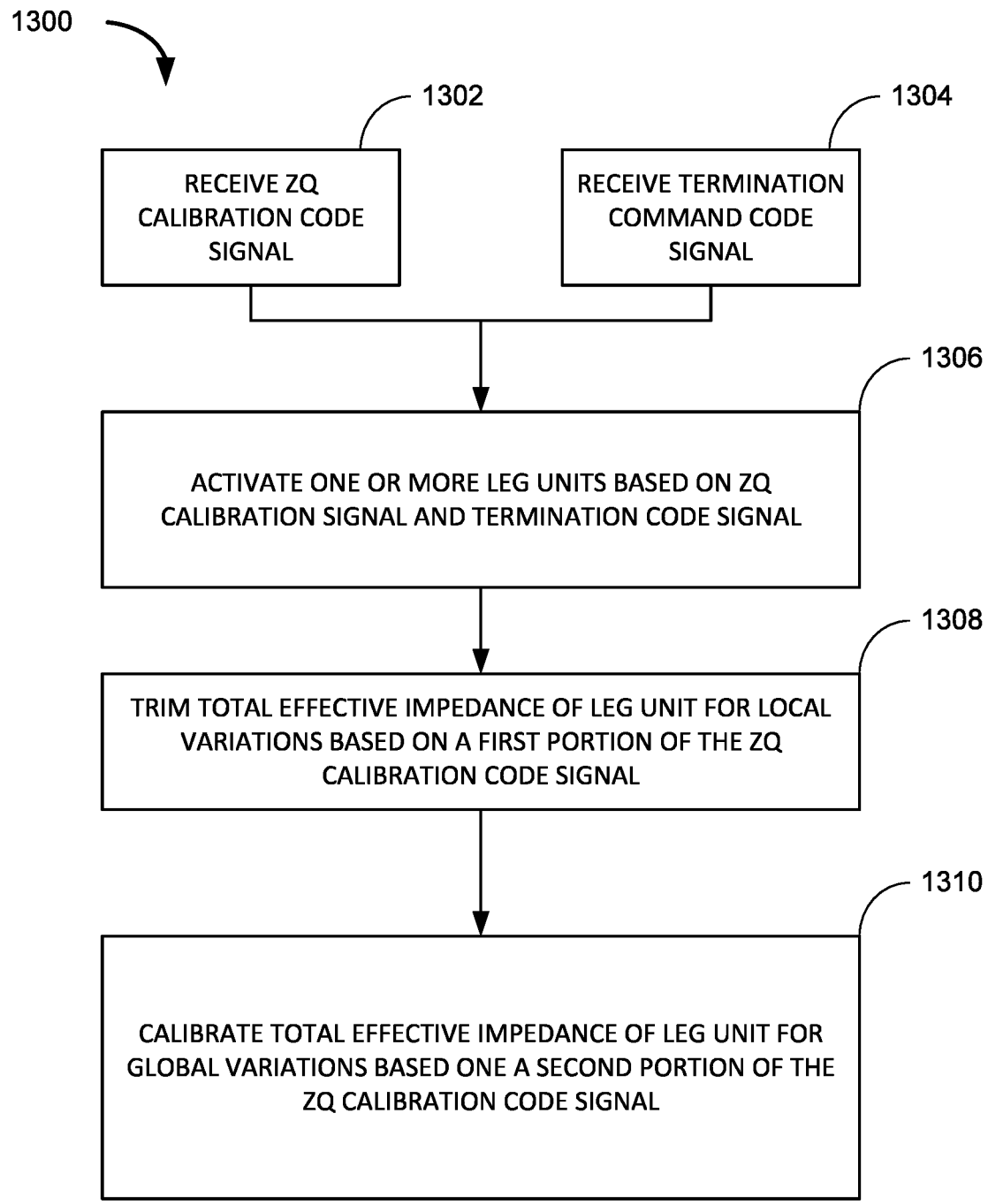
FIG. 13 is a flowchart of an example method of trimming a total effective impedance of the leg unit of FIG. 10 according to embodiments of the disclosed technology.

FIG. 13 is a flowchart of an example method of trimming a total effective impedance of the leg unit 1000 and/or leg unit 1202 according to embodiments of the disclosed technology. The methods 1300 will be described hereinafter in the context of the example circuit implementation of leg units 1000 for illustrative purposes only.

At block 1302, a NAND gate of each leg unit LU0-LU7 receives a ZQ calibration code signal. For example, the ZQ calibration code signal may be stored in a register of the circuit 1100 based on a calibration process (as described below with reference to FIGS. 17-20). The ZQ calibration code for all leg units may be provided as ZQ[0:n] and then each leg unit receives a code for that leg unit (e.g., ZQe[0:n]). In some embodiments, each leg unit receives the same ZQ calibration code. That is, each leg unit is assumed to have components in the same process corner and thus are calibrated in the same or similar manner. In another embodiment, each leg unit is separated calibrated with a different calibration code.

At block 1304, each NAND gate receives a termination command code as described above. The termination command code indicates whether each respective leg unit is to be activated or not. For example, a termination command code (converted to unary format) may be provided an n-bit signal, where n corresponds to the number of leg units. Each bit corresponds to a given leg unit LU0-LU7. If a given bit is set to logic high level, the corresponding leg unit is enabled via the NAND gate. The NAND gate functions to enable the leg unit 1000, at block 1306, responsive to receiving the ZQ calibration code and termination command signal that enables the leg unit.

At block 1308, the total effective impedance of the activated leg unit is trimmed (e.g., calibrated) for local variations based on a first portion of the ZQ calibration code. For example, in the example implementation of leg unit 1000, the ZQ calibration code may be provided as an 8-bit signal, where a first number of bits corresponds to one of the transistors 1012. Responsive to whether a bit is set to logic high level or logic low level, the corresponding transistor is turned on or off. For example, if a bit is set to logic high level, the transistor is turned off (due to inversion at the input of the NAND gate). If set to logic low level, the transistor is turned on. In an example, where the ZQ calibration code is provided as ZQe[0:7], bits 2-7 (e.g., the right six most bits of 00000000) may be the first portion of the ZQ calibration code.

At block 1310, the total effective impedance of the activated leg unit is trimmed (e.g., calibrated) for local variations based on a second portion of the ZQ calibration code. For example, in the example implementation of leg unit 1000, the ZQ calibration code may be provided as an 8-bit signal, where a second number of bits corresponds to one of the transistors 1022. Responsive to whether a bit is set to logic high level or logic low level, the corresponding transistor is turned on or off. For example, if a bit is set to logic high level, the transistor is turned off (due to inversion at the input of the NAND gate). If set to logic low level, the transistor is turned on. In an example, where the ZQ calibration code is provided as ZQe[0:7], bits 0 and 1 (e.g., the left two most bits of 00000000) may be the first portion of the ZQ calibration code.

Figure 14H:
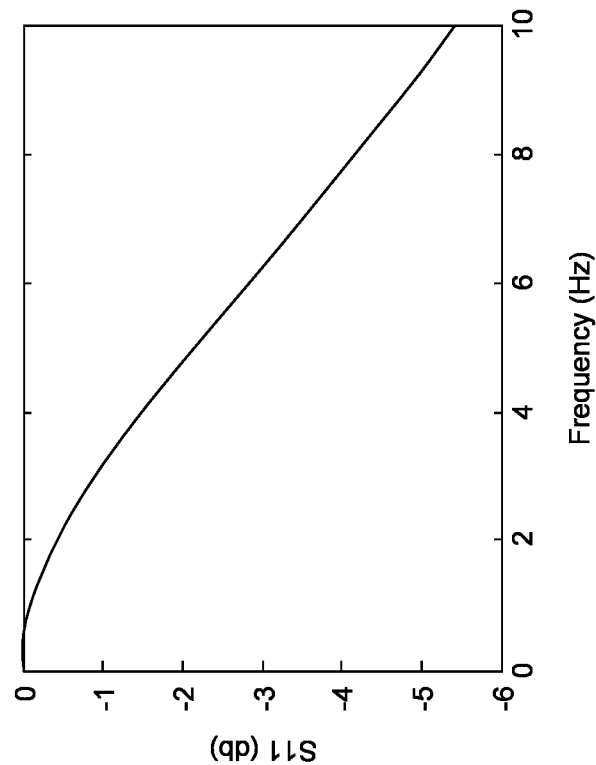

FIGS. 14A-14H depict various results provided from simulations of the leg unit 1000 of FIG. 10. FIG. 14A-14C are example plots illustrating total effective impedance provided by the leg unit 1000 as a function of ZQ calibration code converted to decimal format (e.g., a ZQ calibration code provided in binary format converted to decimal format) across temperature variations, for example, simulation results for −20° C. is shown in FIG. 14A, 25° C. in FIG. 14B, and 120° C. in FIG. 14C. To generate FIGS. 14A-14B, 100 Monte Carlo simulations were performed across all 15 process corners of the leg unit 1000 and the voltage on the data bus was set to 0.88V and the target impedance was 240 ohms (as indicated by the dotted line in each figure). In each of FIG. 14A-14C, the second circuit 1020 of leg unit 1000 was calibrated, thus the figures are plotted as a function of the first portion of ZQ calibration code (e.g., ZQe[0:5]).

As shown in FIGS. 14A-14C, for each temperature point, there are a range of ZQ calibration codes for all process corners that can be used to calibrate the leg unit 1000 such that the total effective impedance that corresponds with the target impedance (e.g., 240 ohms). Furthermore, as the temperature increases, the range of ZQ calibration codes that provide the desired total effective impedance increases. Additionally, FIGS. 14A-14C show a close grouping of the various corners, compared to FIG. 9 which provide a large spread between the three process corners of the termination resistor.

FIGS. 14D-14F are histograms of the Monte Carlo simulations of FIGS. 14A-14C. FIGS. 14D-14F illustrate counts of the Monte Carlo simulations as a function of total effective impedance for each temperature point (e.g., 20° C. is shown in FIG. 14D, 25° C. in FIG. 14E, and 120° C. in FIG. 14F).

Figure 14G:
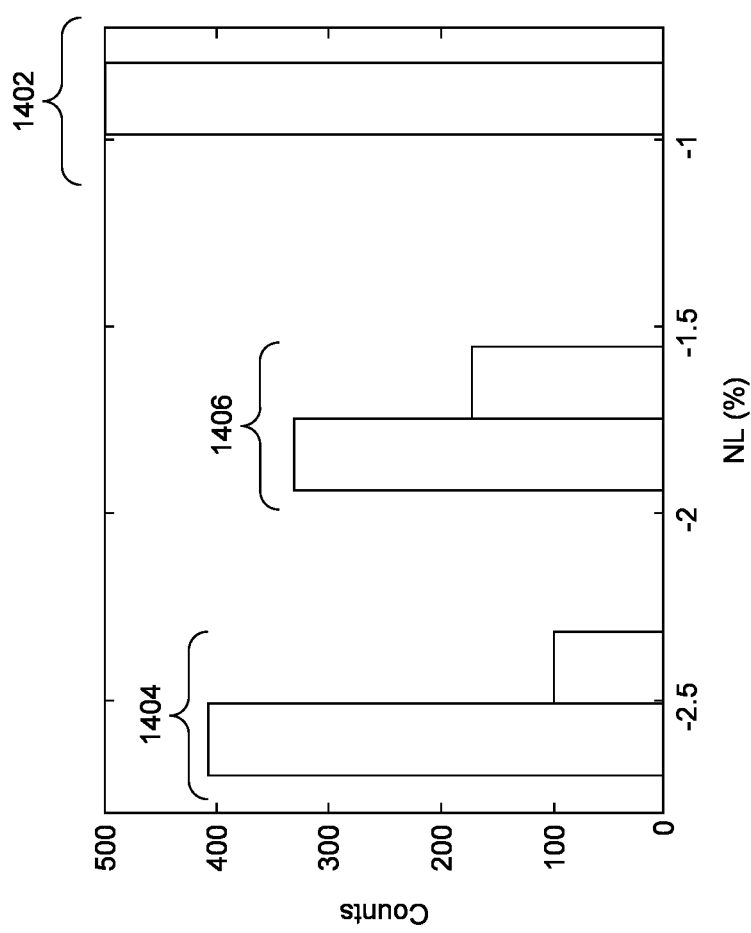

FIG. 14G is a histogram of Monte Carlo simulations of leg unit 1000 across all corners depicting non-linearity errors. To generate FIG. 14G, the leg unit 1000 was calibrated for local and global variations with the voltage on the data bus set to 0.8xVDDQ, where VDDQ in the simulations was set to 1V. One hundred Monte Carlo simulations were performed across all corners of the leg unit 1000 by changing the voltage (e.g., the voltage swing) on the data bus between 0.2 V (e.g., low voltage supply VSS) and 1 V (e.g., voltage supply VDDQ). FIG. 14G illustrates counts of the Monte Carlo simulations as a function of non-linearity error of the calibrated leg unit 1000 as a percentage, in a case where the leg unit is activated (or ON). In FIG. 14G, bar 1402 represents counts for a termination resistor 1005 at the Rmax process corner, bars 1404 represent counts for a termination resistor 1005 at the Rtt process corner, and bars 1406 represent counts for a termination resistor 1005 at the Rmin process corner.

Non-linearity error (NL) was calculated by taking a difference between the total effective impedance of the leg unit 1000 measured when the voltage on the data line is at 1 V ($R_{on@1V}$) and the total effective impedance of the leg unit 1000 measured when the voltage on the data line is at 0.2 V ($R_{on@0.2V}$). This difference is divided by the total effective impedance of the leg unit 1000 measured when the voltage on the data line is at the calibrated voltage of 0.88 V ($R_{on@0.88V}$). The result is then multiplied by 100 to provide a percentage. That is $NL=((R_{on@1V}-R_{on@0.2V}/R_{on@0.88V})\times 100$.

As shown in FIG. 14G, the leg unit 1000 provides good linearity over the simulated voltage swing. For example, the simulated NL was between −2.5% (for the Rmin process corner) and −1% (for the Rmin process corner), which is a significant improvement of the non-linearity achieved by the leg units shown in FIGS. 8A-8D (e.g., 3 times or 300% error).

FIG. 14H is an example plot of voltage reflection coefficient (S11) on the data bus from a leg unit as a function of frequency. S11 may be representative of parasitic losses in the circuit. FIG. 14H is generated by simulation of the leg unit 1000, and from FIG. 14H it is seen that there are minor parasitic losses in the circuit. For example, there is minor reduction in S11 over a range of frequencies. As an example, if working on 3.2 GHz, S11 is −1 dB, which is a negligible loss.

Figure 15:
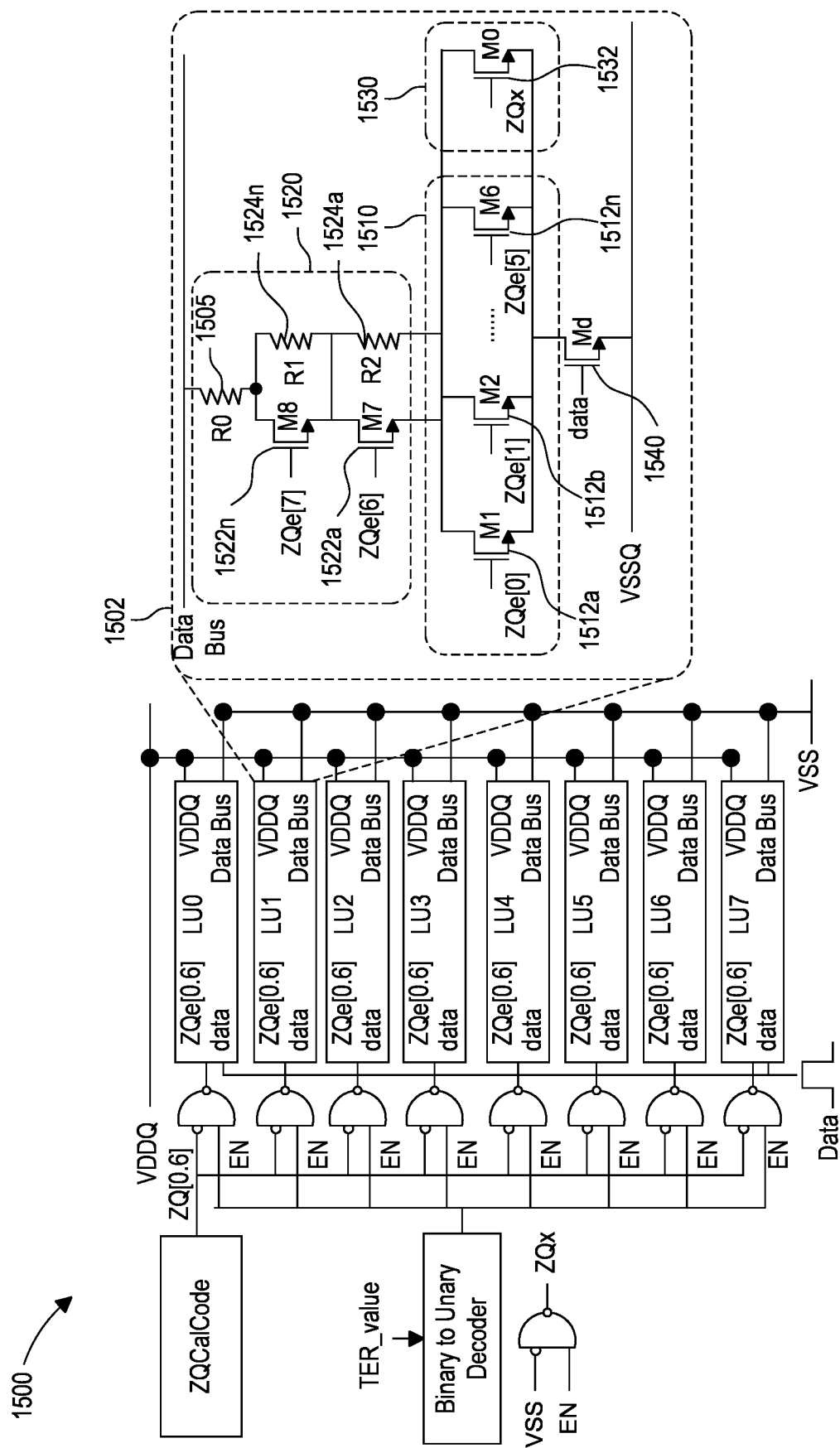
FIG. 15 depicts example circuit implementations of another termination component and a leg unit according to embodiments of the disclosed technology.

FIG. 15 depicts an example circuit implementation 1500 of another termination component and a leg unit 1502 according to embodiments of the disclosed technology. Circuit 1500 is an example of a pull-down output driver that may be included in a transmitter circuit, such as transmitter circuit 222b of FIG. 5. For example, circuit 1500 may be an example of a pull-down output driver 618 of FIG. 6B. Circuit 1500 comprises a plurality of leg units LU0-LU7, each of which may be implemented as leg unit 1502.

Leg unit 1502 comprises a first circuit 1510, a second circuit 1520, a third circuit 1530, and a termination resistor 1505. The leg unit 1502 is similar to leg unit 1202 of FIG. 12, except that second terminal of termination resistor 1505 is connected the data bus (e.g., data bus 610 of FIG. 6B) and first circuit 1510 is connected to a low voltage supply VSS (or ground). Furthermore, the circuit 1500 comprises a plurality of n-channel MOSFETs (nMOS transistors) that are included as part of the first, second, and third circuits 1510, 1520, and 1530. That is, the polarity of the transistors of leg unit 1502 are opposite of the those of leg unit 1202. While the example the leg unit 1502 is provided as including nMOS transistors, p-channel MOSFET (pMOS) could be implemented as well.

The first circuit 1510 (also referred to herein as a local compensation circuit 1510) includes a first plurality of transistors 1512a through 1512n (collectively referred to as first plurality of transistors 1512) connected together in parallel. In the illustrative example of FIG. 15, first plurality of transistors includes six transistors 1512a through 1512n, each of which has a source terminal connected to the data bus and drain terminals connected to a common node. Gate terminals of transistors 1512 receive a voltage level based on a ZQ calibration code as described above in connection with FIG. 10. While six transistors 1512 are shown in the example circuit of FIG. 15, the number of transistors of the first plurality of transistors may be any number desired to provide finer granularity of adjustment to the total effective resistance and thereby the total effective impedance. Furthermore, the first circuit 1510 functions to compensate for local variations, such as variations in temperature and supply voltage, in a manner that is substantially the same as set forth above with respect to first circuit 1012 of FIG. 10. That is, the ZQ calibration code specifies transistors 1512 to be activated so to connect the low voltage VSS to the termination resistor 1505. Thus, the total effective impedance of the leg unit 1502 increase as the number activated first plurality of transistors 1512 increase due to increased current passing through the termination resistor 1005 to the first circuit 1510, when the voltage is pulled down.

The second circuit 1520 (also referred to herein as a global compensation circuit 1520) is connected in series between the first circuit 1510 and the termination resistor 1505. The second circuit 1520 includes a second plurality of transistors 1522a through 1522n (collectively referred to as second plurality of transistors 1522) and a plurality of resistors 1524a through 1524n (collectively referred to as plurality of resistors 1524). Each of the plurality of resistors 1524 is connected in parallel with a corresponding transistor of the second plurality of transistors 1522 providing a transistor, resistor pair, similar to the second circuit 1020 of FIG. 10. Each transistor, resistor pair is connected in series with a next transistor resistor pair and transistor 1022n and resistor 1024n are connected to the termination resistor 1005.

In the illustrative example of FIG. 15, second plurality of transistors 1522 includes two transistors 1522a and 1522n and two resistors 1524a and 1524n. Source terminal of transistor 1522a and a first terminal of resistor 1524a are connected to drain terminals of transistors 1512 of the first circuit 1510. Drain terminal of transistor 1522 and second terminal of the resistor 1524 are connected to source terminal of resistor 1524n and to a first terminal of resistor 1524n. Drain terminal of transistor 1522n and second terminal of resistor 1524n are connected to a first terminal of termination resistor 1505 having a second terminal connected to the data bus. Gate terminals of transistors 1522 receive a voltage level based on the ZQ calibration code as described above in connection with FIG. 10. Additionally, the second circuit 1520 functions to compensate for global variations in a manner as described above in connection with the second circuit 1020.

The third circuit 1530 (also referred to herein as the dynamic range compensation circuit 1530) includes a third one or more transistors 1532 that are connected in parallel to the first circuit 1510. In the illustrative example of FIG. 15, the third one or more transistors 1532 includes one transistor that is connected in parallel with the first plurality of transistor 1512. For example, a source terminal of transistor 1532 is connected to the low voltage supply VSS (or ground) and to source terminals of the first plurality of transistors 1512. A drain transistor of transistor 1532 is connected to drain terminals of the first plurality of transistors 1512. A gate terminal of transistor 1532 receives a voltage level responsive to activating the leg unit 1000, for example, based on the termination command code as described in connection with FIG. 10 above. When the leg unit 1502 is activated, a voltage level is applied to the gate terminal of transistor 1532 that turns transistor 1532 ON and draws current from termination resistor 1505 through the third circuit 1530. As a result, the dynamic range of the total effective resistance in the leg unit 1502 is reduced similar to the third circuit 1030 of FIG. 10. While the example implementation of FIG. 15 includes a single transistor as the third circuit 1530, other implementations are possible, for example, a plurality of transistors may be connected so as to provide similar functionality as desired.

Furthermore, leg unit 1502 comprises a fourth circuit including a switch 1540 that is driven according to output data. For example, switch 1540 is illustratively implemented as a n-channel MOSFET (nMOS transistor) having DOUT applied to its gate terminal. Thus, when data is provided at a logic low level (e.g., a binary value of "0"), the transistor 1240 is turned on and connects the voltage supply VSS to the first circuit 1510.

The circuit 1500 is similar to circuit 1200 of FIG. 12, except that each leg unit LU0-LU1 is provided as an instance of leg unit 1502 and that the ZQCalCode is provided as a bit pattern signal that specifies which of transistors 1512 and 1522 to be activated. As an example of a pull-down output driver circuit, the ZQCalCode may be a ZQPDCalCode. Similar to circuit 1100, for leg unit 1502, the ZQCalCode can be a multi-bit signal corresponding to the number of transistors 1512 and 1522 and comprise a first portion corresponding to transistors 1512 (e.g., ZQ[0:5] in the illustrative example of FIG. 15) and a second portion corresponding to transistors 1522 (e.g., ZQ[6:7] in the illustrative example of FIG. 15). Furthermore, each leg unit LU0-LU7 is connected between the data bus and the low voltage supply VSS (or ground), opposed to the voltage source VDDQ of FIG. 11. Additionally, as described above in connection with FIG. 11, an additional NAND gate 1504 is provided that receives an inverted VSS signal and an enable signal at its inputs which are used to drive the third circuit 1530.

The leg unit 1502 may be trimmed according to the method 1300 of FIG. 13, as described above.

Figure 16H:
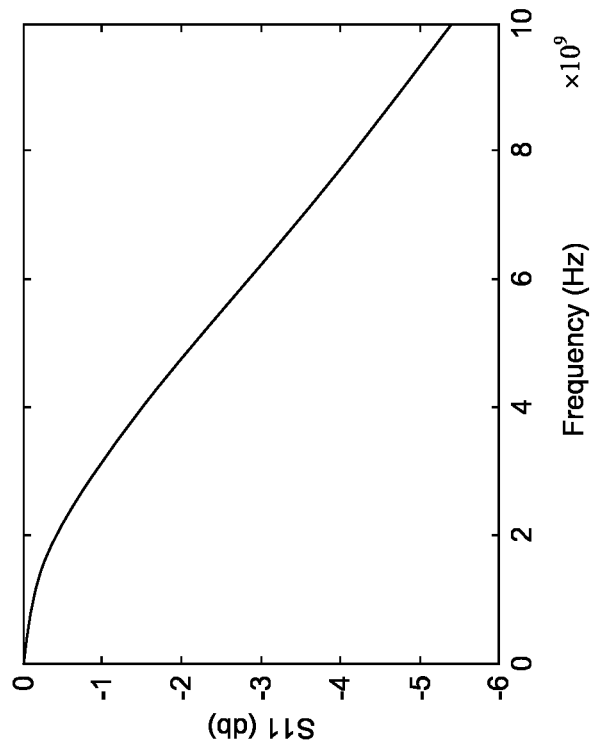

FIGS. 16A-16H depict various results provided from simulations of the leg unit 1502 of FIG. 15. The results are similar, if not identical to the results shown in FIGS. 14A-14H. FIG. 16A-16C are example plots illustrating total effective impedance provided by the leg unit 1502 as a function of ZQ calibration code, converted to decimal format, across temperature variations, for example, simulation results for −20° C. is shown in FIG. 16A, 25° C. in FIG. 16B, and 120° C. in FIG. 16C. To generate FIGS. 16A-16B, 100 Monte Carlo simulations were performed across all 15 process corners of the leg unit 1502 and the voltage on the data bus was set to 0.88V and the target impedance was 240 ohms (as indicated by the dotted line in each figure). In each of FIG. 16A-16C, the second circuit 1520 of leg unit 1502 was calibrated, thus the figures are plotted as a function of the first portion of ZQ calibration code (e.g., ZQe[0:5]).

As shown in FIGS. 16A-16C, for each temperature point, there are a range of ZQ calibration codes for all process corners that can be used to calibrate the leg unit 1502 such that the total effective impedance that corresponds with the target impedance (e.g., 240 ohms). Furthermore, as the temperature increases, the range of ZQ calibration codes that provide the desired total effective impedance increases. Additionally, FIGS. 16A-16C show a close grouping of the various corners, compared to FIG. 9 which provide a large spread between the three process corners of the termination resistor.

FIGS. 16D-16F are histograms of the Monte Carlo simulations of FIGS. 16A-16C. FIGS. 16D-16F illustrate counts of the Monte Carlo simulations as a function of total effective impedance for each temperature point (e.g., 20° C. is shown in FIG. 16D, 25° C. in FIG. 16E, and 120° C. in FIG. 16F).

Figure 16G:
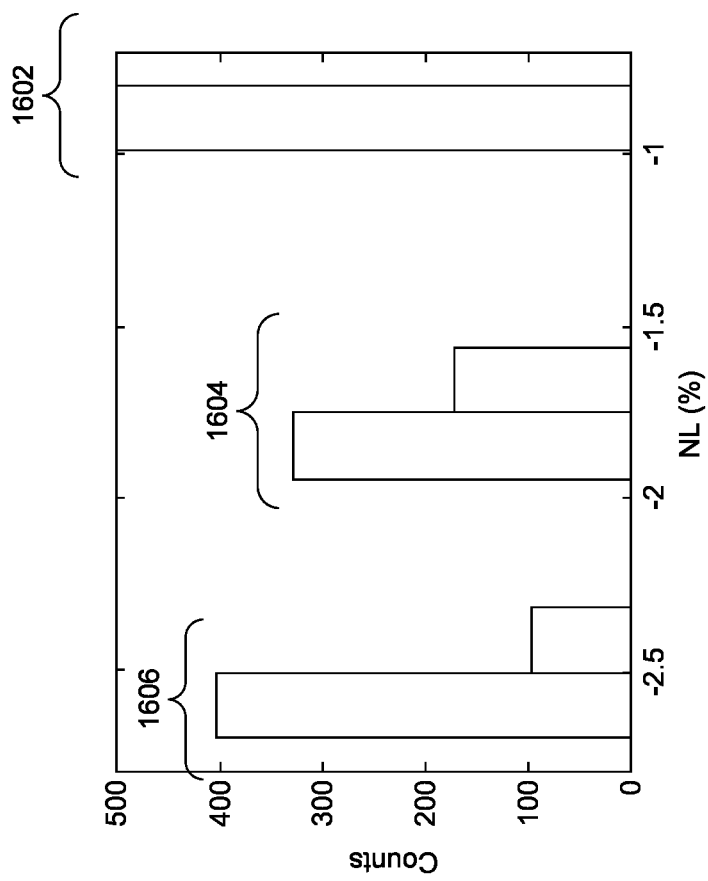

FIG. 16G is a histogram of Monte Carlo simulations of leg unit 1502 across all corners depicting non-linearity errors. To generate FIG. 16G, the leg unit 1502 was calibrated for local and global variations with the voltage on the data bus set to 0.8xVDDQ, where VDDQ in the simulations was set to 1V. One hundred Monte Carlo simulations were performed across all corners of the leg unit 1502 by changing the voltage (e.g., the voltage swing) on the data bus between 0.2 V (e.g., low voltage supply VSS) and 1 V (e.g., voltage supply VDDQ). FIG. 16G illustrates counts of the Monte Carlo simulations as a function of non-linearity error of the calibrated leg unit 1502 as a percentage, in a case where the leg unit is activated (or ON). In FIG. 16G, bar 1602 represents counts for a termination resistor 1505 at the Rmax process corner, bars 1604 represent counts for a termination resistor 1505 at the Rtt process corner, and bars 1606 represent counts for a termination resistor 1505 at the Rmin process corner.

Non-linearity error (NL) was calculated by taking a difference between the total effective impedance of the leg unit 1502 measured when the voltage on the data line is at 1 V ($R_{on@1V}$) and the total effective impedance of the leg unit 1502 measured when the voltage on the data line is at 0.2 V ($R_{on@0.2V}$). This difference is divided by the total effective impedance of the leg unit 1502 measured when the voltage on the data line is at the calibrated voltage of 0.88 V ($R_{on@0.88V}$). The result is then multiplied by 100 to provide a percentage. That is NL=$((R_{on@1V}-R_{on@0.2V})/R_{on@0.88V})\times 100$.

As shown in FIG. 16G, the leg unit 1502 provides good linearity over the simulated voltage swing. For example, the simulated NL was between −2.5% (for the Rmin process corner) and −1% (for the Rmin process corner), which is a significant improvement of the non-linearity achieved by the leg units shown in FIGS. 8A-8D (e.g., 3 times or 300% error).

FIG. 16H is an example plot of voltage reflection coefficient (S11) on the data bus from a leg unit as a function of frequency. S11 may be representative of parasitic losses in the circuit. FIG. 16H is generated by simulation of the leg unit 1502, and from FIG. 16H it is seen that there are minor parasitic losses in the circuit. For example, there is minor reduction in S11 over a range of frequencies. As an example, if working on 3.2 GHz, S11 is −1 dB, which is a negligible loss.

Figure 17:
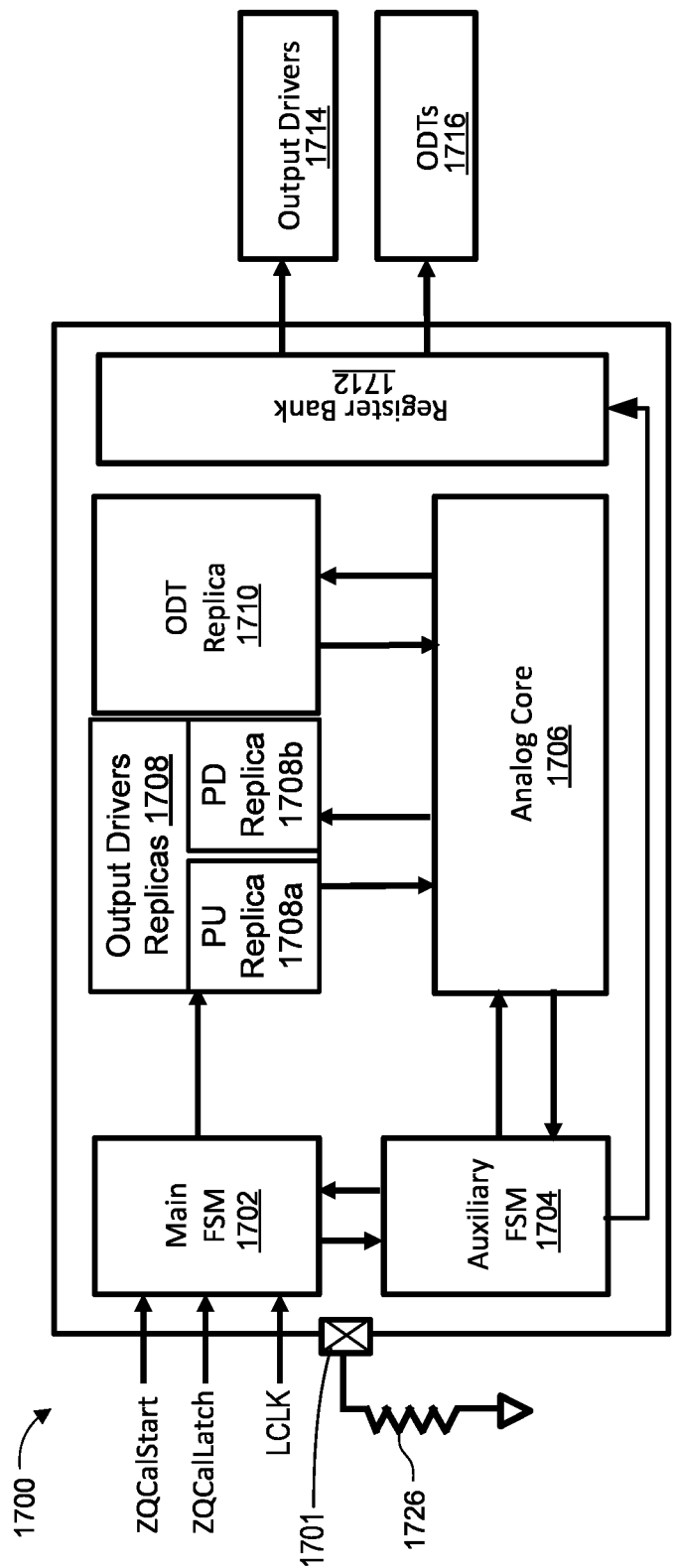
FIG. 17 is a block diagram of an example architecture of a ZQ calibration device according to an embodiment of the disclosed technology.

FIG. 17 is a block diagram of an example architecture of a ZQ calibration device 1700 according to an embodiment of the disclosed technology. The ZQ calibration device 1700 may be an example architecture of the ZQ calibration circuit 524 of FIG. 5. The ZQ calibration device 1700 generates one or more ZQ calibration code signals used to program terminations in termination components of a memory die, such as ODT 1716 and output drivers 1714. The ODT 1716 may be an example of termination component 612 of FIG. 6A, which may be implemented as, for example, circuit 700 of FIG. 7, circuit 1100 of FIG. 11, or any other ODT known in the art. The output drivers 1714 may include pull-up and/or pull-down components. Pull-up output driver component may be an example of pull-up output driver 616 of FIG. 6B, which may be implemented as, for example, as the variation of circuit 700 as described in connection with FIG. 7, circuit 1200 of FIG. 12, or any other pull-up output driver component known in the art. Pull-down component may be an example of the pull-down output driver 618 of FIG. 6B, which may be implemented as, for example, the variation of circuit 700 as described in connection with FIG. 7, circuit 1500 of FIG. 15, or any other pull-down output driver component known in the art.

Programming ODT 1716 and output drivers 1714 may include, for example, trimming the total effective impedance based on reference to impedance of a reference calibration device 1726 having a known and stable impedance. For example, the ZQ calibration device 1700 is connected to ZQ resistor 1726 having a known impedance value RZQ (e.g., resistance) via ZQ pin 1701 (also referred to herein as a reference node). ZQ resistor 1726 may be substantially similar to ZQ resistor 526 of FIG. 5. The ZQ calibration device 1700 generates the ZQ calibration code using on the impedance of the ZQ resistor 1726 as a reference. Because ZQ resistor 1726 is located external to the circuit 1700, the impedance of ZQ resistor 1726 is generally stable regardless of the operating conditions such as, for example, the temperature of the memory die and/or supply voltage VDDQ. The reference calibration device is off chip (e.g., off die) and generally grounded via coupling to a substrate or motherboard of the memory device.

The ZQ calibration device 1700 comprises a main finite state machine (FSM) 1702, an auxiliary FSM 1704, an analog core 1706, output driver replicas 1708 including a pull-up replica 1708*a* and a pull-down replica 1708*b*, ODT replica 1710, and an internal register bank 1712. As used herein, FSM refers to a model that can be in one of a finite number of states at any given time, and changes between state in response to inputs that cause the FSM to transition from one state to another. The main FSM 1702 comprises a plurality of states that controls the overall calibration process, where transitions between states may be an automated sequence of a current state or responsive to an external input, for example, from a circuit external to ZQ calibration device 1700 or the auxiliary FSM 1704. The main FSM 1702 is triggered either responsive to a ZQ calibration start signal (ZQCalStart) signal that transitions the main FSM 1702 to initiate a calibration process during which calibration parameters are determined or responsive to a ZQ latch signal (ZQCalLatch) to initialize latching calibration parameters as one or more ZQ calibration codes to the output drivers 1714 and ODT 1716. In some examples, the ZQ calibration start signal and ZQ calibration latch signal may be received from a logic control circuit, such as logic control circuit 506 of FIG. 5. The main FSM 1702 also triggers the analog core 1706 to configure for calibrating the output driver replica 1708 and ODT replica 1710. Additionally, the main FSM 1702 receives a LCLK signal, for example, from the clock input circuit 522, which is used as a timing signal for sampling the calibration process. An example process performed by the main FSM 1702 is described with reference to FIG. 19 below.

The auxiliary FSM 1704 comprises a plurality of states that performs calibration operations of output driver replicas 1708 and ODT replica 1710 based on ZQ resistor 1726, where transitions between states may be automated sequences of a current state or responsive to an input from the main FSM 1702. For example, responsive to the ZQ calibration start signal, the main FSM 1702 sends a calibration trigger signal (cal_trig) to the auxiliary FSM 1704, which triggers the auxiliary FSM 1704 execute a calibration operation and determine calibration parameters one or more of the pull-up replica 1708*a*, pull-down replica 1708*b*, or ODT 1710. During the calibration operation, the auxiliary FSM 1704 stores the calibration parameters to internal register bank 1712. Once the operation is completed, the auxiliary FSM 1704 sends a calibration complete signal (Cal_done) to the main FSM 1702.

The auxiliary FSM 1704 performs separate calibration operations for each of the pull-up replica 1708*a*, the pull-down replica 1708*b*, and ODT replica 1710. For example, the main FSM 1702 sends separate calibration trigger signals, each of which triggers the auxiliary FSM 1704 to perform a separate calibration operation on a respective replica, determine calibration parameters for the respective replica, and send a calibration complete signal to the main FSM indicating the respective calibration operation is completed. During each calibration operation, the auxiliary FSM 1704 stores and updates the respective calibration parameters in the internal register bank 1712. In some embodiments, a calibration operation comprises two phases, a course calibration phase and a fine calibration phase, which may be performed after the course calibration phase is complete. An example process performed by the auxiliary FSM 1704 is described with reference to FIG. 20 below.

The analog core 1706 comprises calibration circuitry that is configured into one of a plurality of configurations during one or more states of the main FSM 1702 and used during calibration operations of the auxiliary FSM 1704 to determine the calibration parameters. The analog core 1706 comprises a plurality of electrical devices and circuits that are leveraged by the FSMs 1702 and 1704, including, but not limited to, a reference voltage generator, comparator circuits, amplifiers, and various switches and transistors. The analog core 1706 may be connected to, or otherwise comprise, the ZQ resistor 1726, the ODT replica 1710, and output driver replica 1708. States of the main FSM 1702 may control the various switches and transistors to separately connect and disconnected the ODT replica 1710, the pull-up replica 1708*a*, and pull-down replica 1708*b*. The switches may also be controlled to connect a reference voltage generator to the rest of the analog core 1706 and connect input terminals of a comparator circuit to nodes of the analog circuit 1706, which may be used to determine calibration parameters for the connected ODT replica 1710, pull-up replica 1708*a*, or pull-down replica 1708*b*.

The output driver replicas 1708 and ODT replica 1710 are replications of a single leg unit, such as for example, leg unit of FIGS. 8A-8D, leg unit of FIG. 10, leg unit of FIG. 15, or any leg unit known in the art). Each replica comprises a plurality of termination devices, such as transistors, that may be controlled to adjust the total effective resistance of the respective replica. The replicas 1708 and 1710 replicate the resistance values of a leg unit, which the calibration operation adjusts based on the ZQ resistor 1726 as a reference. The auxiliary FSM 1704 performs separate calibration operations on each replica 1708*a*, 1708*b*, and 1710 to determine calibration parameters, for example, by activating/deactivating termination devices of the respective replica until the total effective resistance of the respective replica matches that of the ZQ resistor 1726. The auxiliary FSM 1704 determines calibration parameters according to which termination devices are to be activated that result in a total effective resistance that matches the reference resistance. The calibration parameters are then stored, for example, as a n-bit wide binary code, where n is an integer corresponding to the number of termination devices included in the replica.

The internal register bank 1712 stores the calibration parameters obtained from the auxiliary FSM 1704 until the main FSM 1702 receives a ZQ latch command. At which point, the calibration parameters for each replica is latched, as a respective ZQ calibration code, to a register for the corresponding termination component. For example, a calibration parameters determined by the auxiliary FSM 1704 calibrating the pull-up replica 1708*a* is latched as a ZQ calibration code to a register of the pull-up output driver circuit of the output drivers 1714, which can be used to trim the impedance of the pull-up output driver circuit as described above with reference to FIGS. 7-8D and 10-13. Similar procedures are performed for the pull-down output driver circuit of the output drivers 1714 and ODT circuit of the ODT 1716.

Figure 19:
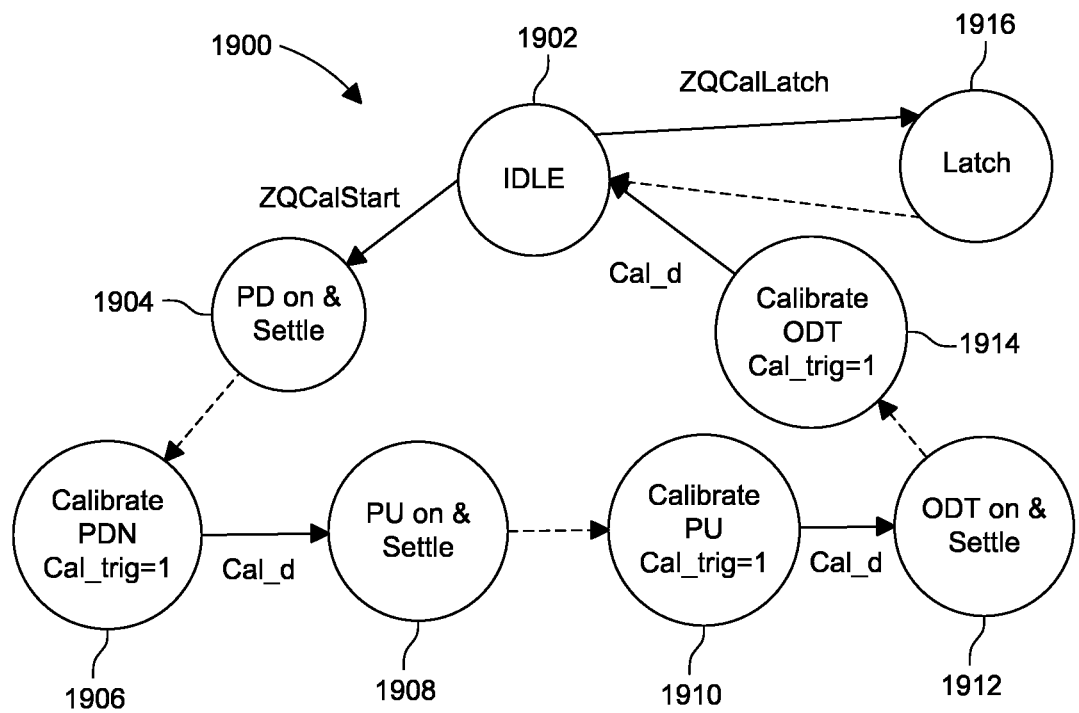
FIGS. 19 and 20 are process flows depicting example methods of performing a ZQ calibration process according to embodiments of the disclosed technology.
Figure 20:
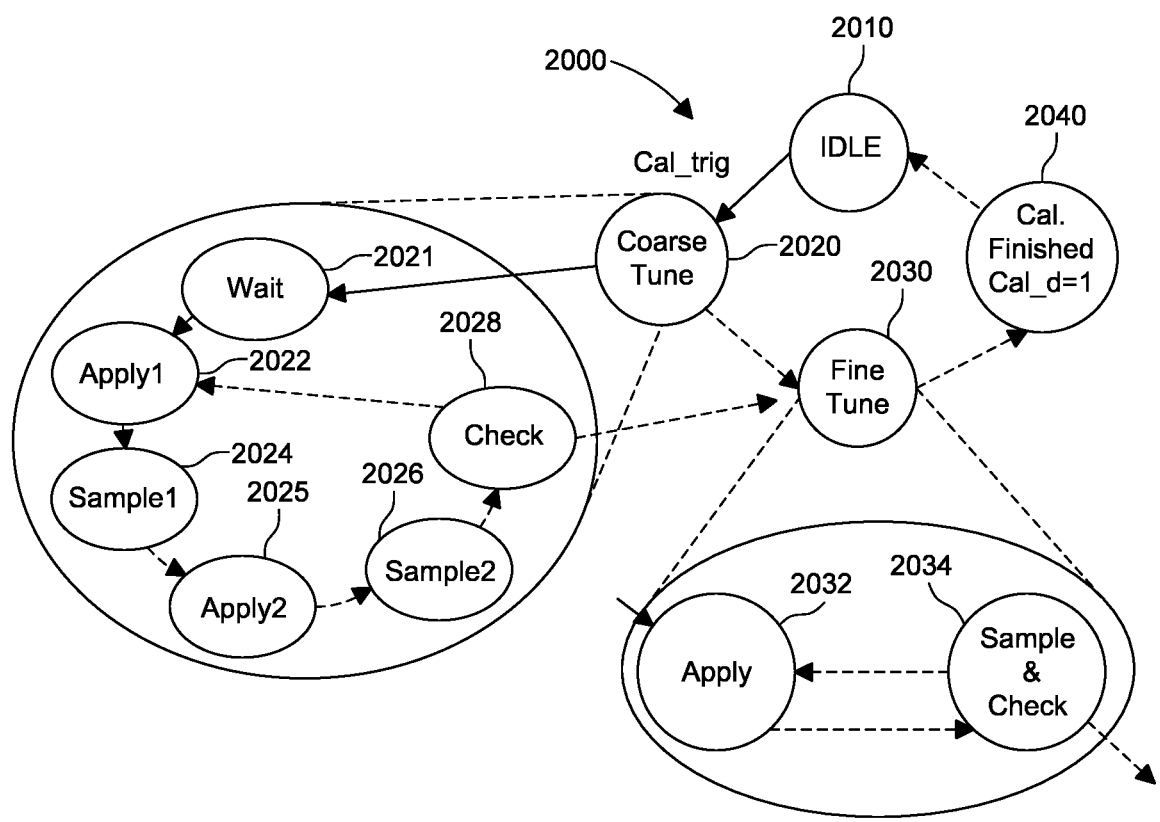

FIGS. 18A-18E depict an example circuit implementation 1800 of a ZQ calibration device according to embodiments of the disclosed technology. FIGS. 19 and 20 are process flows depicting example processes 1900 and 2000 for performing a calibration process using circuit 1800 according to embodiments of the disclosed technology. The processes 1900 and 2000 will be described hereinafter in the context of the example circuit implementation 1800.

Figures 18A, 18B:
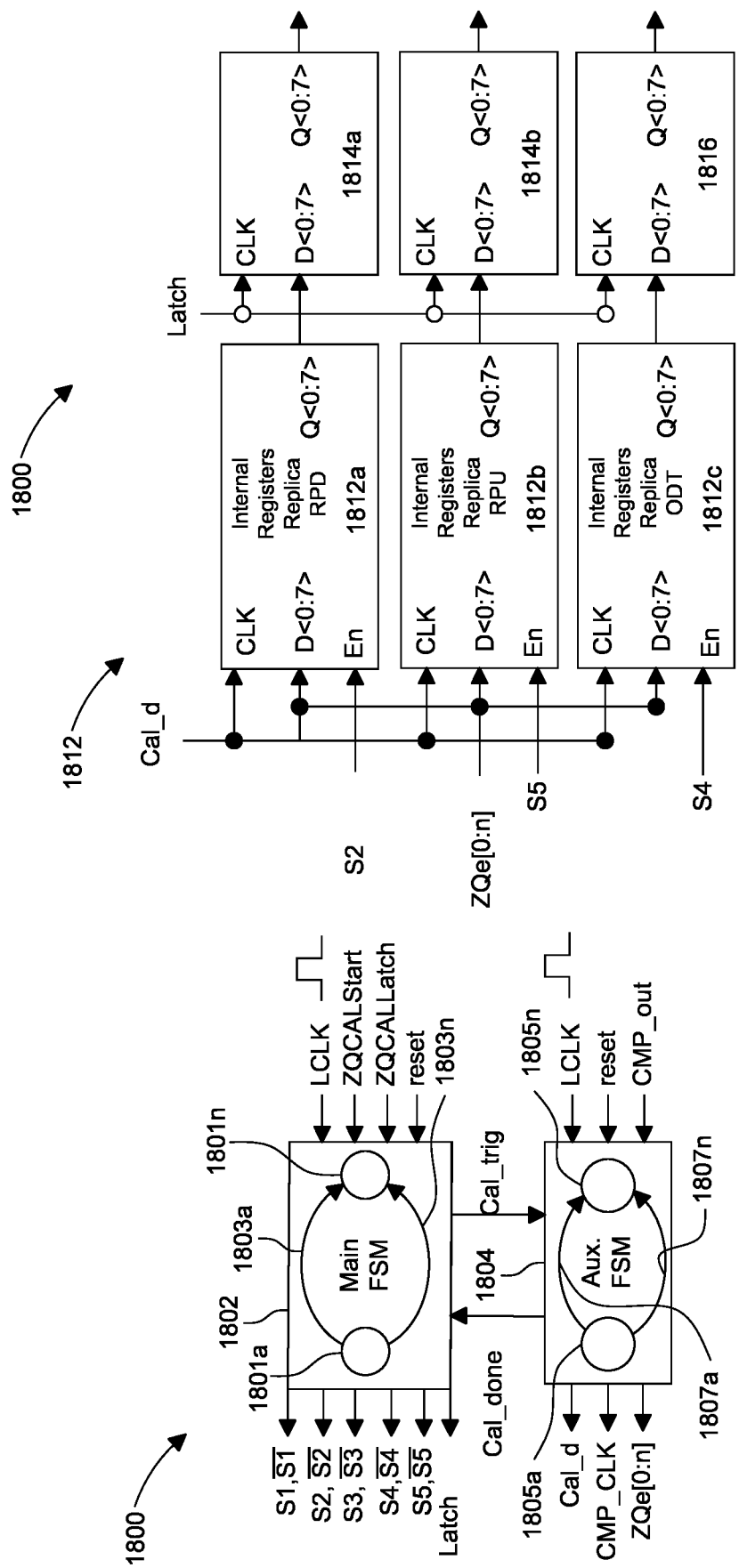
FIGS. 18A-18E depict an example circuit implementation of a ZQ calibration device according to embodiments of the disclosed technology.
Figure 18C:
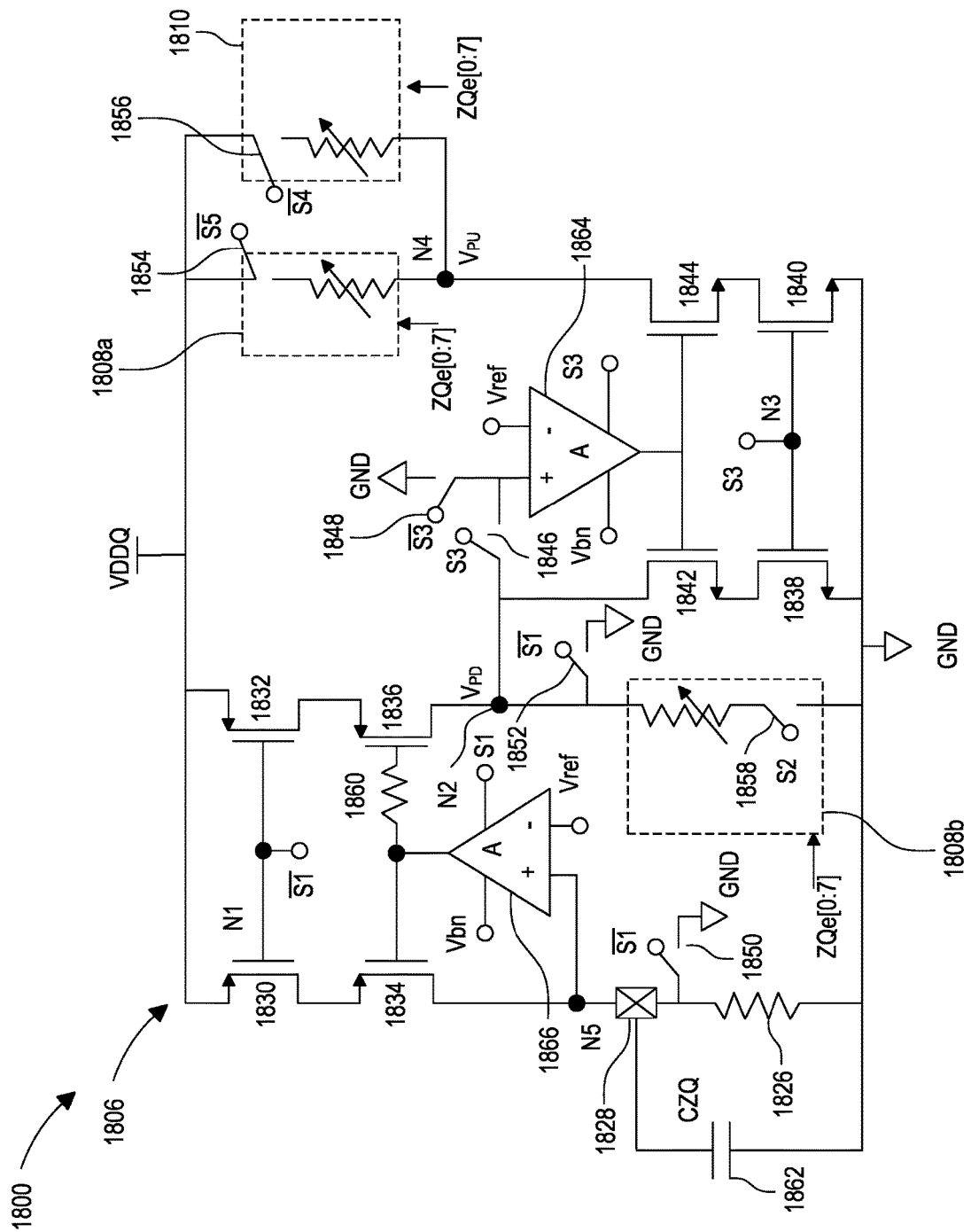
Figure 18D:
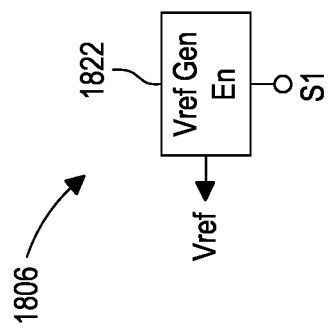
Figure 18E:
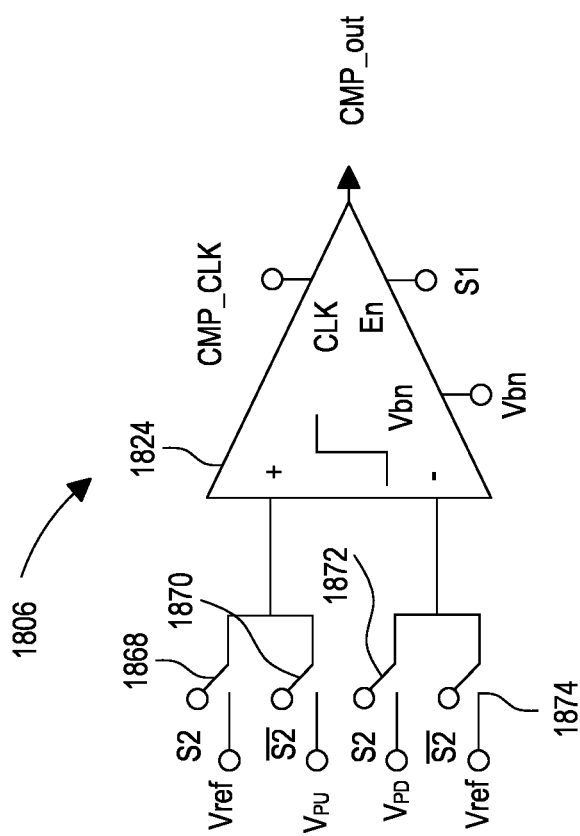

FIG. 18A depicts example implementations of a main FSM 1802 and an auxiliary FSM 1804 of the circuit 1800, along with signals received and transmitted by the main FSM 1802 and the auxiliary FSM 1804. The auxiliary FSM 1804 and/or the main FSM 1802 may be referred to herein as a third circuitry FIG. 18B illustrates depicts example implementations of an internal register bank 1812 and termination component registers 1814a,b and 1816, along with signals received thereby. FIGS. 18C-18E depict an example implementation of an analog core 1806, along with signals received and transmitted by the analog core 1806. Circuit 1800 may be an example implementation of the ZQ calibration device 1700 of FIG. 17. As such, the main FSM 1802 may be an example implementation of the main FSM 1702, the auxiliary FSM 1804 may be an example implementation of the auxiliary FSM 1704, the analog core 1806 may be an example implementation of the analog core 1706, the internal register bank 1812 may be an example implementation of the internal register bank 1712, registers 1814a,b may be an example implementation of registers connected to output drivers 1714, and register 1816 may be an example implementation of registers connected to ODT 1716.

Referring first to FIG. 18A, the main FSM 1802 comprises a plurality of states 1801a-1801n (collectively referred to as states 1801) connected by a plurality of transitions 1803a-1803n (collectively referred to as transitions 1803) for controlling the overall operation of a calibration process. Transitions 1803 may be triggered by an automated sequence of a current state or responsive to an input. For example, the main FSM 1802 receives various inputs, such as but not limited to, a ZQCalStart (e.g., ZQ calibration start signal) used to trigger a calibration process, ZQCalLatch (e.g., ZQ latch signal) used to trigger latching results of the ZQ calibration process (e.g., ZQ calibration code) to registers 1814a,b and 1816, reset signal, Cal_done (e.g., calibration complete signal) from the auxiliary FSM 1804, and a LCLK signal used as a timing signal for performing a calibration process. The main FSM 1802 also outputs various signals based on the current state of the main FSM 1802, such as but not limited to, control signals S1, $\overline{S1}$, S2, $\overline{S2}$, S2, $\overline{S3}$, S4, $\overline{S4}$, S5, and $\overline{S5}$ (where S# represents an inversion of S #) that operate or more switches and/or transistors of the analog core 1806 so to configure the analog core 1806 for a calibration operation; a latch signal that instructs circuit 1800 to latch a calibration process results to the registers 1814a,b and 1816; and a Cal_trig (e.g., calibration trigger signal) provided to the auxiliary FSM 1804 to trigger a calibration operation.

The auxiliary FSM 1804 comprises a plurality of states 1805a-1805n (collectively referred to as states 1805) connected by a plurality of transitions 1807a-1807n (collectively referred to as transitions 1807) for performing a calibration operation. Transitions 1807 may be triggered by an automated sequence based on a current state or responsive to an input. For example, the auxiliary FSM 1804 receives various inputs, such as but not limited to, the Cal_trig (e.g., calibration trigger signal) from the main FSM 1802 that triggers a calibration operation for a current configuration of the analog core 1806; a CMP_out (e.g., comparator output signal) from a comparator circuit 1824 of FIG. 18E; a reset signal; and the LCLK signal, for example, from the clock input circuit 522 of FIG. 5. The auxiliary FSM 1804 also outputs various signals based on the current state of the auxiliary FSM 1804, such as but not limited to, a CMP_CLK signal used as a timing signal for the comparator circuit 1824 based on the LCLK signal, the Cal_done signal to the main FSM 1802 to notify the main FSM 1802 that a given calibration operation is completed, a Cal_d signal used as a timing signal for the internal register bank 1812, and a ZQe[0:n] signal (e.g., ZQ calibration code) that is determined by the auxiliary FSM 1804 based on the CMP_out. ZQe[0:n] signal may be provided as a signal having a n-bit wide bit pattern, where n may correspond to a number of termination devices of a given leg unit and the value of each bit corresponds to a calibration parameter of a respective termination device.

Turning to FIG. 18B, the internal register bank 1812 comprises a plurality of registers 1812a-c, each corresponding to one of replicas 1808a, b, and 1810, and operates to temporally store ZQ calibration codes. For example, the analog core 1806 may be connected to or comprise ODT replica 1710 and output driver replicas 1708, which includes pull-up replica 1808a and pull-down replica 1808b. Accordingly, internal register bank 1812 comprises an internal register 1812a for the pull-up replica 1808a, internal register 1812b for the pull-down replica 1808b, and internal register 1812c for the ODT replica 1810. Each register 1826-1830 may be an n-bit register, where n is the number of bits (e.g., calibration parameters) in the ZQ calibration code. Each internal register 1812 receives inputs from the main FSM 1802 and the auxiliary FSM 1804. For example, the main FSM 1802 may provide an enable signal (EN) that is based on the configuration of the analog core 1806 being calibrated during a current calibration operation of the auxiliary FSM 1804 and the auxiliary FSM 1804 sends the ZQe[0:n] signal of a current calibration operation and the cal_d signal as a timing signal for storing the ZQe[0:n] signal at the respective register. That is, in an illustrative example, the main FSM 1802 transmits certain control signals to configure switches of the analog core 1806 to calibrate, for example, the pull-up replica 1808a and one of the control signals is used as the enable signal to enable the register 1812a. The auxiliary FSM 1804 performs a calibration operation that calibrates the pull-up replica 1808a, and, once the operation is completed, transmits the Cal_d signal and the ZQe[0:n] signal to the register 1812a. The register 1812a samples the ZQe[0:n] signal according to the Cal_d signal as a clock signal and stores the bit pattern encoded on ZQe[0:n] signal as data. This process is repeated for each configuration of the analog core 1806, for example, for storing a calibration for the pull-down replica 1808b to register 1812b and storing a calibration for the ODT replica 1810 to register 1812c.

The registers 1814a,b and 1816 operate to latch ZQ calibration codes for each replica 1808a, b and 1810. For example, the register 1814a latches a ZQ calibration code determined using the pull-up replica 1808a for the pull-up output driver circuit (e.g., the pull-up output driver 616 of FIG. 6B, the variation of circuit 700 as described in connection with FIG. 7, 1200 of FIG. 12, or any other pull-up component known in the art). Similarly, register 1814b latches a ZQ calibration code determined from the pull-down replica 1808b for the pull-down output driver circuit (e.g., the pull-down output driver 616 of FIG. 6B, the variation of circuit 700 as described in connection with FIG. 7, 1500 of FIG. 15, or any other pull-down output driver component known in the art) and register 1816 latches a ZQ calibration code determined from the ODT replica 1810 for the ODT circuit (e.g., ODT 612 of FIG. 6A, the circuit 700 of FIG. 7, 1100 of FIG. 11, or any other ODT known in the art). Each register 1814a,b and 1816 receives the latch signal from the main FSM 1802 and the ZQ calibration code as a bit pattern (e.g., ZQe[0:n]) from the corresponding internal register 1812a-c, respectively. For example, responsive to receiving a ZQCalLatch signal, the main FSM 1802 sends the trigger signal to each register 1814a, b and 1816, each obtains the corresponding ZQe[0:n] bit pattern from the corresponding internal register 1812, and latches the ZQe [0:n] bit pattern to the register 1814a,b and c. The latched ZQe[0:n] can then be used to calibrate the respective termination circuit as described above with reference to FIGS. 7-8D, 10-13, 15, and 16.

Referring to FIGS. 18C-E, the analog core 1806 comprises a main circuit as shown in FIG. 18A, a reference voltage generator circuit 1822 shown in FIG. 18D, and a comparator circuit 1824 shown in FIG. 18E. As alluded to above, the analog core 1806 receives various control signals from the main FSM 1802 that configure the analog core 1806 into one of a plurality of configurations. For example, the analog core 1806 may comprise an idle configuration, a pull-down replica configuration for calibrating the pull-down replica 1808b, a pull-up replica configuration for calibrating the pull-up replica 1808a, and an ODT replica configuration for calibrating the ODT replica 1810. Furthermore, during each calibration configuration, the auxiliary FSM 1804 samples the comparator circuit 1824 and calibrates each respective replica based on the output from the comparator circuit 1824 (e.g., CMP_out). For example, the auxiliary FSM 1804 determines a ZQ calibration code and outputs the ZQ calibration code as the ZQe[0:n] signal based sampling the CMP_out signal.

The reference voltage generator circuit 1822 operates to generate a reference voltage that has a voltage level based on control signal S1 received from the main FSM 1802. For example, the main FSM 1802 may set the control signal S1 to logic high level (e.g., "1"), which causes the reference voltage generator circuit 1822 to output Vref at 0.8xVDD (e.g., 0.88 Volts in case where VDD is 1.1V). In a case that the control signal S1 is set to logic low level (e.g., "0") the reference voltage generator circuit 1822 outputs Vref at VDD. In some embodiments, the reference voltage generator circuit 1822 may be a resistive divider circuit.

The comparator circuit 1824 operates to compare a voltage level at a first input terminal (e.g., a plus side terminal) to a voltage level at a second input terminal (e.g., a negative side terminal) and output CMP_out from its output terminal that indicates which is of the voltage levels is larger. As will be described below, during each calibration operation, the CMP_out is used by the auxiliary FSM 1804 to change a replica circuit (e.g., change which termination devices of the replicated leg unit are active) until a set criteria is met that indicates the total effective resistance of the replica matches the resistance RZQ of ZQ resistor 1826.

The analog core 1806 comprises a plurality of transistors 1830-1844, a plurality of switches 1846-1858, a resistor 1860, a capacitor 1862, and a plurality of operational amplifiers 1864-1866. In the illustrative example of FIG. 18C, transistors 1830-1836 may be p-channel MOSFET (pMOS transistors) or another suitable semiconductor device and transistors 1838-1844 may be n-channel MOSFET (nMOS transistors) or another suitable semiconductor device. However, transistors 1830-1836 may be implemented as nMOS transistors and transistor 1838-1844 implemented as pMOS transistors. The analog core 1806 may include or otherwise be connected to a ZQ pin 1828 (also referred to herein as a reference node) that is coupled to the ZQ resistor 1826 having a known impedance value RZQ (e.g., resistance). In some embodiments, the value of RZQ can be, for example 240 ohms having a tolerance of ±1%. The ZQ resistor 1826 may be an example of ZQ resistor 526 of FIG. 5. The analog core 1806 may also comprise or otherwise be connected to pull-up replica 1808a, pull-down replica 1808b, and ODT replica 1810. The replicas 1808a, b and 1810 may be replications of a leg unit of a pull-up output driver, pull-down output driver, and/or ODT.

As shown in FIG. 18C, source terminals of transistors 1830 and 1832 are connected to supply voltage VDDQ, for example, supplied from voltage generation circuit 518 of FIG. 5. Gate terminals of transistors 1830 and 1832 are connected to node N1, which receives control signal $\overline{S1}$ from the main FSM 1802 and function as switches. Drain terminals of transistors 1830 and 1832 are connected to source terminals of transistors 1834 and 1836, respectively. Gate terminal of transistor 1834 is connected to an output terminal of operational amplifiers 1866, which is also connected to a resistor 1860 at a first terminal. A second terminal of resistor 1860 is connected to gate terminal of transistor 1836. At node N5, drain terminal of transistor 1834 is connected to a positive terminal of operational amplifiers 1866, which is driven by power supply voltage Vbn (e.g., a fixed bias voltage coming from the voltage source) and is enabled according to control signal S1 from the main FSM 1802 (e.g., when set to logic high level). The negative terminal of the operational amplifiers 1866 receives Vref from the reference voltage generator circuit 1822. The operational amplifier 1866 functions to ensure that the voltage at node N5, and thus the first terminal of the ZQ resistor 1826, is at Vref.

The drain terminal of transistor 1834 is also connected to the ZQ pin 1828, which is connected to first terminal of ZQ resistor 1826 via switch 1850 and to capacitor 1862 having a capacitance of CZQ. Capacitor 1862 functions to model the parasitic losses at ZQ pin 1828. Switch 1850 can be controlled, based on control signal $\overline{S1}$ from the main FSM 1802, to connect the drain terminal of transistor 1834 and first terminal of ZQ resistor 1826 to ground. The second terminal of ZQ resistor 1826 is connected to ground, as is capacitor 1862.

The drain terminal of transistor 1836 is connected to node N2, which is connected to a first terminal of the pull-down replica 1808b via switch 1852. Switch 1852 can be controlled, based on control signal $\overline{S1}$ from the main FSM 1802, to connect node N2 to ground. The second terminal of pull-down replica 1808b is connected to switch 1858, which is connected to ground. Switch 1858 can be controlled, based on control signal S2 from the main FSM 1802, to the second terminal of pull-down replica 1808b to ground.

Node N2 is also connected to switch 1846 and drain terminal of transistor 1842. Switch 1846 can be controlled, based on control signal $\overline{S1}$ from the main FSM 1802, to connect node N2 to a positive terminal of operational amplifiers 1864. The positive terminal of operational amplifiers 1864 is also connected to switch 1848, which can be controlled, based on control signal $\overline{S3}$ from the main FSM 1802, to the positive terminal of operational amplifiers 1864 to ground. The operational amplifiers 1864 is driven by power supply voltage Vbn and is enabled according to control signal S3 from the main FSM 1802 (e.g., when set to logic high level). Output terminal of operational amplifiers 1864 is connected to gate terminals of transistors 1842 and 1844. The operational amplifier 1864 functions to ensure that the voltage at node N2 is at Vref, similar to operational amplifier 1866. Source terminal of transistor 1842 is connected to drain terminal of transistor 1838 having a source terminal connected to ground. Gate terminal of transistor 1838 is connected to node N3, which is controlled based on control signal S3 from the main FSM 1802. Node N3 is also connected to gate terminal of transistor 1840, which has its source terminal connected to ground and its drain terminal connected to source terminal of transistor 1844.

Drain terminal of transistor 1844 is connected to node N4, which is connected to second terminals of pull-up replica 1808a and ODT replica 1810. First terminal of pull-up replica 1808a and ODT replica 1810 are connected to switches 1854 and 1856, respectively. Switch 1854 can be controlled, based on control signal $\overline{S3}$ from the main FSM 1802, to connect first terminal of pull-up replica 1808a to the supply volage VDDQ and switch 1856 can be controlled, based on control signal $\overline{S4}$ from the main FSM 1802, to connect first terminal of ODT replica 1810 to the supply volage VDDQ.

In an illustrative example, if Vref is at 0.88V, then the voltage at node N5 will be at 0.88V and there will be constant current through the ZQ resistor 1826. If the voltage is 0.88V and RZQ is 240 ohms, then there will be a constant current through transistor 1830 to transistor 1834, when switch 1850 and transistors 1830 and 1832 are ON. Transistors 1834 and 1836 function to copy the current at node N5 to node N2. In a case where switch 1846 and transistor 1838 are OFF and switch 1858 is ON, all the current at node N2 flows through pull-down replica 1808b. As a result, if the voltage $V_{PD}$ at node N2 is 0.88V, this means that the total effective resistance of the pull-down replica 1808b is RZQ (e.g., 240 ohms). That is, if the voltage level at node N2 is the same as the voltage level at node N5 (e.g., set criteria), then the resistance of the replica 1808b is the same as the resistance of ZQ resistor 1826. If the voltage $V_{PD}$ differs from that of Vref (e.g., 0.88V) this means the total internal resistance of the replica 1808b differs from RZQ and can be adjusted to bring it up or down to RZQ, for example, by adjusting ZQe[0:7] input into replica 1808b.

The comparator circuit 1824 is configured to sample the voltage levels of the main circuit shown in FIG. 18C, compare the voltage levels, and generate CMP_out indicating which voltage level is larger. That is, referring to the above example, the comparator samples Vref and $V_{PD}$, compares the two voltages and outputs the comparison, which the auxiliary FSM 1804 uses to adjust active/inactive termination devices of the replica 1808b and determine calibration parameters. As shown in FIG. 18E, comparator circuit 1824 comprises a first, positive side terminal and a second, negative side terminal and is connected to a plurality of switches 1868-1874. The positive side terminal is connected to switches 1868 and 1870, which are controlled, based on control signals S2 and $\overline{S2}$ from the main FSM 1802, respectively, to connect the positive side terminal of the comparator circuit 1824 to Vref and node N4, respectively. Based on switches 1868 and 1870, the comparator circuit 1824 samples either the Vref or a voltage at node N4, which is the voltage into the pull-up replica 1808a ($V_{PU}$). The negative side terminal is connected to switches 1872 and 1874, which are controlled, based on control signals S2 and $\overline{S2}$ from the main FSM 1802, respectively, to connect the negative side terminal of the comparator circuit 1824 to node N2 and Vref, respectively. Based on switches 1872 and 1874, the comparator circuit 1824 samples either the Vref or a voltage at node N2, which is the voltage into the pull-down replica 1808b ($V_{PD}$). Thus, when main FSM 1802 sets S2 to logic high level (and $\overline{S2}$ to logic low level), the comparator circuit 1824 compares Vref at the positive side terminal to $V_{PD}$ at the negative side terminal and outputs an indication of which of the two voltage levels is larger, and vice versa.

In some embodiments, reference voltage generator circuit 1822 may be referred to herein as a first circuitry. Furthermore, in some embodiments, one or more of the operational amplifier 1866, transistors 1830-1836, resistor 1860, and the reference voltage generator circuit 1822 may be referred to as the first circuitry. As used herein, second circuitry may refer to one or more of transistors 1840-1842, switches 1848-1858, and operational amplifier 1864.

Referring to FIGS. 19 and 20, process 1900 depicts operations performed by the main FSM 1802 for a calibration process and process 2000 depicts operations performed by the auxiliary FSM 1804. Processes 1900 and 2000 depicts various operations, where each operation may represent a state 1801 of the main FSM 1802 or a state 1805 of the auxiliary FSM 1804 and each connection illustrates a transition 1803 or 1805. A solid line connecting two states represents that the transition is triggered by an input. A dashed line connecting two states represents an automated transition, whereby upon executing a first state the main FSM 1802 or auxiliary FSM 1804 transitions to the next state.

Figure 21A:
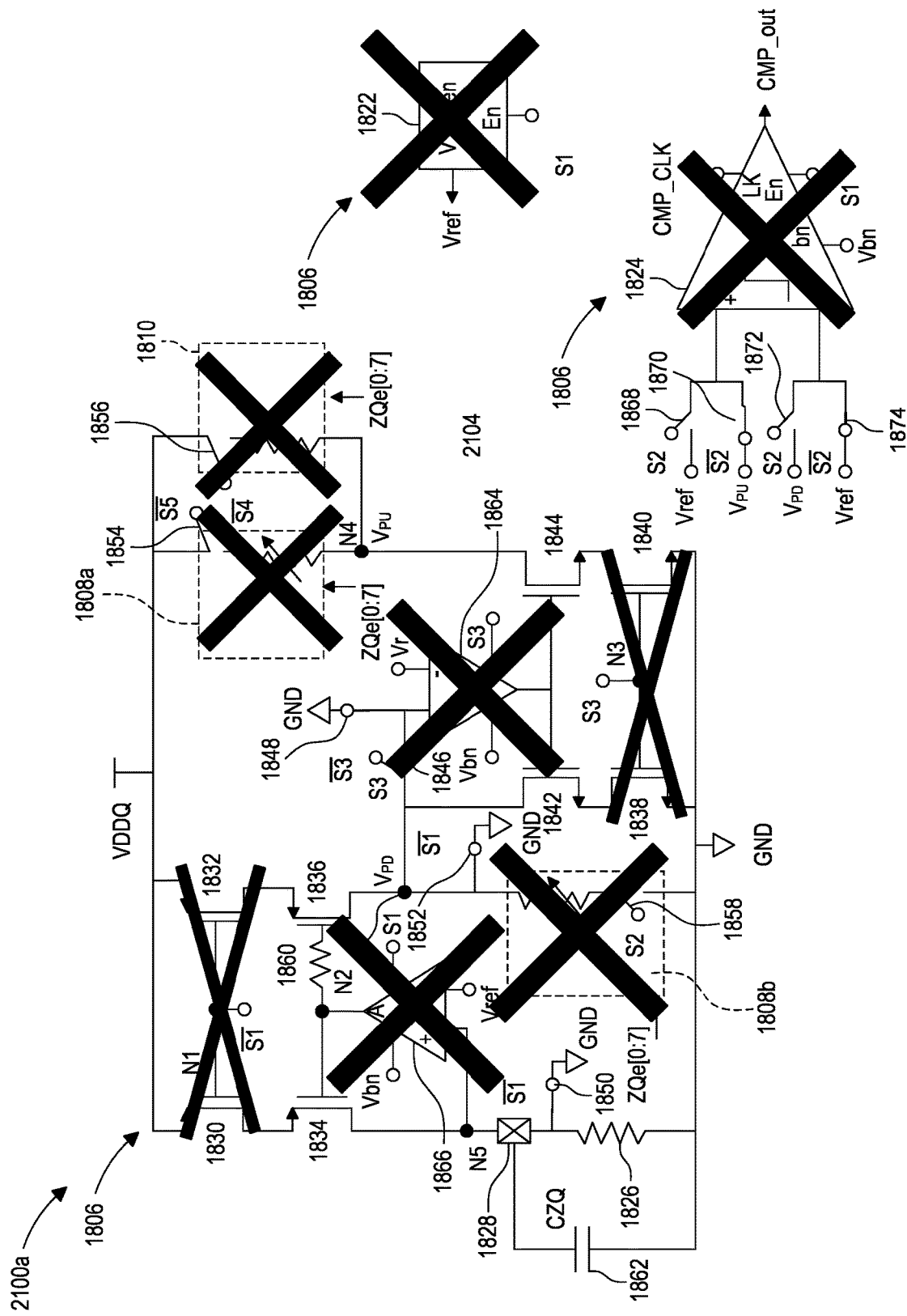
FIGS. 21A-21D depict various example configurations of the circuit of FIGS. 18A-18E at various states of the process of FIGS. 19 and 20 according to embodiments of the disclosed technology.
Figure 21B:
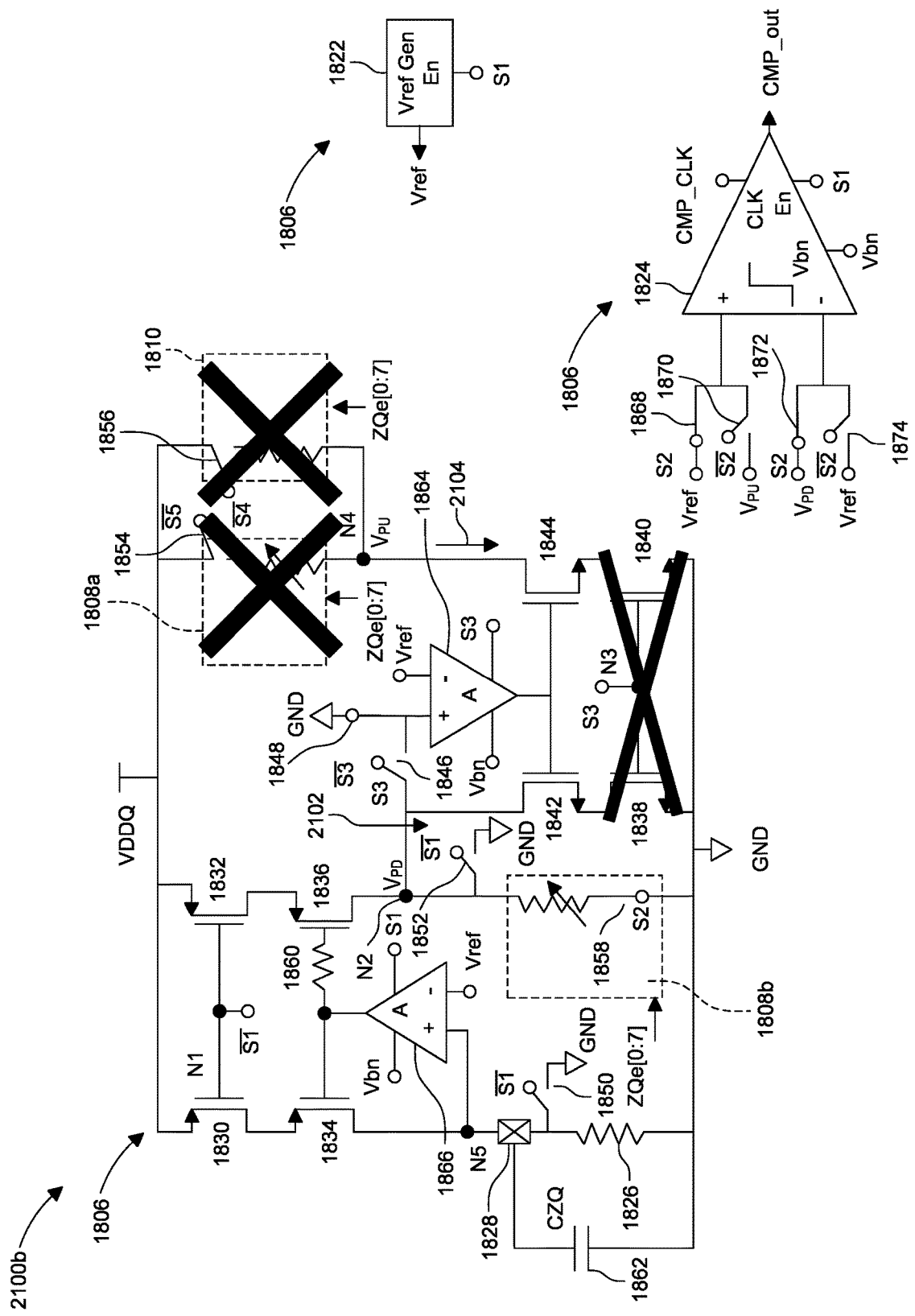
Figure 21C:
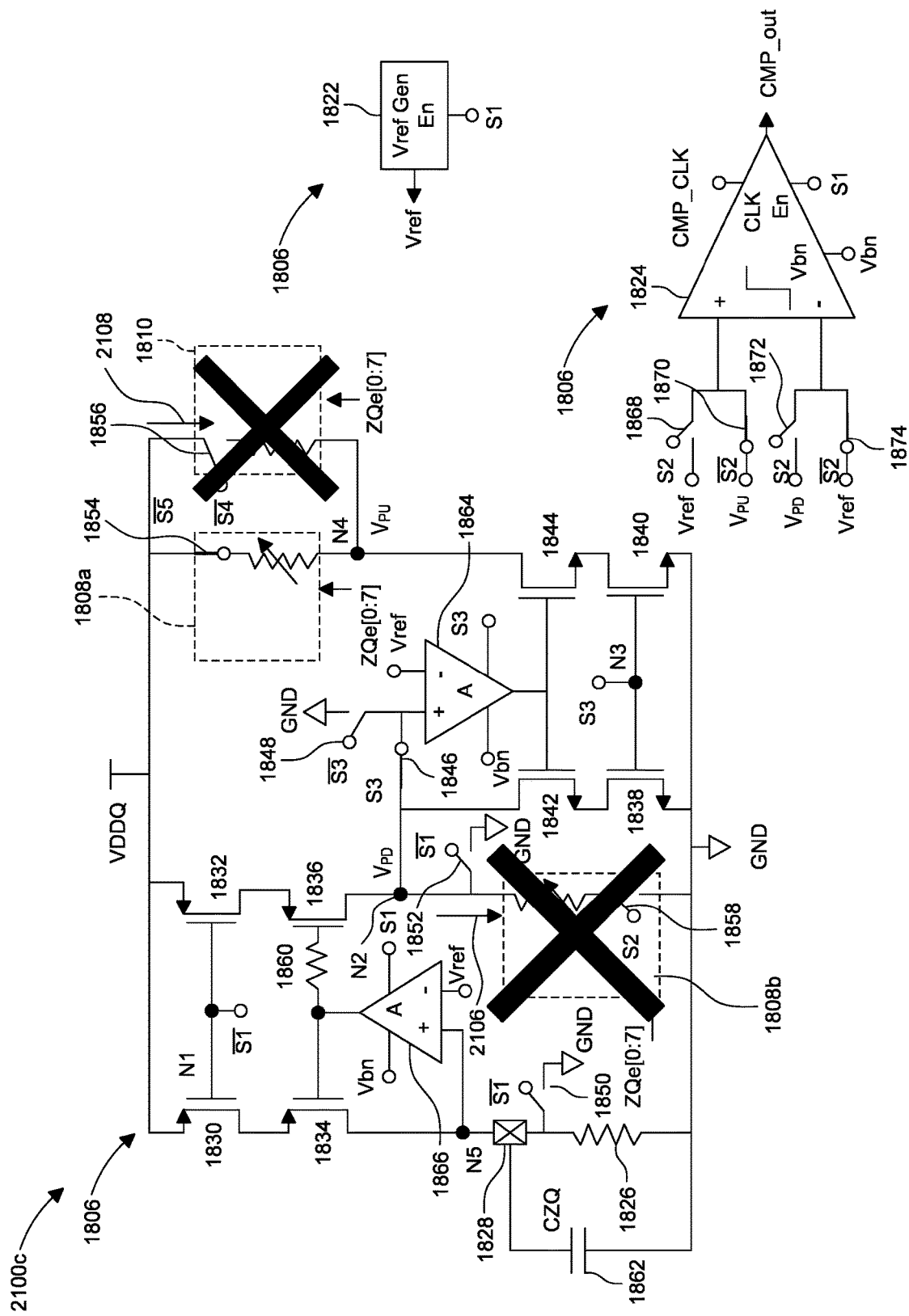
Figure 21D:
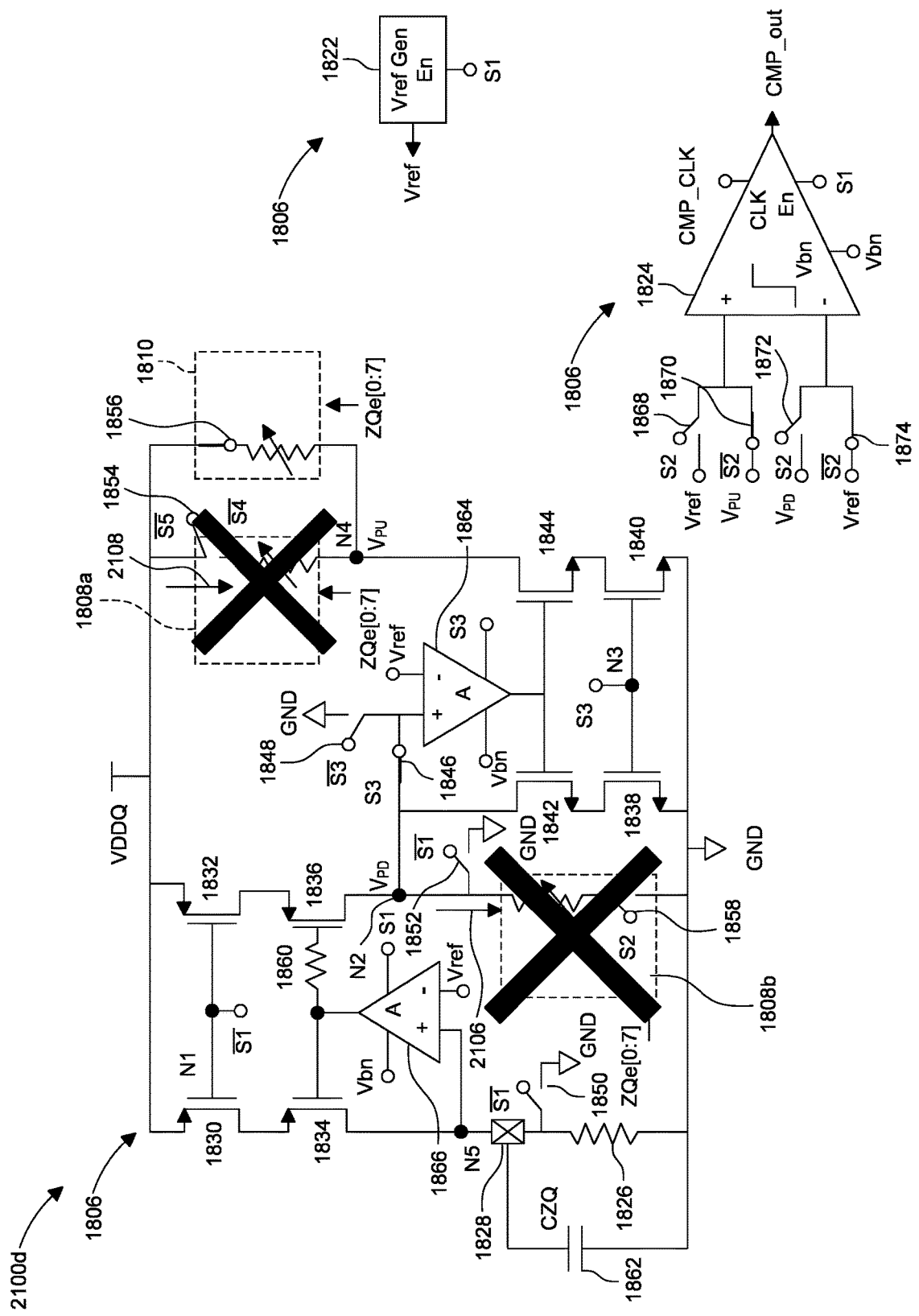

Process 1900 and 2000 will be described with reference to circuit 1800 and with reference to FIGS. 21A-21D. FIGS. 21A-21D depict various example configurations of the circuit 1800 according to embodiments of the disclosed technology. More particularly, FIGS. 21A-21D each illustrate a configuration of the analog core 1806 at certain states of the main FSM 1802, as detailed below, and each configuration will be used during a respective calibration operation performed by the auxiliary FSM 1804. For example, FIG. 21A depicts configuration 2100a of analog core 1806 during an idle state of the main FSM 1802. FIG. 21B depicts configuration 2100b of analog core 1806 during a pull-down replica connected state of the main FSM 1802, which is used by the auxiliary FSM 1804 to calibrate the pull-down replica 1808b. FIG. 21C depicts configuration 2100c of analog core 1806 during a pull-up replica connected state of the main FSM 1802, which is used by the auxiliary FSM 1804 to calibrate the pull-up replica 1808a. FIG. 21D depicts configuration 2100d of analog core 1806 during a ODT replica connected state of the main FSM 1802, which is used by the auxiliary FSM 1804 to calibrate the ODT replica 1808b. In each of FIGS. 21A-21D an "X" indicates that the corresponding components are disabled (e.g., deactivated or otherwise off)

The process 1900 starts with the main FSM 1802 at idle state 1902, where the main FSM 1802 waits for either a ZQCalStart command or ZQCalLatch command. Responsive to receiving a ZQCalStart command, the main FSM 1802 initiates a calibration process to generate ZQ calibration codes that may be used to trim the ODT and output drivers (e.g., such as those of FIGS. 6A and 6B) by transitioning to state 1904. For example, the ZQCalStart command may be provided as a 1-bit wide signal setting the bit to logic high level to enable the calibration process. Prior to (e.g., responsive to a reset signal) and at state 1902, the analog core 1806 is set to configuration 2100a as shown in FIG. 21A, during which the analog core 1806 remains in low-power standby state with minimum power consumption (e.g., less than 4 microwatts).

At state 1904, the main FSM 1802 configures the analog core 1806 for a calibration operation for the pull-down replica 1808b. For example, the main FSM 1802 enables the operational amplifier 1866, the comparator circuit 1824, and the reference voltage generator circuit 1822 by setting control signal S1 to logic high level. As a result, Vref is set to 0.8xVDD (e.g., 0.88V in this example). The main FSM 1802 also connects the pull-down replica 1808b and disconnects the pull-up replica 1808a and ODT replica 1810. For example, the main FSM 1802 sets control signal S2 to logic high level to turn ON switch 1858 and sets control signal S3 to logic low level to turn OFF switch 1846. Additionally, control signal S3 is set to logic high level thereby bringing up the voltage at the gate terminal of transistor 1838, which bring its $V_{GS}$ below its $V_{th}$ and turns OFF the transistor. While also turning ON transistors 1830 and 1832 by setting the control signal $\overline{S1}$ to logic low level (e.g., inverse of S1). With the pull-down replica 1808b turned ON, the main FSM 1802 waits for a set period of time for the circuit to settle, for example a number of clock cycles while the voltage at node N2 reaches a steady state. The number of clock cycles for settling may be selected based on design, frequency, and process corners so to provide adequate time for the circuit to reach steady state. After completion of state 1904, the analog core 1806 is in configuration 2100b as shown in FIG. 21B. Note that arrows 2102 and 2104 indicate that zero current is flowing in the respective portions of the circuit 1800.

Additionally during state 1904, the main FSM 1802 connects the comparator circuit 1824 to node N2 and node N5. For example, as a result of setting control signal S2 to logic high level, switch 1868 is turned ON and connects node N2 to the positive side terminal of the comparator circuit 1824, which supplies the positive side terminal with a voltage level of Vref. Setting control signal S2 to logic high level also turns ON switch 1872, which connects node N5 to the negative side terminal of the comparator circuit 1824, and supplies voltage level $V_{PD}$ to the negative side terminal. Thus, as described below in connection with FIG. 20, the comparator circuit 1824 compares Vref and $V_{PD}$ (sometimes referred to herein a first calibration voltage) and outputs CMP_out indicative of which is larger. The resulting output is used by the auxiliary FSM 1804 during a calibration operation of the pull-down replica 1808b, as described below.

Once the wait time has passed, the main FSM 1802 transitions to state 1906 during which the main FSM 1802 activates the auxiliary FSM 1804 to perform a calibration operation of the pull-down replica 1808b. For example, the main FSM 1802 sets the cal_trig signal to logic high level, which triggers the auxiliary FSM 1804 to perform a calibration operation, as described below with reference to FIG. 20. The main FSM 1802 then waits for a notification that the calibration operation is complete from the auxiliary FSM 1804, during which calibration parameters for the pull-down replica 1808b are determined and stored to the internal register bank 1812a as the ZQ calibration code for the pull-down replica 1808b. Once the calibration operation is completed, the auxiliary FSM 1804 sets the cal_done signal to logic high level to notify the main FSM 1802 that the operation is completed. Responsive to receiving cal_done at logic high level, the main FSM 1802 transitions to state 1908 and sets cal_trig to logic low level.

At state 1908, the main FSM 1802 configures the analog core 1806 for a calibration operation for the pull-up replica 1808a, which includes disconnecting pull-down replica 1808b and connecting pull-up replica 1808a, while keeping ODT replica 1810 disconnected. For example, the main FSM 1802 may set control signal S2 to logic level low, which turns OFF switch 1858 and disconnects the pull-down replica 1808b. Additionally, the main FSM 1802 sets control signal S3 to logic high level, which turns ON switch 1846 and transistors 1838 and 1840 by bringing their respective $V_{GS}$ above their respective $V_{th}$ (e.g., S3 at logic high level applies VDDQ to gate terminals of transistors 1838 and 1840 to turn them ON). Furthermore, setting control signal S3 to logic high level enables operational amplifier 1864, which ensures that the voltage at node N2 is maintained at Vref. Furthermore, the main FSM 1802 may set control signal $\overline{S5}$ is to logic high level to turn ON switch 1854, thereby connecting pull-up replica 1808a. With the pull-up replica 1808a connected, the main FSM 1802 waits for a set period of time for the circuit to settle, for example a number of clock cycles while the voltage at node N4 reaches a steady state. The number of clock cycles to reach steady state at state 1908 may be less than the number set for state 1904.

Additionally during state 1908, the main FSM 1802 connects the comparator circuit 1824 to node N4 and node N5. For example, as a result of setting control signal S2 to logic low level, control signal $\overline{S2}$ is set to logic high level and switch 1870 is turned ON and connects node N4 to the positive side terminal of the comparator circuit 1824, which supplies the positive side terminal with a voltage level of $V_{PU}$. Setting control signal $\overline{S2}$ to logic low level also turns ON switch 1874, which connects node N5 to the negative side terminal of the comparator circuit 1824 and supplies voltage level Vref to the negative side terminal. Thus, as described below in connection with FIG. 20, the comparator circuit 1824 compares Vref and $V_{PU}$ (sometimes referred to herein a second calibration voltage) and outputs CMP_out that indicates which is larger. The resulting output is used by the auxiliary FSM 1804 during a calibration operation of the pull-up replica 1808a.

After completion of state 1908, the analog core 1806 is in configuration 2100c as shown in FIG. 21C. As a result of configuration 2100c, all the current at node N2 flows toward transistor 1838, which is copied to node N4 and propagates through pull-up replica 1808a. Note that arrows 2106 and 2108 indicate that zero current is flowing in the respective portions of the circuit 1800.

Once the wait time has passed, the main FSM 1802 transitions to state 1910 during which the main FSM 1802 activates the auxiliary FSM 1804 to perform a calibration operation of the pull-up replica 1808a. For example, similar to state 1906, the main FSM 1802 sets the cal_trig signal to logic high level, which triggers the auxiliary FSM 1804 to perform a calibration operation, as described below with reference to FIG. 20. The main FSM 1802 then waits for a notification that the calibration operation is complete from the auxiliary FSM 1804, during which calibration parameters for the pull-up replica 1808a are determined and stored to the internal register bank 1812b as the ZQ calibration code for the pull-up replica 1808a. Once the calibration operation is completed, the auxiliary FSM 1804 sets the cal_done signal to logic high level to notify the main FSM 1802 that the operation is completed. Responsive to receiving cal_done at logic high level, the main FSM 1802 transitions to state 1912 and sets cal_trig to logic low level.

At state 1912, the main FSM 1802 configures the analog core 1806 for a calibration operation for the ODT replica 1810, which includes disconnecting pull-up replica 1808a and connecting ODT replica 1810, while keeping pull-down replica 1808b disconnected. For example, the main FSM 1802 may set control signal $\overline{S5}$ to logic low level, which turns OFF switch 1854 and disconnects the pull-up replica 1808a. Additionally, the main FSM 1802 sets control signal $\overline{S4}$ to logic high level, which turns ON switch 1856 and connects ODT replica 1810. Furthermore, the operational amplifier 1864 is maintained as enabled with S3 at logic high level, which ensures that the voltage at node N2 is maintained at Vref. With the ODT replica 1810 connected, the main FSM 1802 waits for a set period of time for the circuit to settle, for example a number of clock cycles while the voltage at node N4 reaches a steady state. The number of clock cycles to reach steady state at state 1912 may be less than the number set for state 1904, and, in some cases, may be less than the number of cycles at state 1908.

Additionally during state 1912, the main FSM 1802 maintains the connection of the comparator circuit 1824 to node N4 and node N5. For example, as a result of setting control signal $\overline{S2}$ to logic high level, switch 1874 is turned ON and connects node N2 to the negative side terminal of the comparator circuit 1824, which supplies the negative side terminal with a voltage level of Vref. Seeing control signal $\overline{S2}$ to logic low level also turns ON switch 1870, which connects node N5 to the positive side terminal of the comparator circuit 1824, and supplies voltage level $V_{PU}$ to the positive side terminal. Thus, as described below in connection with FIG. 20, the comparator circuit 1824 compares Vref and $V_{PU}$ (sometimes referred to herein a third calibration voltage) and outputs CMP_out that indicates which is larger. The resulting output is used by the auxiliary FSM 1804 during a calibration operation of the pull-up replica 1808a.

After completion of state 1912, the analog core 1806 is in configuration 2100d as shown in FIG. 21D. As a result of configuration 2100d, all the current at node N2 flows toward transistor 1838, which is copied to node N4 and propagates through ODT replica 1810. Note that arrows 2106 and 2110 indicate that zero current is flowing in the respective portions of the circuit 1800.

Once the wait time has passed, the main FSM 1802 transitions to state 1914 during which the main FSM 1802 activates the auxiliary FSM 1804 to perform a calibration operation of the ODT replica 1810. For example, similar to state 1910, the main FSM 1802 sets the cal_trig signal to logic high level, which triggers the auxiliary FSM 1804 to perform a calibration operation, as described below with reference to FIG. 20. The main FSM 1802 then waits for a notification that the calibration operation is complete from the auxiliary FSM 1804, during which calibration parameters for the ODT replica 1810 are determined and stored to the internal register bank 1812c as the ZQ calibration code for the ODT replica 1810. Once the calibration operation is completed, the auxiliary FSM 1804 sets the cal_done signal to logic high level to notify the main FSM 1802 that the operation is completed. Responsive to receiving cal_done at logic high level, the main FSM 1802 transitions to state 1912 and sets cal_trig to logic low level.

The main FSM 1802 then transitions back to the idle state 1902, where the main FSM 1802 waits for either a subsequent ZQCalStart command or ZQCalLatch command. At this state, the main FSM 1802 configures the analog core 1806 back into the idle configuration, as shown in FIG. 21A.

Responsive to receiving a ZQCalLatch command, the main FSM 1802 transitions to state 1916 and initiates latching, updating, and applying the ZQ calibration codes stored during the respective calibration operations to the output drivers and ODT circuits (e.g., FIGS. 6A and 6B). For example, at state 1916 the main FSM 1802 sends a latch signal to the registers 1814a, b and 1816, which triggers the registers 1814a,b and 1816 to latch the ZQ calibration codes therein. For example, each register 1814a, b and 1816 obtain a respective ZQ calibration code from each internal register 1814a, b, and c, respectively, and latch the obtained ZQ calibration code to the register 1814a, b and 1816. The latched ZQ calibration code can then be used to trim the total effective impedance of the corresponding termination component as described above.

Turning to process 2000, the auxiliary FSM 1804 starts at an idle state 2010, where the auxiliary FSM 1804 waits for the main FSM 1802 to instruct the auxiliary FSM 1804 to initiate a calibration operation. Then responsive to the main FSM 1802 setting cal_trig to logic high level, the auxiliary FSM 1804 transitions to state 2020.

At state 2020, the auxiliary FSM 1804 performs a coarse tuning (or coarse calibration phase) of the analog core 1806, during which calibration parameters for global variations of a termination component (e.g., as described in FIGS. 6A, 6B, 10-12, 15, and 16) are determined. In an example implementation, state 2020 may determine calibration parameters for the second circuit 1020 of FIG. 10 and/or second circuit 1520 of FIG. 15. For example, with reference to FIG. 10, in a case where the ZQ calibration code is a n-bit wide binary signal, the coarse calibration at state 2020 may determine logic states of bits corresponding transistors 1022a through 1022n that specify whether each corresponding transistor is to be turned ON or OFF. The calibration codes are written and updated in the internal register bank 1812 during state 2020, thereby storing the second portion of the ZQ calibration code therein. Once completed, the auxiliary FSM 1804 transitions to state 2030.

At state 2030, the auxiliary FSM 1804 performs a fine tuning (or fine calibration phase) of the analog core 1806, during which calibration parameters for local variations of a termination component (e.g., as described in FIGS. 6A, 6B, 10-12, 15, and 16) are determined. In an example implementation, state 2030 may determine calibration parameters for the first circuit 1010 of FIG. 10 and/or first circuit 1510 of FIG. 15. For example, with reference to FIG. 10, in a case where the ZQ calibration code is a n-bit wide binary signal, the fine calibration at state 2030 may be used to determine the logic states of bits corresponding transistors 1012a through 1012n that specify whether each corresponding transistor is to be turned ON or OFF. The calibration codes are written and updated in the internal register bank 1812 during state 2030, thereby storing the first portion of the ZQ calibration code therein.

As an example, at the start of state 2020 the ZQ calibration code is set such that the voltage at node N4/N5 is less than the Vref (e.g., total effective resistance of the replica circuit under consideration is less than RZQ). Then, during each state, voltages are compared via comparator circuit 1824, and bits in the ZQ calibration code are switched until the voltage at node N4/N5 passes Vref (e.g., total effective resistance of the replica circuit under consideration becomes greater than RZQ). The bits are continuously updated in the internal register bank 1812. State 2020 then backs the calibration parameters back to the previous parameters, whereby the voltage at node N4/N5 was less than Vref, and proceeds to state 2030. At state 2030, fine calibration is performed by applying a binary search starting at one of the bits of the first portion (e.g., ZQe[5]). The bit is switched and, if the voltage at node N4/N5 passes Vref, the bit is switched back. State 2030 then moves to the next bit (e.g., start with ZQe[5] and move to ZQe[4] and so on). However, if the voltage at node N4/N5 does not pass Vref, than the bit is kept at its current state and state 2030 moves to the next bit. State 2030 proceed through each bit of the first portion until completed.

Once completed, the auxiliary FSM 1804 also sets cal_ done to logic high level, thereby notifying the main FSM 1802 that the calibration operation is completed, and transitions to idle state 2010. At idle state 2010, the auxiliary FSM 1804 waits for a command to trigger a next calibration operation. During the idle state 2010, the auxiliary FSM 1804 may receive a reset signal that resets previously determined variables, such as the ZQ calibration code, so that the auxiliary FSM 1804 is ready for the next calibration operation.

As alluded to above, each calibration operation performed during a complete instance of process 2000 is for a single replica circuit, and each replica circuit is separately calibrated. That is, for example, when the main FSM 1802 is at state 1906 (e.g., the analog core 1806 is in configuration 2100b) and cal_trig is set to logic high level, the auxiliary FSM 1804 performs process 2000 to determine a ZQ calibration code using the pull-down replica 1808b. When the main FSM 1802 is at state 1910 (e.g., the analog core 1806 is in configuration 2100c) and cal_trig is set to logic high level, the auxiliary FSM 1804 performs process 2000 to determine a ZQ calibration code using the pull-up replica 1808a. Then, when the main FSM 1802 is at state 1912 (e.g., the analog core 1806 is in configuration 2100d) and cal_trig is set to logic high level, the auxiliary FSM 1804 performs process 2000 to determine a ZQ calibration code using the ODT replica 1810.

State 2020 may include a plurality of sub-states for performing the coarse calibration phase. For example, upon transitioning to state 2020, the auxiliary FSM 1804 waits a period of time at state 2021 for any glitches on Vref to be discharged. After the period of time has passed, the auxiliary FSM 1804 transitions to state 2022, where the auxiliary FSM 1804 applies the CMP_CLK to the comparator circuit 1824 and applies a current ZQ calibration code (from the internal register bank 18212) to the replica circuit to be calibrated. The ZQ calibration code is initialized assuming that no trimming of the leg units of a given termination component is needed, for example, all termination devices are turned off. In the case of an 8-bit wide ZQ calibration code for the leg units of FIGS. 10 and 15, the ZQ calibration code may be 11111111 (e.g., all off due to inversion of the ZQ calibration code at the NAND gates of the termination components). The CMP_CLK signal is used as a timing signal at state 2022 to sample the CMP_out signal from the comparator circuit 1824. Furthermore, the main FSM 1802 (at state 1904) has already enabled the comparator circuit 1824 at state 1904 by setting control signal S1 to logic high level and connected the comparator to nodes N2 and either node N4 or N5 depending on the current configuration of the analog core 1806, as detailed above.

The auxiliary FSM 1804 transitions to state 2024, where the auxiliary FSM 1804 samples the CMP_out signal at a rising or falling edge of the CMP_CLK signal as a first sample. For example, when the CMP_CLK signal transitions to logic high level, the auxiliary FSM 1804 samples the CMP_out signal. The first sample indicates whether the voltage at node N4 (e.g., $V_{PU}$) or at node N5 (e.g., $V_{PD}$), depending on the current configuration of the circuit, is higher or lower than the voltage Vref at node N2. The auxiliary FSM 1804 then changes the ZQ calibration code by updating one or more calibration parameters in the calibration code in a case where the voltage at N4/N5 differs from Vref. For example, the auxiliary FSM 1804 changes a bit of the second portion of the ZQ calibration code from 0 to 1. The updated calibration parameters are stored to the internal register bank, by sampling the ZQ calibration code at rising or falling edges of the cal_d signal. For example, in the case of an 8-bit wide ZQ calibration code, the second portion may be the left most two bits of 11111111 (e.g., ZQ[0:1]), and the auxiliary FSM 1804 adjusts one of the bits to be 1 (e.g., 10111111).

The auxiliary FSM 1804 then transitions to state 2025, where it applies the updated ZQ calibration code to the replica circuit. The auxiliary FSM 1804 samples the CMP_out signal again according to CMP_CLK signal at state 2026 to determine a second sample. Similar to state 2024, at state 2026 the auxiliary FSM 1804 changes the ZQ calibration code by updating one or more calibration parameters in the calibration code in a case where the voltage at N4/N5 still differs from Vref. For example, if the voltage at N4/N5 is less than Vref, the auxiliary FSM 1804 changes another bit of the second portion of the ZQ calibration code from 0 to 1 (e.g., 00111111). However, if the voltage at N4/N5 is greater than Vref, the auxiliary FSM 1804 changes the previously updated bit of the second portion of the ZQ calibration code back to 0 (e.g., 01111111). The updated calibration parameters are stored to the internal register bank according to the cal_d signal.

The auxiliary FSM 1804 then transitions to state 2028, where it checks whether the coarse calibration phase is complete. For example, the auxiliary FSM 1804 may sample the CMP_out signal a third time and determine if the voltage at node N4/N5 is the same as Vref. If they are the same, then the auxiliary FSM 1804 determines the coarse calibration phase is complete (e.g., the second portion of the ZQ calibration is set that compensates for global variations) and transitions to state 2030. Otherwise, the auxiliary FSM 1804 updates the ZQ calibration code as described above and returns to state 2022 and repeats the sub-states 2022-2028 starting with the currently updated ZQ calibration code.

State 2030 may include a plurality of sub-states for performing the fine calibration. For example, upon transitioning to state 2030, the auxiliary FSM 1804 transitions to state 2032, where it applies the CMP_CLK to the comparator circuit 1824 and applies the current ZQ calibration code (e.g., stored in the internal register bank 1812) to the replica circuit to be calibrated. In the case where state 2030 follows state 2020, the ZQ calibration code applied at state 2032 is the ZQ calibration code having the second portion at during state 2020 for compensating for global variations. The fine calibration at state 2030 seeks to set the first portion of the ZQ calibration code, where the second portion is static during state 2030. That is, in the case of an 8-bit wide ZQ calibration code, the state 2030 operates to determine the right most six bits by performing a binary search through the six bits (e.g., ZQ[2:n]).

Once the ZQ calibration code is applied at state 2032, the auxiliary FSM 1804 transitions to state 2034, where it samples the CMP_out signal according to CMP_CLK signal, similar to states 2024 and 2026 above, to determine a sample. The auxiliary FSM 1804 checks whether the voltage at node N4/N5 is the same as Vref. If they are the same, then the auxiliary FSM 1804 determines the fine calibration is complete (e.g., the first portion of the ZQ calibration is set that compensates for local variations). Otherwise, the auxiliary FSM 1804 updates one or more calibration parameters of the first portion of the ZQ calibration code in a case where the voltage at N4/N5 differs from Vref. For example, the auxiliary FSM 1804 changes a bit of the first portion of the ZQ calibration code from 0 to 1 (e.g., 00111110). If the voltage at node N4/N5 is greater than Vref, then the auxiliary FSM 1804 changes the calibration parameters back to the previous parameters. If the voltage at node N4/N5 is less than Vref, then the auxiliary FSM 1804 changes the calibration parameters by switching the logic level of a next bit. The updated calibration parameters are stored to the internal register bank according to the cal_d signal and returns to state 2032 to repeat sub-states 2032 and 2034 starting with the currently updated ZQ calibration code.

While process 2000 is described as including a coarse calibration state 2020 and a fine calibration state 2030, such is an example implementation for calibrating certain embodiments of output drivers and ODTs. For example, the separate calibration for global and local variations is enabled by having separate circuits in each leg unit designated to separately compensate for the variations. For example, leg units 1000 and 1502 described herein include the first and second circuits which are configured to separately compensate for local and global variations, respectively. Thus, separate calibration via states 2030 and 2020, respectively, are possible. However, in some embodiments, process 2000 need not include the coarse calibration state 2020. In this case, auxiliary FSM 1804 transitions from state 2010 to state 2030, which includes a waiting state (e.g., similar to state 2021 of state 2020) before executing state 2032. Thus, the process 2000 may be applied to calibrate embodiments of leg units having a single circuit that can compensate for local variations and/or global variations.

Process 200 provides an efficient calibration algorithm that is able to calibrate impedance so to compensate for both global and local variations, separately. The process may use a semi-binary search that maximizes performance and fast convergence to the target impedance. Furthermore, process 2000 leverages the leg unit designs for FIGS. 10, 12, and 15 to provide for separately addressing global and local variations.

Figure 22A:
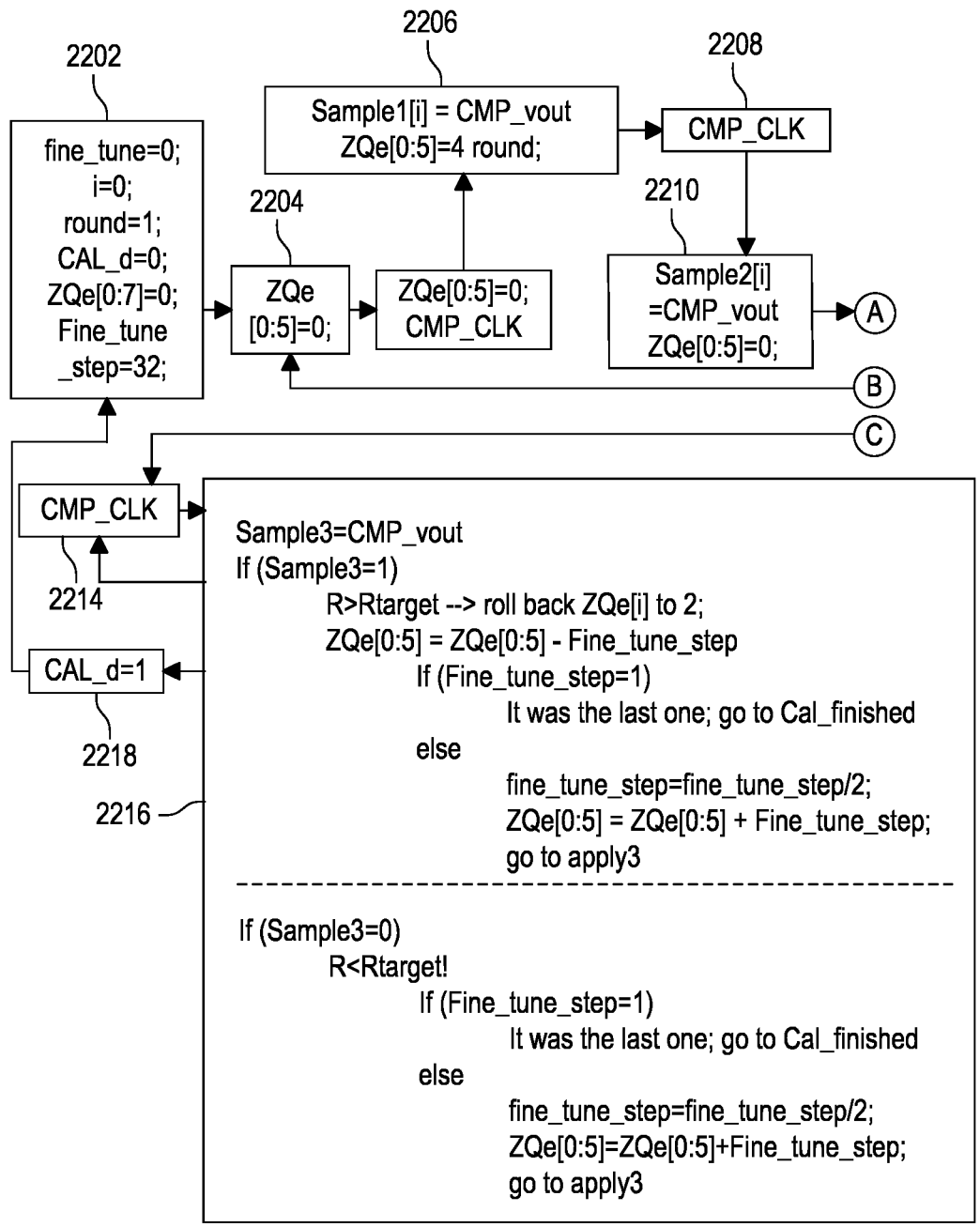
FIGS. 22A and 22B depict an example algorithm for performing a calibration process according to an embodiment of the disclosed technology.
Figure 22B:
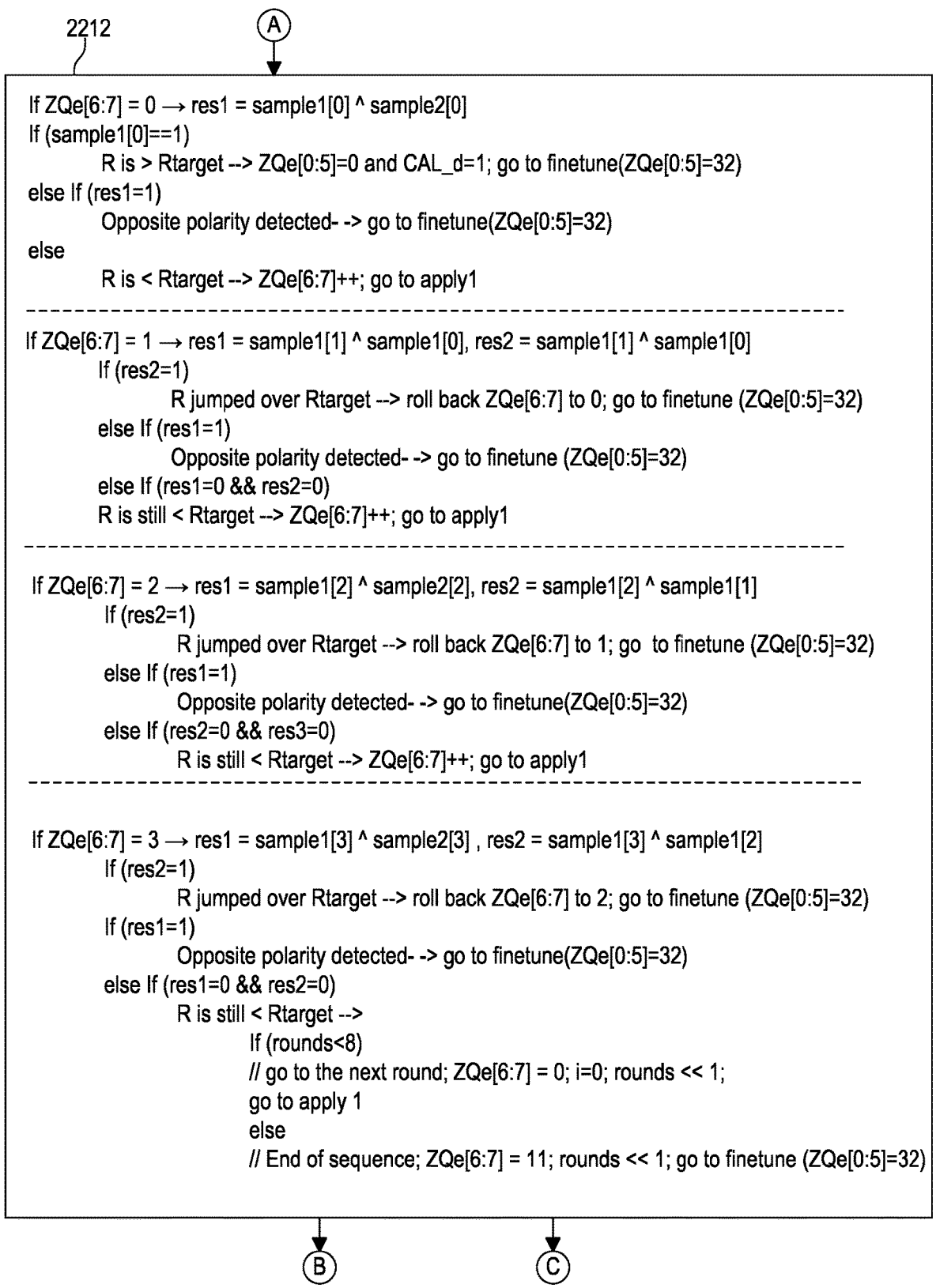

FIGS. 22A and 22B depict an example algorithm for performing a calibration process according to an embodiment of the disclosed technology. More particularly, FIGS. 22A and 22B depicts an algorithm of a calibration operation (e.g., process 2000) performed by the auxiliary FSM 1804. FIGS. 22A and 22B includes components 2202-2222, each of which is an example implementation of one of the states of process 2000. For example, component 2202 is an example implementation of idle states 1902 and 2010. Component 2204 is an example implementation of state 2021. Component 2206 is an example implementation of state 2022. Component 2208 is an example implementation of state 2024. Component 2210 is an example implementation of state 2025. Component 2212 is an example implementation of state 2026 and 2028. Component 2214 is an example implementation of state 2032 and component 2216 is an example implementation of state 2034. Component 2218 is an example implementation of state 2040.

Figure 23A:
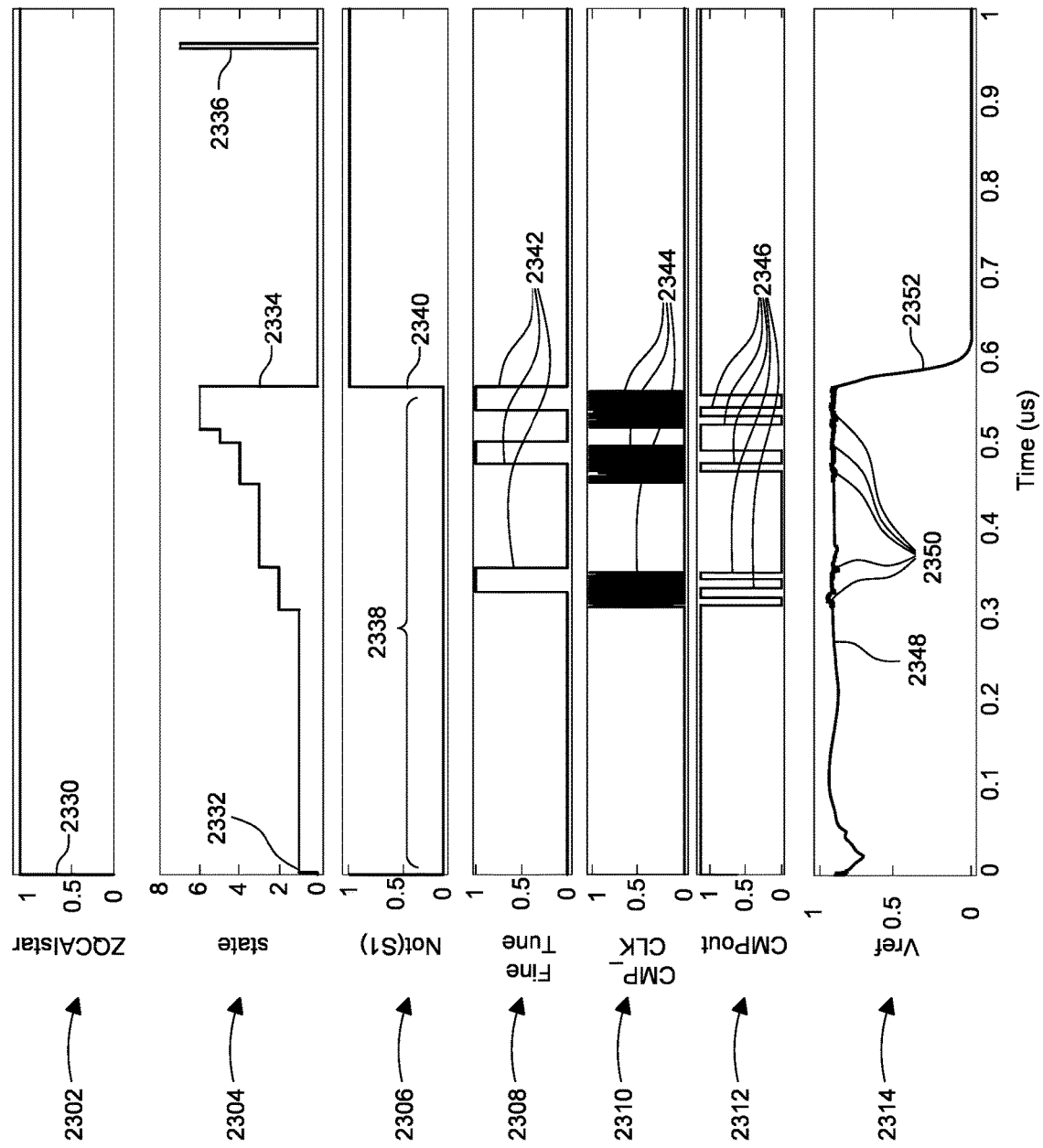
FIGS. 23A and 23B are example timing diagrams of simulations of a ZQ calibration process in accordance with the embodiments of the present disclosure.
Figure 23B:
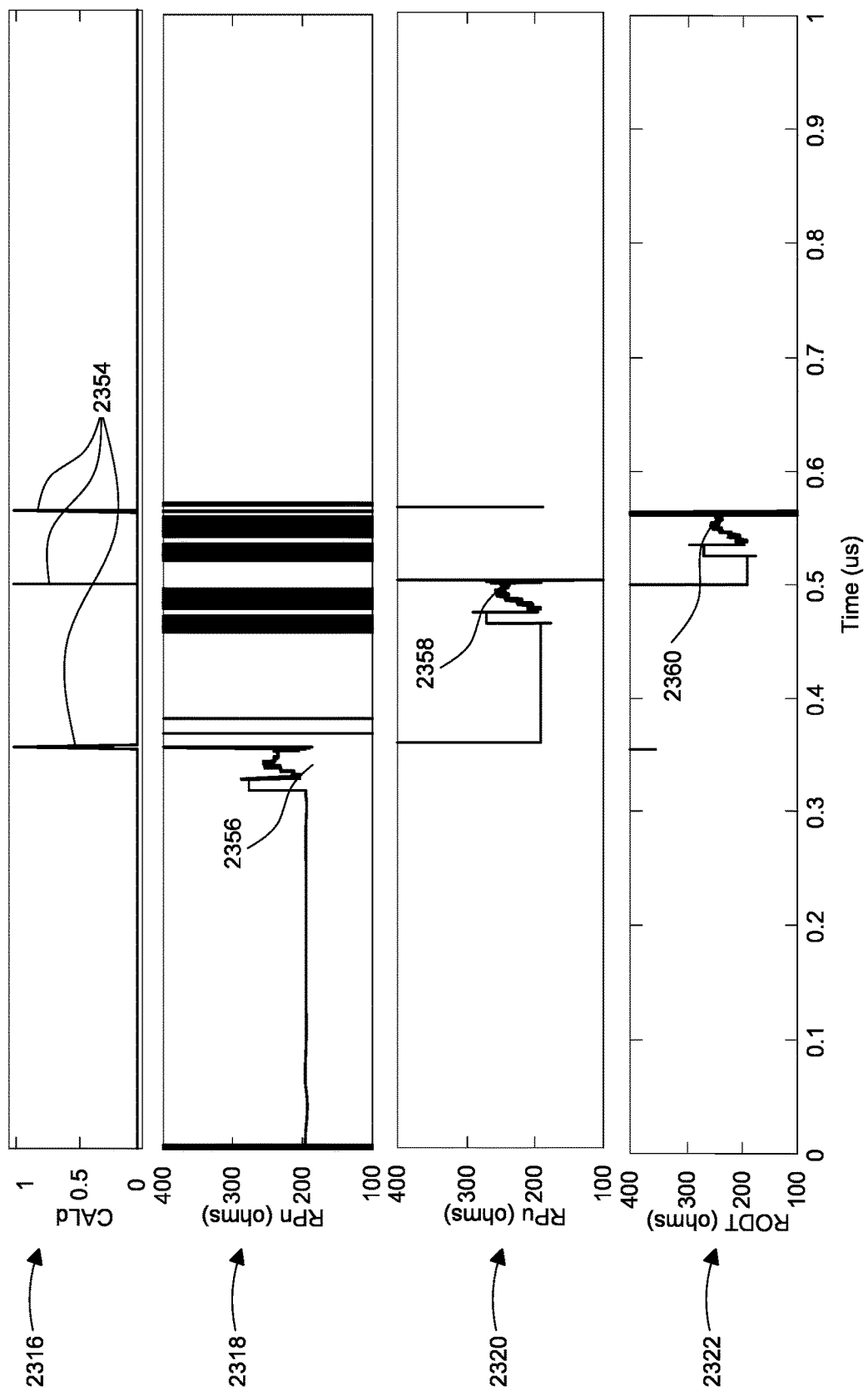

FIGS. 23A and 23B are example timing diagrams of simulations of a ZQ calibration process in accordance with the embodiments of the present disclosure. The timing diagrams illustrate how the ZQ calibration circuit 1800 works overtime.

Diagram 2302 depicts a logic state of the ZQCalState command. Diagram 2302 illustrates that at time 2330, the ZQCalStart command is receive triggering the ZQ calibration process. Diagram 2302 depicts a cumulative state of the main FSM 1802, where each executed state has a value of 1.

Diagram 2304 depicts a cumulative state of the main FSM 1802. Each state is given a value of 1, where each state adds to the current value until a reset command is received by the main FSM 1802. As shown in diagram 2304, the state of the main FSM 1802 moves to 1 at time 2332 responsive to a ZQCalStart command. The remaining states step up for each state indicating that the main FSM 1802 is changing as expected, until the value is set to 0 upon reset at time 2334. Then at time 2336, a ZQCalLatch command is received.

Diagram 2306 depicts an on off state of the analog core 1806. For example, during time 2338 the analog core 1806 is fully or partially on, while at time 2340 the analog core 1806 is turned off.

Diagram 2308 depicts timings 2342 for fine tuning, for example, during state 2030 performed by the auxiliary FSM 1804. Diagram 2310 shows generate CMP_CLK signals at times 2344 by the auxiliary FSM 1804. Diagram 2312 shows sampling of CMP_out at various times 2346 (e.g., sampling states) as described above. Diagram 2314 shows the voltage level of Vref during the calibration process. The voltage settles at time 2348 and the CMP draws some voltage at times 2350 during sampling. Then at time 2352, the reference voltage generator circuit 1822 turns off. Diagram 2316 shows the logic level of the cal_d signal, which is set to logic high at times 2354, which correspond to fine tuning times of diagram 2308.

Diagrams 2318-2322 depict the total effective resistance of the pull-down replica 1808b, pull-up replica 1808a, and ODT replica 1810, respectively. As shown in diagrams 2318-2322, each replica is calibrated to approximately 240 ohms, which in this example is the target resistance of the ZQ resistor 1826 at times 2356, 2358, and 2360 respectively. The large swings that follow on each diagram 2318-2322 indicate that the respective replica was disconnected from the analog core.

FIGS. 24A-24F depict simulated results of the calibration process of FIGS. 19 and 20. FIGS. 24A-24C show total effective resistance of a pull-up output driver (PU), pull-down output driver (PDN), and an ODT, each of which are calibrated based on process 1900 and 2000. FIGS. 24A-24C are simulated at −25° C., 25° C., and 125° C., respectively, across all process corners. As shown in FIGS. 24A-24F, there is little variation in the total effective resistance across process corners and different temperatures. Specifically, point 2402 shows the worst case error, which is 2.5%. This error is well below the required maximum error of 10% of designed for applications, such as the memory device 200.

FIGS. 24D-24F illustrate 500 Monte Carlo simulations of the process 1900 and 2000, where the calibrated total effective resistance is plotted against number of runs in which the resistance value was measured. FIGS. 24D-24F are simulated at −25° C., 25° C., and 125° C., respectively, across all process corners. As can be seen from FIGS. 24D-24F, the worst case results at −25° C. was approximately 8 ohms, at 25° C. approximately 7 ohms, and at 125° C. approximately 10 ohms. Again this is well within the required maximum error in the resistance.

Figure 25B:
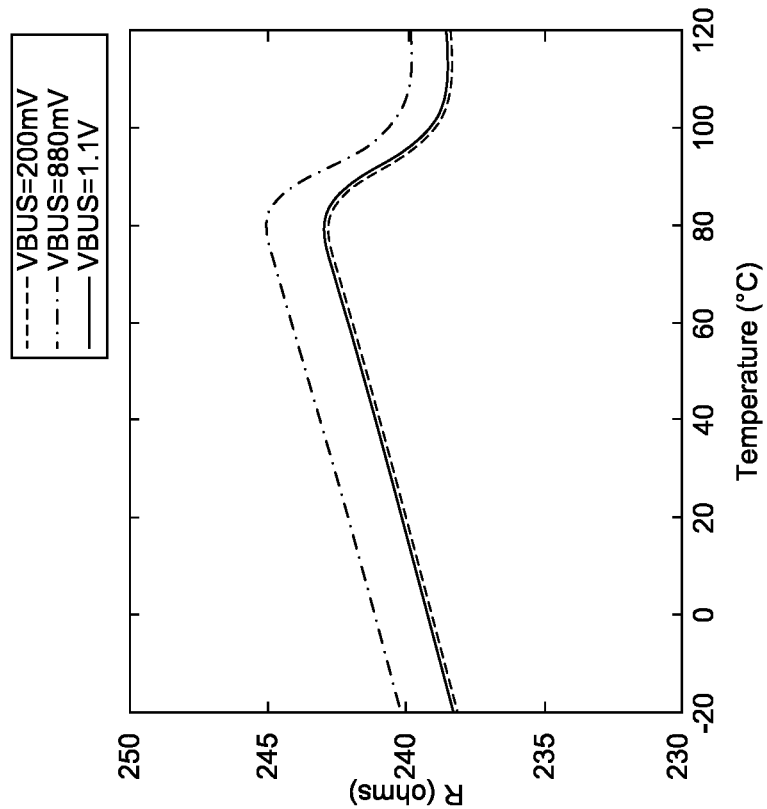
FIGS. 25A and 25B are example plots of total effective resistance calibrated according to embodiments of the disclosed technology as a function of temperature.
Figure 25A:
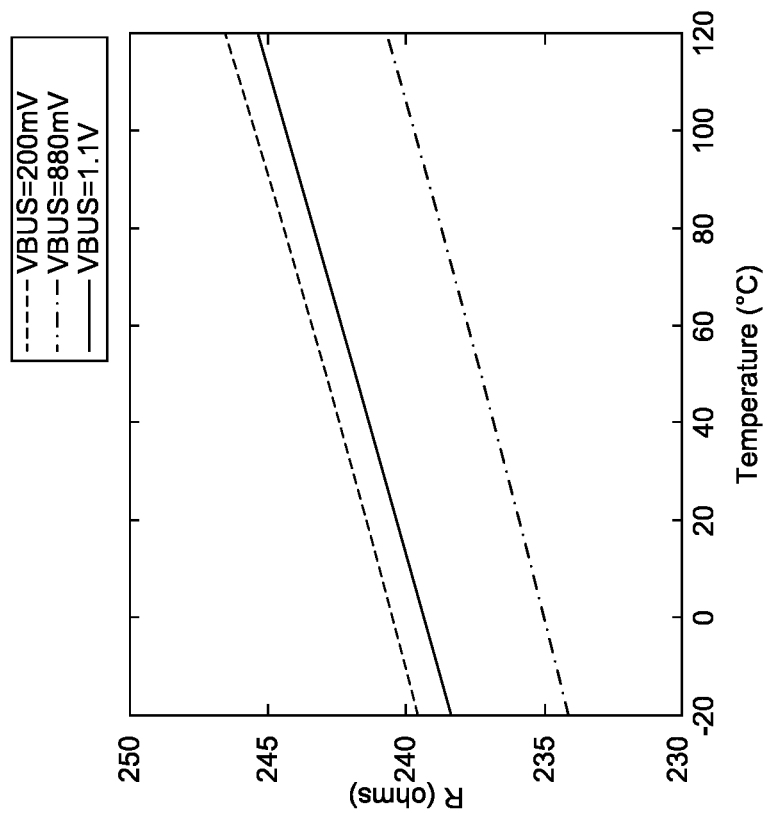

FIGS. 25A and 25B are example plots of total effective resistance calibrated according to embodiments of the disclosed technology as a function of temperature. FIG. 25A depicts the resistance of the pull-up output driver and ODT calibrated using processes 1900 and 2000 plotted against temperature and FIG. 25B depicts the resistance of the pull-down output driver calibrated using processes 1900 and 2000 plotted against temperature. In these simulations, each driver or ODT was calibrated at 25° C., and then the resistance was simulated as temperature increased. Also shown three simulations at different voltages applied to the data bus.

FIGS. 25A and 25B illustrate that, if calibration is performed at 25° C., when does the respective driver or ODT need to be recalibrated. As shown in the figures, the worst-case deviation with respect to temperature was approximately 6 ohms; with respect to voltage on the data bus is 5 ohms; and with respect to both is 6 ohms. Furthermore, the worst-case calibration error is 6 ohms and worst-case error 12 ohms (e.g., 5% of 240 ohms). Accordingly, there is no need for frequent recalibration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A termination leg unit circuit comprising:
   a first circuit comprising a first plurality of switches configured to switchably connect a voltage supply to a data bus according to a target impedance between the voltage supply and the data bus; and
   a second circuit connected in series between the first circuit and the data bus, the second circuit comprising a second plurality of switches configured to switchably connect a plurality of resistors between the first circuit and the data bus according to the target impedance, wherein the second circuit comprises a plurality of pairs, each pair comprising one of the second plurality of switches connected in parallel with one of the plurality of resistors.

2. The termination leg unit circuit of claim 1, wherein the first plurality of switches are connected in parallel.

3. The termination leg unit circuit of claim 1, further comprising a termination resistor connected between the data bus and the second circuit.

4. The termination leg unit circuit of claim 1, further comprising a third circuit connected in parallel to the first circuit, the third circuit comprising a third at least one switch configured to reduce a dynamic range of the termination leg unit circuit.

5. The termination leg unit circuit of claim 1, wherein the first plurality of switches and the second plurality of switches comprise p-channel metal-oxide-semiconductor field-effect transistors and the voltage supply is a high supply voltage.

6. The termination leg unit circuit of claim 1, wherein the first plurality of switches and the second plurality of switches comprise n-channel metal-oxide-semiconductor field-effect transistors.

7. The termination leg unit of claim 6, wherein the voltage supply is a low voltage supply.

8. A memory device, the memory device comprising:
   an on-chip calibration device coupled to a reference node;
   a plurality of variable impedance circuits coupled to a plurality of nodes;
   first circuitry configured to supply a reference voltage at the reference node based on a current in the on-chip calibration device;
   second circuitry comprising a plurality of switches coupled to the plurality of nodes and configured to change the second circuitry between a plurality of configurations, the second circuitry configured to establish, for each configuration, a calibration voltage at one of the plurality of nodes based on current in one of plurality of variable impedance circuits connected to the respective one of the plurality of nodes;

a comparator circuit switchably connected to the reference node and the plurality of nodes and configured, for each configuration of the second circuitry, to compare the respective calibration voltage to the reference voltage; and third circuitry configured to perform ZQ calibration for each configuration of the second circuitry, based on the comparison of the respective calibration to the reference voltage.

9. The memory device of claim 8, wherein the on-chip calibration device is a resistor having a resistance value and a tolerance of ±1%.

10. The memory device of claim 8, wherein the plurality of variable impedance circuits comprises an on-die termination (ODT) replica circuit having a variable resistance; a pull-up replica circuit having a variable resistance; and a pull-down replica circuit having a variable resistance.

11. The memory device of claim 10, wherein the plurality of nodes comprises a first calibration node and a second calibration node, wherein the pull-down replica circuit is connected to the first calibration node and the ODT and the pull-up replica circuit are connected to the second calibration node.

12. The memory device of claim 11, wherein, in a first configuration of the plurality of configurations, the plurality of switches of the second circuitry pass current through the pull-down replica circuit, and the comparator circuit is connected to the reference node and the first calibration node, wherein the third circuitry calibrates the pull-down replica circuit based on the comparison of the calibration voltage at the first calibration node to the reference voltage.

13. The memory device of claim 11, wherein, in a second configuration of the plurality of configurations, the plurality of switches of the second circuitry pass current through the pull-up replica circuit, and the comparator circuit is connected to the reference node and the second calibration node, wherein the third circuitry calibrates the pull-up replica circuit based on the comparison of the calibration voltage at the second calibration node to the reference voltage.

14. The memory device of claim 11, wherein, in a third configuration of the plurality of configurations, the plurality of switches of the second circuitry pass current through the ODT replica circuit, and the comparator circuit is connected to the reference node and the second calibration node, wherein the third circuitry calibrates the ODT replica circuit based on the comparison of the calibration voltage at the second calibration node to the reference voltage.

15. A method comprising:
responsive to a ZQ calibration start command, activating a calibration circuitry and passing current from a first calibration node through a first variable impedance circuit of the calibration circuitry, wherein the calibration circuitry comprises an on-chip calibration device coupled to a reference node;

calibrating a first impedance value of the first variable impedance circuit based on a comparison of a first calibration voltage at the first calibration node to a reference voltage at the reference node;

responsive to a signal indicative that the calibration of the first impedance value is complete, disconnecting the first variable impedance circuit and passing current from a second calibration node through a second variable impedance circuit of the calibration circuitry;

calibrating a second impedance value of the second variable impedance circuit based on a comparison of a second calibration voltage at the second calibration node to a reference voltage at the reference node; and responsive to a ZQ calibration latch command, latching the first impedance value into a first register of a first termination device and the second impedance value into a second register of a second termination device.

16. The method of claim 15, further comprising:
responsive to a signal indicative that the calibration of the second impedance value is complete, disconnecting the second variable impedance circuit and passing current from the second calibration node through a third variable impedance circuit of the calibration circuitry;

calibrating a third impedance value of the third variable impedance circuit based on a comparison of a second calibration voltage at the second calibration node to a reference voltage at the reference node; and responsive to the ZQ calibration latch command, latching the third impedance value into a third register of a third termination device.

17. The method of claim 16, wherein the first variable impedance circuit is a pull-down driver replica circuit, the second variable impedance circuit is a pull-up driver replica circuit, and the third variable impedance circuit is an on-die termination replica circuit.

18. The method of claim 15, wherein the first variable impedance circuit comprises a plurality of leg unit circuits, each leg unit circuit comprising a first compensation circuit comprising a first plurality of switches and a second compensation circuit comprising a second plurality of switches, wherein calibrating the first impedance value comprises:
performing a coarse calibration on the second compensation circuit to determine switches of the second plurality of switches to activate; and
performing a fine calibration on the first compensation circuit to determine switches of the first plurality of switches to activate,
wherein the first impedance value comprises information indicative of which switches are determined to be activated.

19. The method of claim 18, wherein the first impedance value is a bit pattern comprising a first portion and a second portion, the first portion comprising binary values corresponding to the first plurality of switches, the second portion comprising binary values corresponding to the second plurality of switches.

20. The method of claim 15, wherein the first and second impedance values are a first and second ZQ calibration code corresponding to the first and second variable impedance circuits, respectively.

* * * * *